(12) United States Patent
Park et al.

(10) Patent No.: US 11,985,687 B2
(45) Date of Patent: May 14, 2024

(54) METHOD AND DEVICE FOR RECEIVING PPDU HAVING BEEN SUBJECTED TO LDPC TONE MAPPING IN BROADBAND TONE PLAN IN WIRELESS LAN SYSTEM

(71) Applicant: LG ELECTRONICS INC., Seoul (KR)

(72) Inventors: Eunsung Park, Seoul (KR); Jinsoo Choi, Seoul (KR); Dongguk Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/212,919

(22) Filed: Jun. 22, 2023

(65) Prior Publication Data

US 2023/0371033 A1    Nov. 16, 2023

Related U.S. Application Data

(63) Continuation of application No. 17/597,390, filed as application No. PCT/KR2020/007784 on Jun. 16, 2020.

(30) Foreign Application Priority Data

Jul. 5, 2019   (KR) .................. 10-2019-0081615

(51) Int. Cl.
*H04L 1/00*      (2006.01)
*H04L 69/22*    (2022.01)
*H04W 72/23*   (2023.01)

(52) U.S. Cl.
CPC ............ *H04W 72/23* (2023.01); *H04L 1/0004* (2013.01); *H04L 1/0061* (2013.01); *H04L 69/22* (2013.01)

(58) Field of Classification Search
CPC ....... H04L 1/0041; H04L 1/04; H04L 1/0061; H04L 69/22; H04L 1/00; H04L 1/0004; H04L 5/0007; H04L 7/34; H04L 27/36; H04L 1/001; H04W 84/12; H04W 72/23
See application file for complete search history.

(56) References Cited

U.S. PATENT DOCUMENTS

| | | | |
|---|---|---|---|
| 2016/0050666 A1* | 2/2016 | Yang .................. | H04L 27/2602 370/329 |
| 2019/0281614 A1* | 9/2019 | Chen ................... | H04L 5/0007 |
| 2020/0136756 A1* | 4/2020 | Liu ...................... | H04L 1/0063 |
| 2020/0322091 A1* | 10/2020 | Noh .................... | H04L 27/2602 |
| 2020/0383133 A1* | 12/2020 | Hu ...................... | H04L 1/0041 |
| 2021/0082668 A1* | 3/2021 | Ventzek .............. | H01J 37/06 |
| 2021/0144696 A1* | 5/2021 | Cariou ................ | H04L 27/2602 |
| 2021/0314113 A1* | 10/2021 | Chen ................... | H04L 5/0007 |

* cited by examiner

*Primary Examiner* — Chi Ho A Lee
(74) *Attorney, Agent, or Firm* — LEE, HONG, DEGERMAN, KANG & WAIMEY

(57) ABSTRACT

Proposed are a method and a device for receiving a PPDU having been subjected to LDPC tone mapping in a broadband tone plan in a wireless LAN system. Specifically, a reception STA receives a PPDU from a transmission STA through broadband and decodes the PPDU. A data tone included in a data field is subjected to LDPC tone mapping on the basis of a first parameter. A tone plan for the 240 MHz band is 3×996 tone RUs, and a tone plan for the 320 MHz band is 4×996 tone RUs. The first parameter is 20.

20 Claims, 29 Drawing Sheets

Receive, by receiving station (STA), Physical Protocol Data Unit (PPDU) from transmitting STA through wideband — S2810

Decoding PPDU, by receiving STA, wherein wideband is 240 MHz band or 320 MHz band, wherein PPDU includes control field and data field, wherein Low Density Parity Check (LDPC) tone mapping is performed on data tones included in data field based on first parameter, wherein tone plan of 240 MHz band or 320 MHz band is determined based on control field, wherein tone plan of 240 MHz band is 3x996 tone Resource Unit (RU), wherein tone plan of 320 MHz band is 4x996 tone RU, and wherein first parameter is equal to 20 — S2820

(a)

(b)

METHOD AND DEVICE FOR RECEIVING PPDU HAVING BEEN SUBJECTED TO LDPC TONE MAPPING IN BROADBAND TONE PLAN IN WIRELESS LAN SYSTEM

CROSS-REFERENCE TO RELATED APPLICATIONS

This application is a continuation of U.S. patent application Ser. No. 17/597,390, filed on Jan. 4, 2022, which is the National Stage filing under 35 U.S.C. 371 of International Application No. PCT/KR2020/007784, filed on Jun. 16, 2020, which claims the benefit of earlier filing date and right of priority to Korean Patent Application No. 10-2019-0081615, filed on Jul. 5, 2019, the contents of which are all incorporated by reference herein in their entirety.

BACKGROUND OF THE DISCLOSURE

Field of the Disclosure

The present disclosure relates to a method for receiving a physical layer protocol data unit (PPDU) in a wideband in a wireless local area network (WLAN) system and, most particularly, to a method and device for receiving a PPDU having LDPC tone mapping performed in a tone plan of a wideband.

Related Art

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

In a new WLAN standard, an increased number of spatial streams may be used. In this case, in order to properly use the increased number of spatial streams, a signaling technique in the WLAN system may need to be improved.

SUMMARY OF THE DISCLOSURE

Technical Objects

The present specification proposes a method and device for receiving a PPDU having LDPC tone mapping performed in a tone plan of a wideband in a WLAN system.

Technical Solutions

An example of the present specification proposes a method for receiving a PPDU in a wideband.

The present embodiment proposes a method for performing LDPC tone mapping for a data bit sequence that is included in a data field of a PPDU, when the PPDU is transmitted at a wideband (240 MHz, 320 MHz band) that is supported by an EHT WLAN system. At this point, a tone plan of the wideband may be designed by repeating (or iterating) an 80 MHz tone plan of 802.11ax.

An example of the present embodiment may be performed by a receiving station (STA), and the receiving STA may correspond to an STA that supports an Extremely High Throughput (EHT) WLAN system. A transmitting STA of the present embodiment may correspond to an access point (AP).

A receiving STA receives a Physical Protocol Data Unit (PPDU) from a transmitting STA through a wideband.

The receiving STA decodes the PPDU.

The wideband may be a 240 MHz band or a 320 MHz band.

The PPDU may include a control field and a data field. The control field may include a Universal-Signal (U-SIG) field and an EHT-SIG field.

Low Density Parity Check (LDPC) tone mapping is performed on data tones included in the data field based on a first parameter. More specifically, the data field may be generated based on a bit stream. The bit stream may be mapped to the data tones based on a constellation mapping. The data tones may be configured to have a tone spacing that is equivalent to the first parameter based on the LDPC tone mapping. The LDPC tone mapping is similar to an interleaving operation, and the bit stream may be spread at a tone spacing of the first parameter based on the LDPC tone mapping and may then be mapped to a data tone. Additionally, the bit stream may be modulated based on the constellation mapping before being processed with the LDPC tone mapping.

Furthermore, the bit stream may be divided per frequency segment by a segment parser before the constellation mapping is performed. The constellation mapping and the LDPC tone mapping may be performed per frequency segment. A size of one frequency segment may be equal to a 996-tone RU.

Effects of the Disclosure

According to the embodiment proposed in the present specification, by proposing an LDPC tone mapping parameter the present disclosure in a wideband, a data tone that is optimized in light of frequency diversity may be obtained through LDPC tone mapping. And, thus, a new effect of increasing overall throughput may be achieved.

DESCRIPTION OF EXEMPLARY EMBODIMENTS

Figure 1:
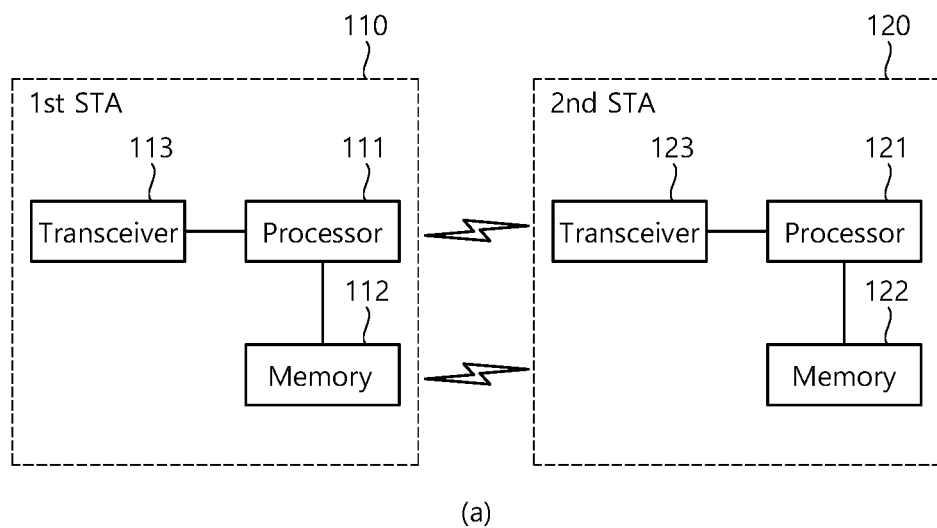
FIG. 1 shows an example of a transmitting apparatus and/or receiving apparatus of the present specification.
Figure 1:
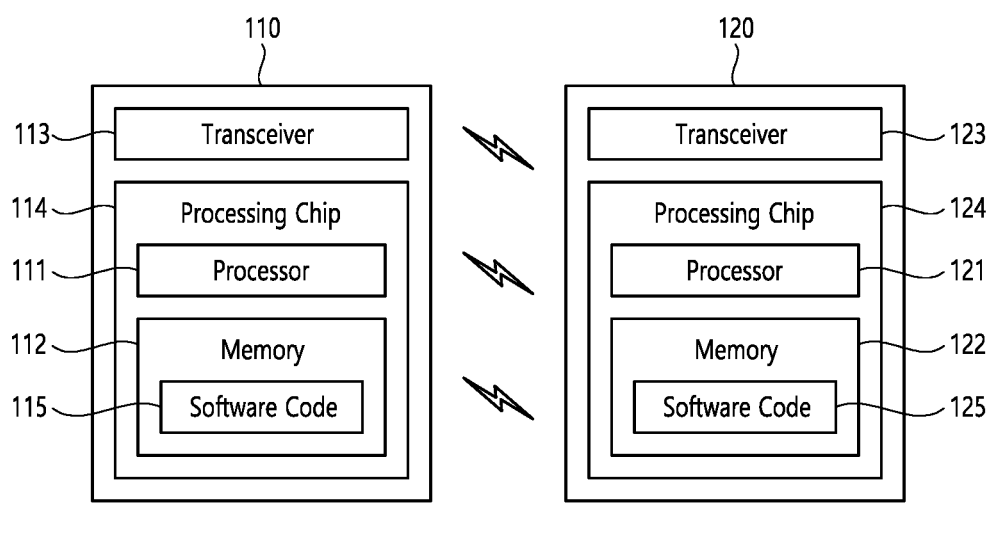

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may mean that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a 3rd generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
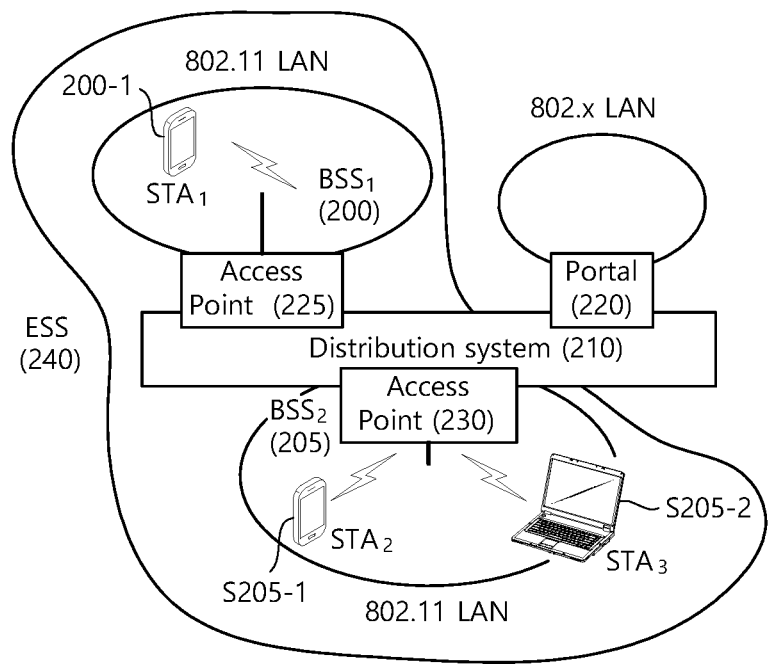
FIG. 2 is a conceptual view illustrating the structure of a wireless local area network (WLAN).
Figure 2:
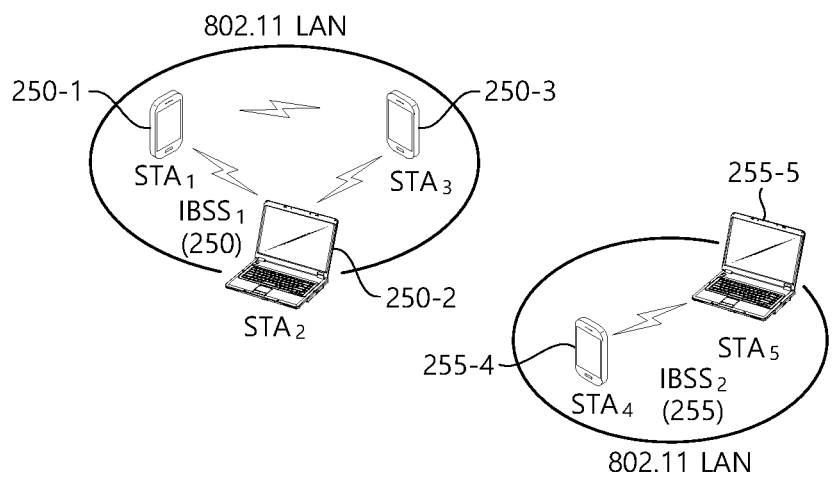

FIG. 2 is a conceptual view illustrating the structure of a wireless local area network (WLAN).

An upper part of FIG. 2 illustrates the structure of an infrastructure basic service set (BSS) of institute of electrical and electronic engineers (i.e. EE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (i.e. EE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBS S).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
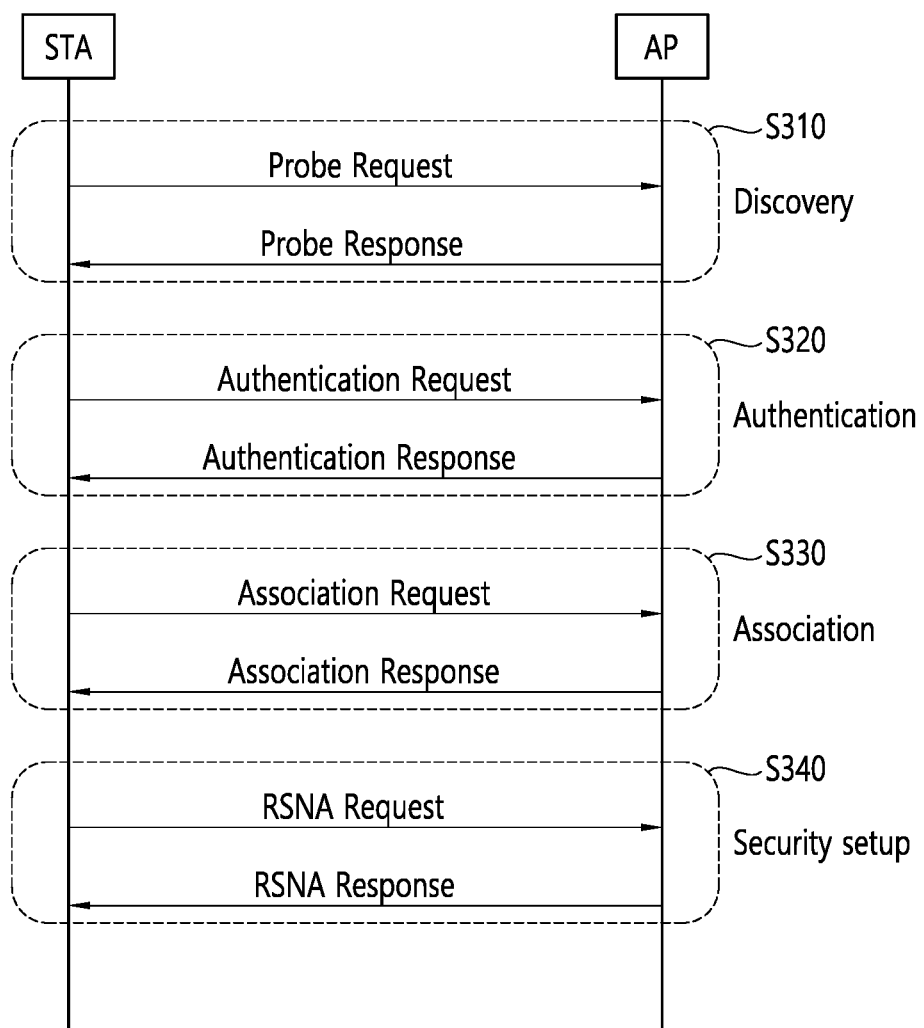
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information about a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information about an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information about various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information about various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Figure 4:
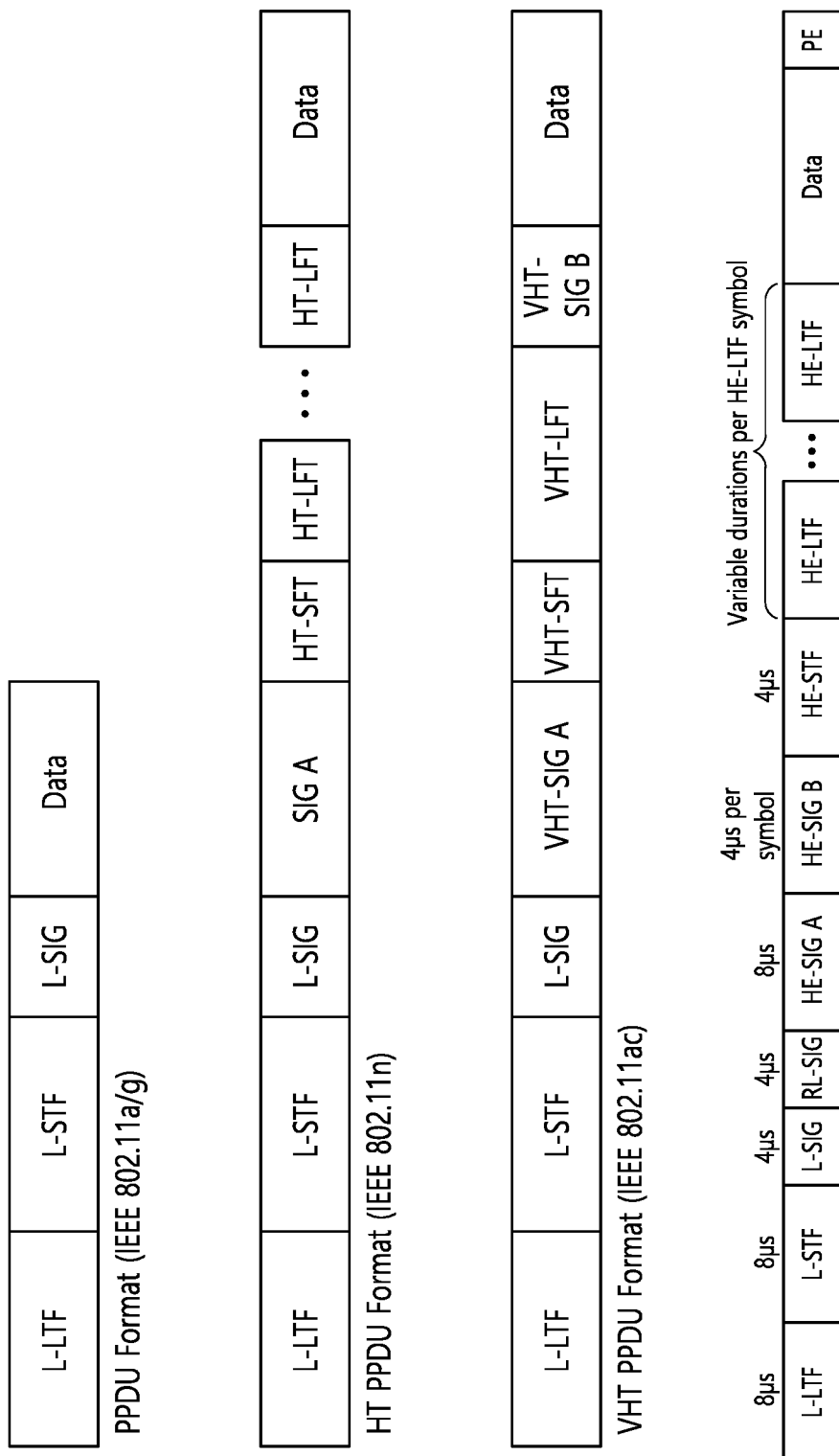
FIG. 4 illustrates an example of a PPDU used in an IEEE standard.

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
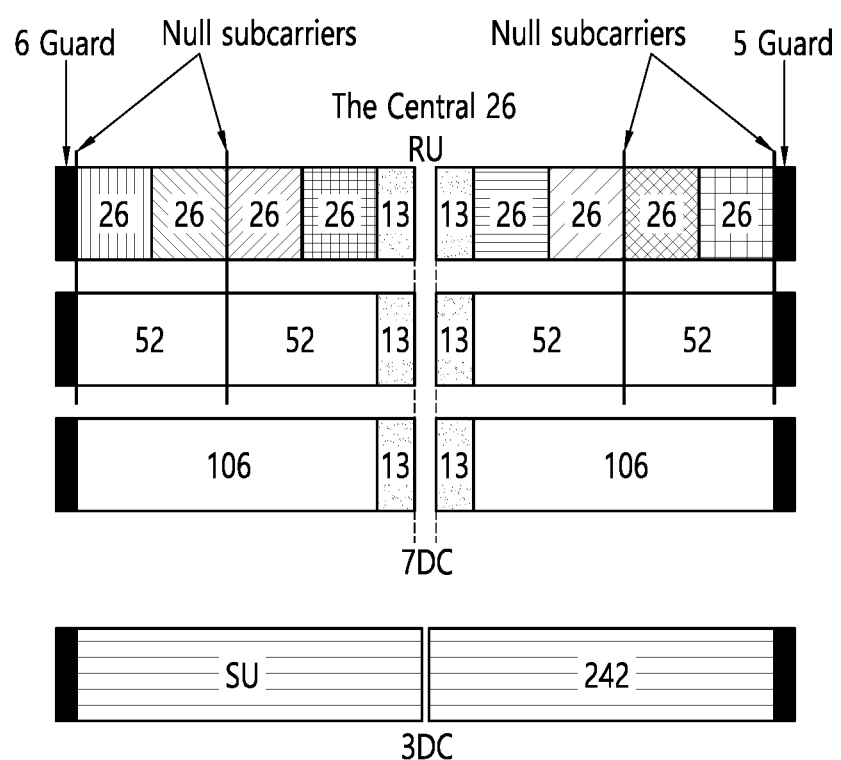
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
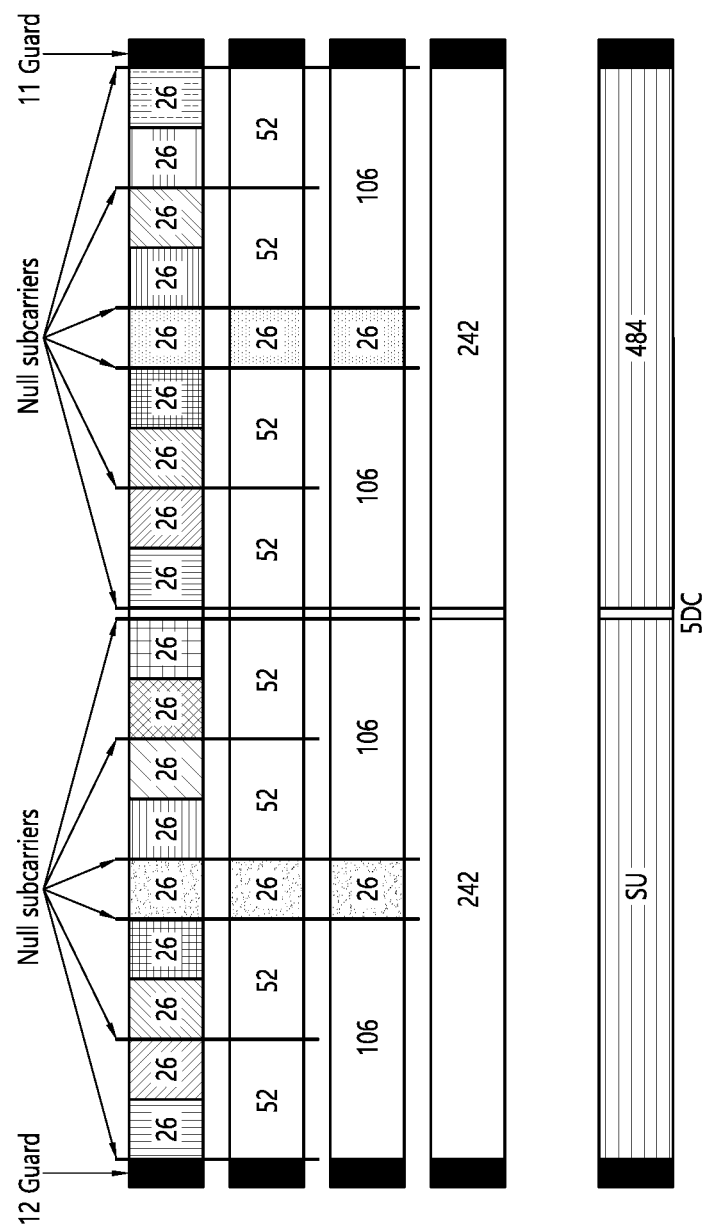
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
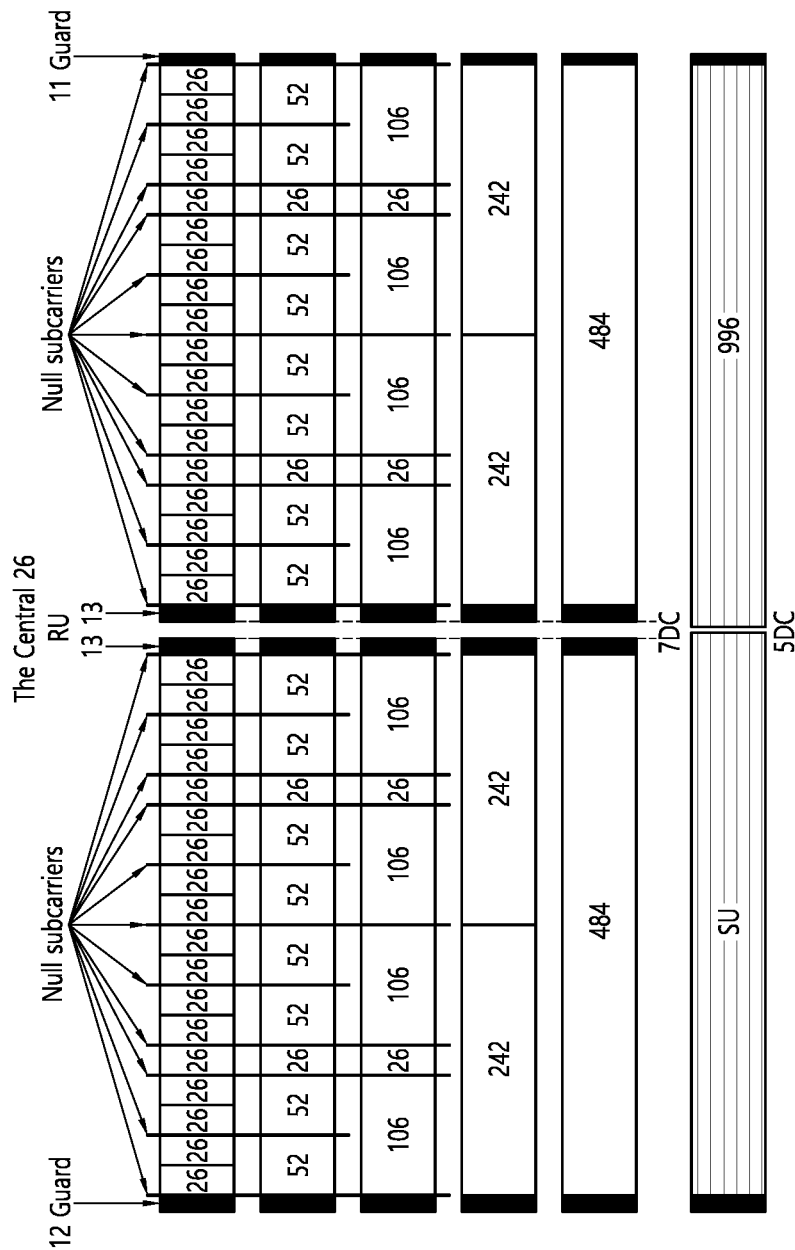
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
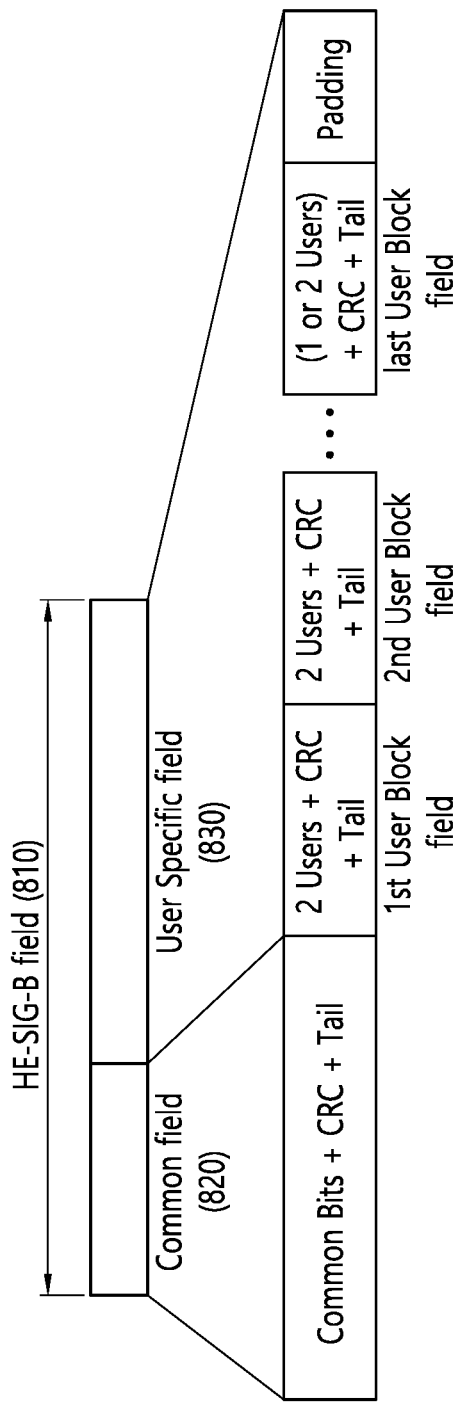
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| RU Allocation subfield (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |
| 00001001 | 52 | | 26 | 26 | 26 | 26 | 26 | 52 | | 1 |
| 00001010 | 52 | | 26 | 26 | 26 | 52 | | 26 | 26 | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01000$y_2y_1y_0$ | | | 106 | | 26 | 26 | 26 | 26 | 26 | 8 |
| 01001$y_2y_1y_0$ | | | 106 | | 26 | 26 | 26 | 52 | | 8 |

"01000y2y1y0" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information ($y_2y_1y_0$). For example, when the 3-bit information ($y_2y_1y_0$) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000y2y1y0", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

Figure 9:
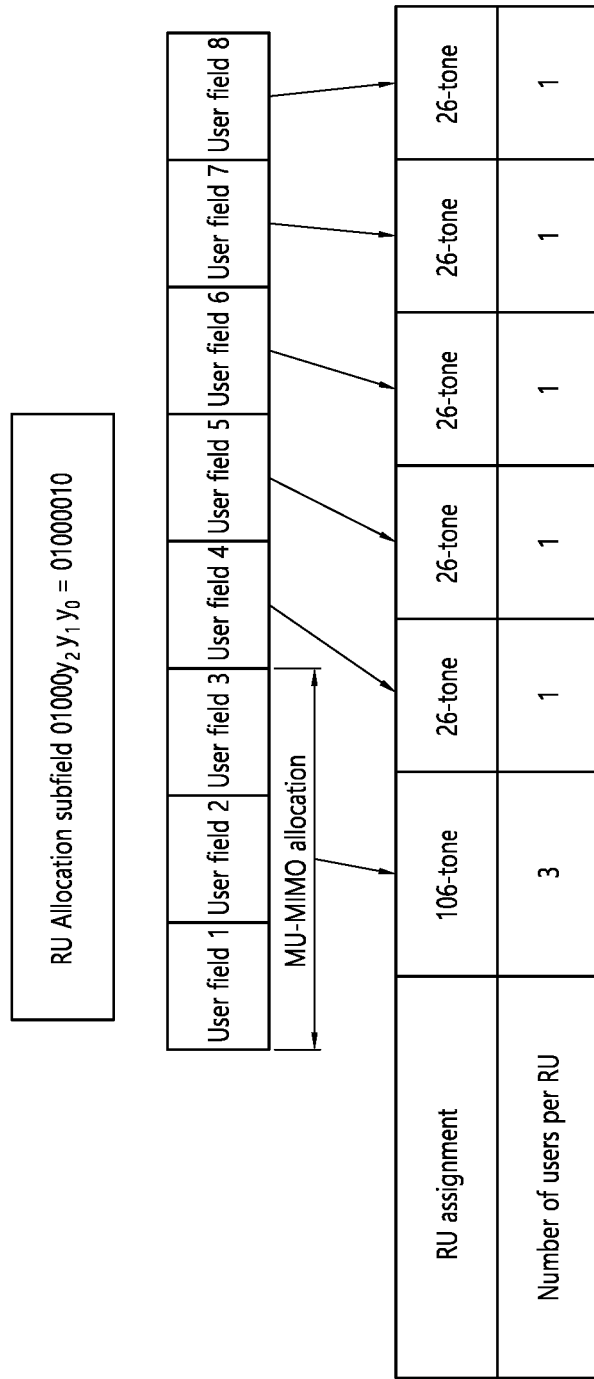
FIG. 9 illustrates an example in which a plurality of user STAs are allocated to the same RU through a MU-MIMO scheme.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration. Specifically, an example of the second bit (i.e., B11-B14) may be as shown in Table 3 and Table 4 below.

TABLE 3

| $N_{user}$ | B3...B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 2 | 0000-0011 | 1-4 | 1 | | | z | z | z | z | 2-5 | 10 |
|   | 0100-0110 | 2-4 | 2 | | | | | | | 4-6 | |
|   | 0111-1000 | 3-4 | 3 | | | | | | | 6-7 | |
|   | 1001 | 4 | 4 | | | | | | | 8 | |
| 3 | 0000-0011 | 1-4 | 1 | 1 | | | | | | 3-6 | 13 |
|   | 0100-0110 | 2-4 | 2 | 1 | | | | | | 5-7 | |
|   | 0111-1000 | 3-4 | 3 | 1 | | | | | | 7-8 | |
|   | 1001-1011 | 2-4 | 2 | 2 | | | | | | 6-8 | |
|   | 1100 | 3 | 3 | 2 | | | | | | 8 | |
| 4 | 0000-0011 | 1-4 | 1 | 1 | 1 | | | | | 4-7 | 11 |
|   | 0100-0110 | 2-4 | 2 | 1 | 1 | | | | | 6-8 | |
|   | 0111 | 3 | 3 | 1 | 1 | | | | | 8 | |
|   | 1000-1001 | 2-3 | 2 | 2 | 1 | | | | | 7-8 | |
|   | 1010 | 2 | 2 | 2 | 2 | | | | | 8 | |

TABLE 4

| $N_{user}$ | B3...B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 5 | 0000-0011 | 1-4 | 1 | 1 | 1 | 1 | | | | 5-8 | 7 |
|   | 0100-0101 | 2-3 | 2 | 1 | 1 | 1 | | | | 7-8 | |
|   | 0110 | 2 | 2 | 2 | 1 | 1 | | | | 8 | |
| 6 | 0000-0010 | 1-3 | 1 | 1 | 1 | 1 | 1 | | | 6-8 | 4 |
|   | 0011 | 2 | 2 | 1 | 1 | 1 | 1 | | | 8 | |
| 7 | 0000-0001 | 1-2 | 1 | 1 | 1 | 1 | 1 | 1 | | 7-8 | 2 |
| 8 | 0000 | 1 | 1 | 1 | 1 | 1 | 1 | 1 | 1 | 8 | 1 |

As shown in Table 3 and/or Table 4, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 9, N user is set to "3". Therefore, values of N_STS[1], N_STS[2], and N_STS[3] may be determined as shown in Table 3. For example, when a value of the second bit (B11-B14) is "0011", it may be set to N_STS[1]=4, N_STS[2]=1, N_STS[3]=1. That is, in the example of FIG. 9, four spatial streams may be allocated to the user field 1, one spatial stream may be allocated to the user field 1, and one spatial stream may be allocated to the user field 3.

As shown in the example of Table 3 and/or Table 4, information (i.e., the second bit, B11-B14) related to the number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., ½, ⅔, ¾, ⅚e, etc.). Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Figure 10:
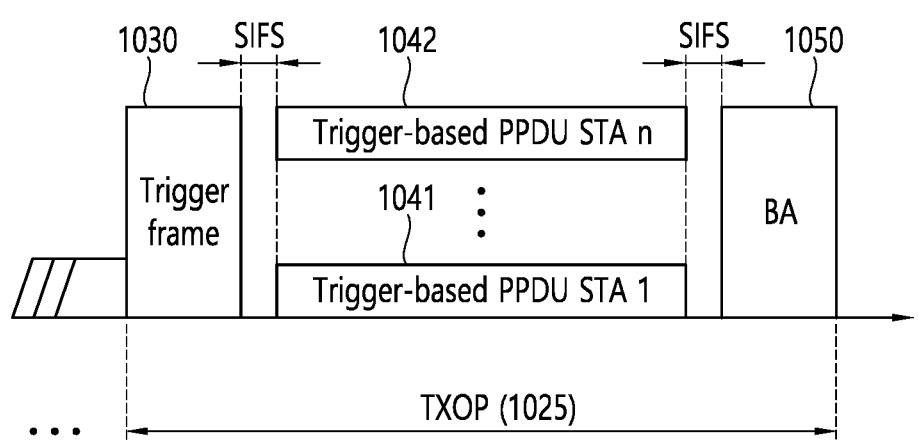
FIG. 10 illustrates an operation based on UL-MU.

FIG. 10 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 11 to FIG. 13. Even if UL-MU communication is used, an orthogonal frequency division multiple access (OFDMA) scheme or a MU MIMO scheme may be used, and the OFDMA and MU-MIMO schemes may be simultaneously used.

Figure 11:
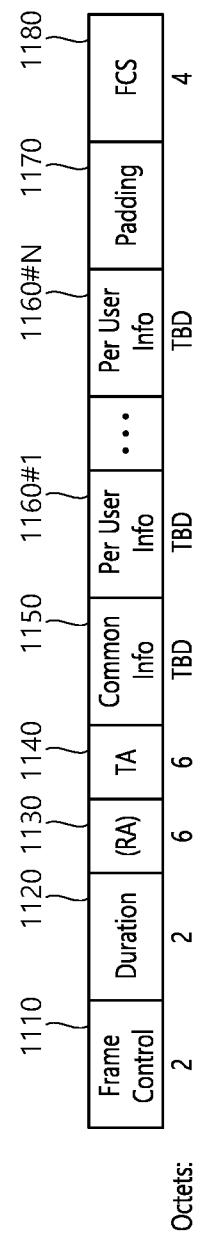
FIG. 11 illustrates an example of a trigger frame.

FIG. 11 illustrates an example of a trigger frame. The trigger frame of FIG. 11 allocates a resource for uplink multiple-user (MU) transmission, and may be transmitted, for example, from an AP. The trigger frame may be configured of a MAC frame, and may be included in a PPDU.

Each field shown in FIG. 11 may be partially omitted, and another field may be added. In addition, a length of each field may be changed to be different from that shown in the figure.

A frame control field 1110 of FIG. 11 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160 #1 to 1160 #N corresponding to the number of receiving STAs which receive the trigger frame of FIG. 11 are preferably included. The per user information field may also be called an "allocation field".

In addition, the trigger frame of FIG. 11 may include a padding field 1170 and a frame check sequence field 1180.

Each of the per user information fields 1160 #1 to 1160 #N shown in FIG. 11 may include a plurality of subfields.

Figure 12:
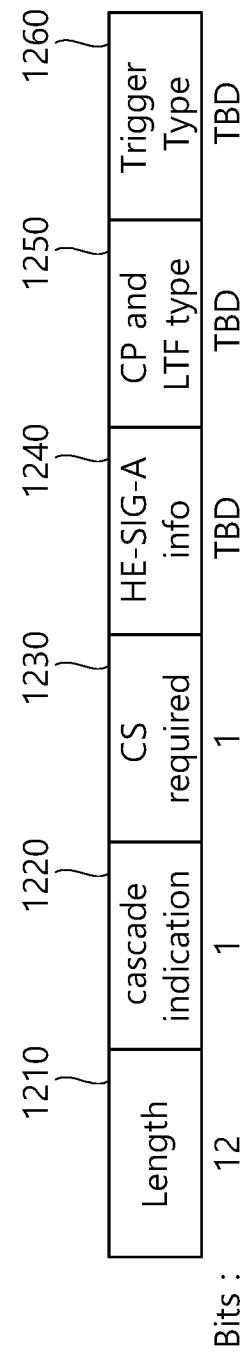
FIG. 12 illustrates an example of a common information field of a trigger frame.

FIG. 12 illustrates an example of a common information field of a trigger frame. A subfield of FIG. 12 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 13:
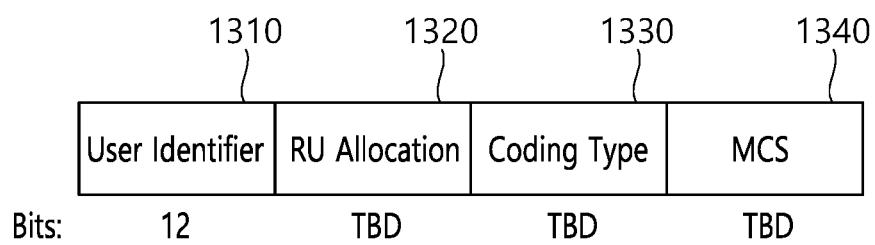
FIG. 13 illustrates an example of a subfield included in a per user information field.

FIG. 13 illustrates an example of a subfield included in a per user information field. A user information field 1300 of FIG. 13 may be understood as any one of the per user information fields 1160 #1 to 1160 #N mentioned above with reference to FIG. 11. A subfield included in the user information field 1300 of FIG. 13 may be partially omitted, and an extra subfield may be added. In addition, a length of each subfield illustrated may be changed.

A user identifier field 1310 of FIG. 13 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320. In this case, the RU indicated by the RU allocation field 1320 may be an RU shown in FIG. 5, FIG. 6, and FIG. 7.

The subfield of FIG. 13 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 13 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 14:
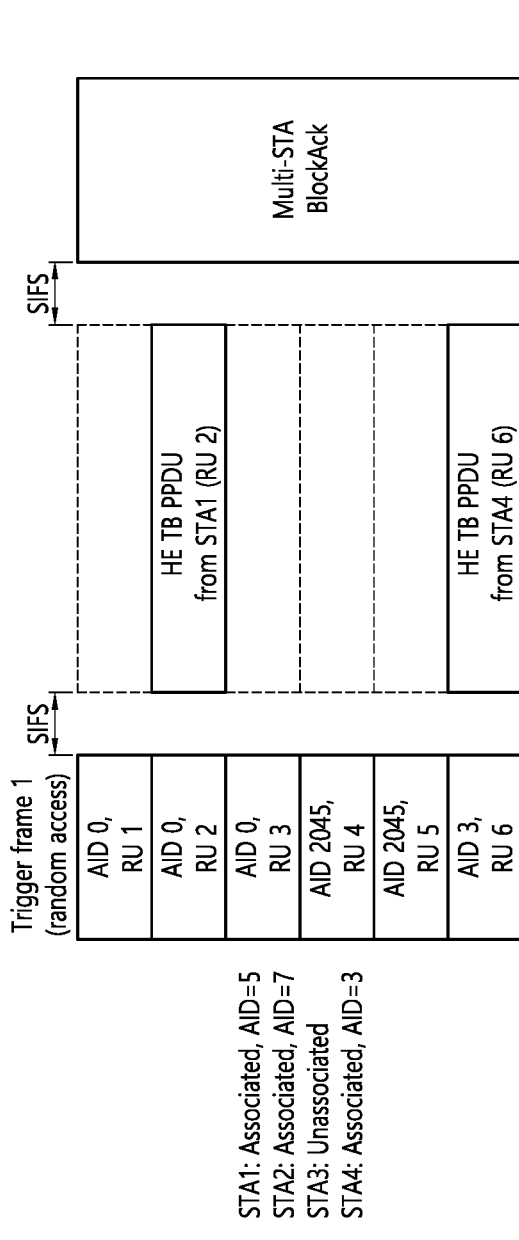
FIG. 14 describes a technical feature of the UORA scheme.

FIG. 14 describes a technical feature of the UORA scheme.

A transmitting STA (e.g., an AP) may allocate six RU resources through a trigger frame as shown in FIG. 14. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 13. Information related to the RU 1 to RU 6 may be included, for example, in the RU allocation field 1320 of FIG. 13. AID=0 may imply a UORA resource for an associated STA, and AID=2045 may imply a UORA resource for an un-associated STA. Accordingly, the 1st to 3rd RU resources of FIG. 14 may be used as a UORA resource for the associated STA, the 4th and 5th RU resources of FIG. 14 may be used as a UORA resource for the un-associated STA, and the 6th RU resource of FIG. 14 may be used as a typical resource for UL MU.

In the example of FIG. 14, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 14, since an AID (e.g., AID=3) of the STA4 is included in a trigger frame, a resource of the RU 6 is allocated without backoff.

Specifically, since the STA1 of FIG. 14 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 14 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 14 is an un-associated STA, the total number of eligible RA RUs for the STA3 is 2 (RU 4, RU 5), and thus the STA3 decreases the OBO counter by 2 but the OBO counter is greater than 0.

Figure 15:
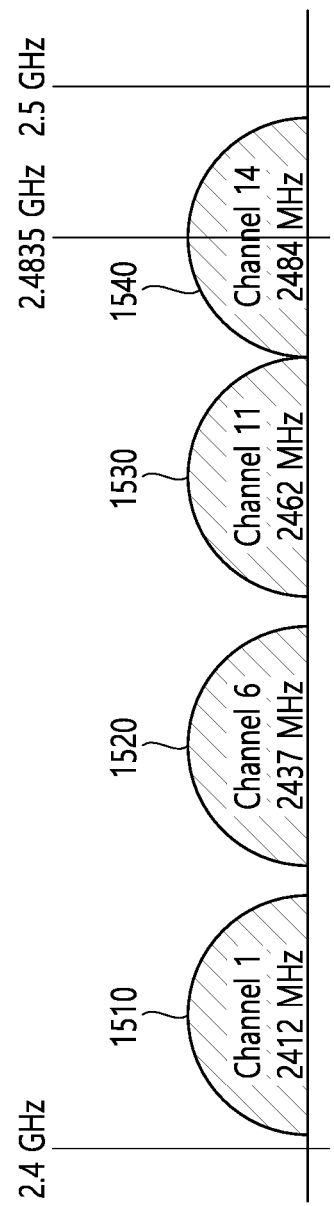
FIG. 15 illustrates an example of a channel used/supported/defined within a 2.4 GHz band.

FIG. 15 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 15 exemplifies 4 channels within a 2.4 GHz band. Each of 1st to 4th frequency domains 1510 to 1540 shown herein may include one channel. For example, the 1st frequency domain 1510 may include a channel 1 (a 20 MHz channel having an index 1). In this case, a center frequency of the channel 1 may be set to 2412 MHz. The 2nd frequency domain 1520 may include a channel 6. In this case, a center frequency of the channel 6 may be set to 2437 MHz. The 3rd frequency domain 1530 may include a channel 11. In this case, a center frequency of the channel 11 may be set to 2462 MHz. The 4th frequency domain 1540 may include a channel 14. In this case, a center frequency of the channel 14 may be set to 2484 MHz.

Figure 16:
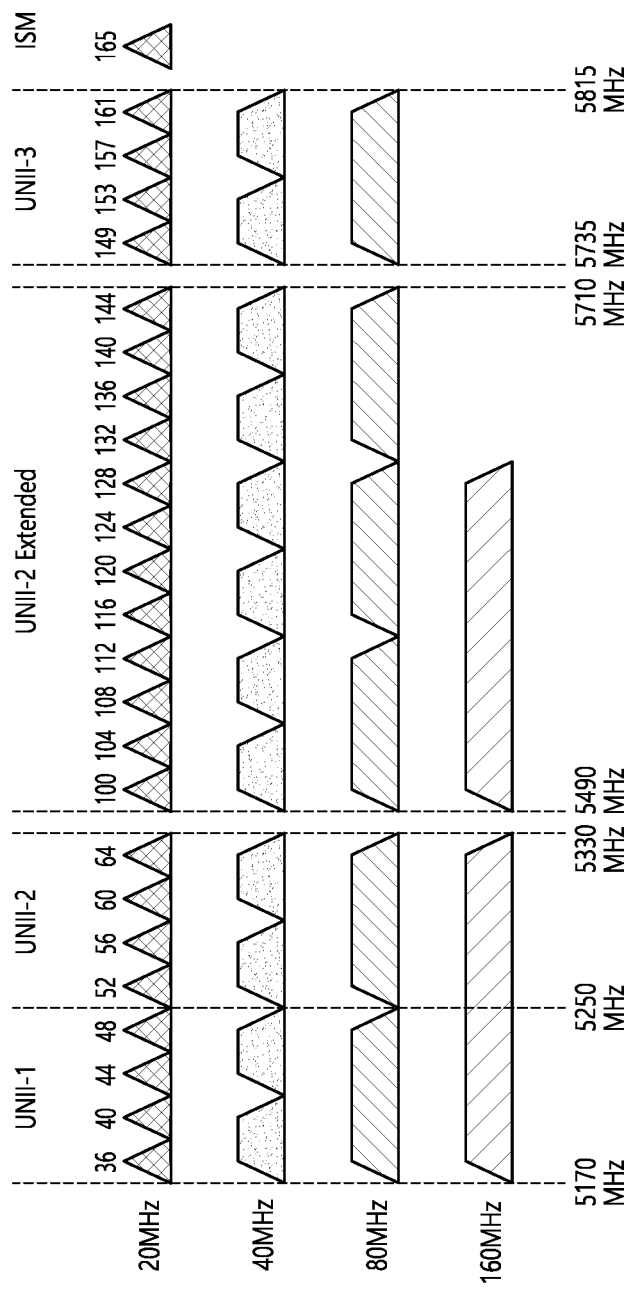
FIG. 16 illustrates an example of a channel used/supported/defined within a 5 GHz band.

FIG. 16 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 16 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2 Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 17:
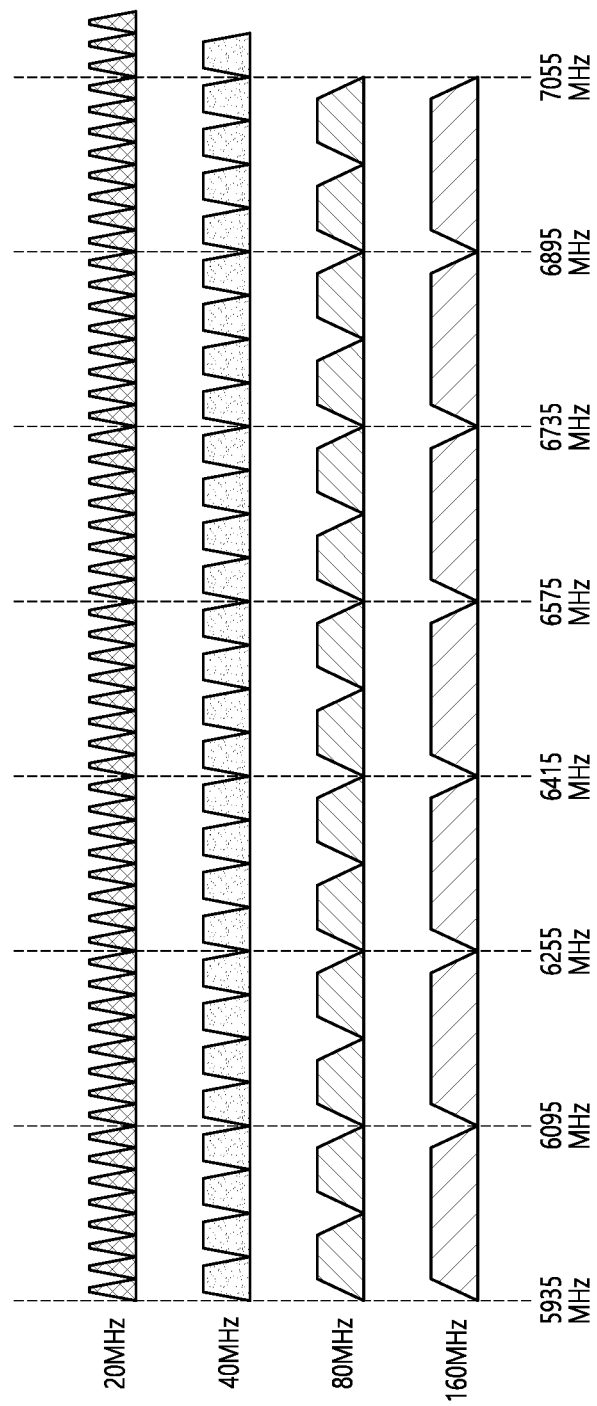
FIG. 17 illustrates an example of a channel used/supported/defined within a 6 GHz band.

FIG. 17 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 17 may be changed.

For example, the 20 MHz channel of FIG. 17 may be defined starting from 5.940 GHz. Specifically, among 20 MHz channels of FIG. 17, the leftmost channel may have an index 1 (or a channel index, a channel number, etc.), and 5.945 GHz may be assigned as a center frequency. That is, a center frequency of a channel of an index N may be determined as (5.940+0.005*N) GHz.

Accordingly, an index (or channel number) of the 2 MHz channel of FIG. 17 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N) GHz rule, an index of the 40 MHz channel of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 17, a 240 MHz channel or a 320 MHz channel may be additionally added.

Hereinafter, a PPDU transmitted/received in a STA of the present specification will be described.

Figure 18:
FIG. 18 illustrates an example of a PPDU used in the present specification.

FIG. 18 illustrates an example of a PPDU used in the present specification.

The PPDU of FIG. 18 may be referred to as various terms, such as EHT PPDU, transmitting PPDU, receiving PPDU, first type or Nth type PPDU, and so on. For example, in the present specification, PPDU or EHT PPDU may be referred to by using various terms, such as transmission PPDU, reception PPDU, first type or Nth type PPDU, and so on. Additionally, the EHT PPDU may be used in an EHT system and/or a new WLAN system, which is an enhanced version of the EHT system.

The PPDU of FIG. 18 may represent part or all of a PPDU type that is used in an EHT system. For example, the example of FIG. 18 may be used for both single-user (SU) mode and multi-user (MU) mode, or may be used only for the SU mode, or may be used only for the MU mode. For example, in the EHT system, a trigger-based (TB) PPDU may be separately defined or may be configured based on an example of FIG. 18. A trigger frame and UL-MU operations that are started by the trigger frame (e.g., transmitting operations of the TB PPDU), which are described by at least one of FIG. 10 to FIG. 14, may be directly applied to the EHT system without modification.

In FIG. 18, L-STF to EHT-LTF may be referred to as a preamble or physical preamble, and the L-STF to EHT-LTF may be generated/transmitted/received/obtained/decoded in a physical layer.

Subcarrier spacing of the L-LTF, L-STF, L-SIG, RL-SIG, U-SIG, and EHT-SIG fields of FIG. 18 may be determined as 312.5 kHz, and subcarrier spacing of the EHT-STF, EHT-LTF, Data fields may be determined as 78.125 kHz. That is, tone indexes (or subcarrier indexes) of the L-STF, L-LTF, L-SIG, RL-SIG, U-SIG, and EHT-SIG fields may be indicated in 312.5 kHz units, and tone indexes (or subcarrier indexes) of the EHT-STF, EHT-LTF, Data fields may be indicated in 78.125 kHz units.

In the PPDU of FIG. 18, L-LTF and L-STF may be the same as the fields of the prior art (or related art).

The L-SIG field of FIG. 18 may, for example, include 24 bits of bit information. For example, the 24-bit information may include a 4-bit Rate field, 1 Reserved bit, a 12-bit Length field, 1 Parity bit, and 6 Tail bits. For example, the 12-bit Length field may include information related to a PPDU length or time duration. For example, a value of the 12-bit Length field may be determined based on a type of the PPDU. For example, in case the PPDU is a non-HT PPDU, an HT PPDU, a VHT PPDU, or an EHT PPDU, the value of the Length field may be determined as a multiple of 3. For example, in case the PPDU is an HE PPDU, the value of the Length field may be determined as "a multiple of 3+1" or "a multiple of 3+2". In other words, a value of the Length field for a non-HT PPDU, an HT PPDU, a VHT PPDU, or an EHT PPDU may be determined as a multiple of 3, and a value of the Length field for an HE PPDU may be determined as "a multiple of 3+1" or "a multiple of 3+2".

For example, a transmitting STA may apply BCC encoding, which is based on a ½-code rate for 24-bit information of the L-SIG field. Afterwards, the transmitting STA may obtain 48 bits of BCC encoding bits. Then, BPSK modulation may be applied to the 48 encoding bits so as to generate 48 BPSK symbols. The transmitting STA may map the 48 BPSK symbols to positions excluding a pilot subcarrier {Subcarrier indexes −21, −7, +7, +21} and a DC subcarrier {Subcarrier index 0}. As a result, the 48 BPSK symbols may be mapped to subcarrier indexes −26 to −22, −20 to −8, −6 to −1, +1 to +6, +8 to +20, and +22 to +26. The transmitting STA may additionally map a signal of {−1, −1, −1, 1} to subcarrier indexes {−28, −27, +27, +28}. The aforementioned signal may be used for channel estimation for a frequency domain corresponding to {−28, −27, +27, +28}.

The transmitting STA may generate an RL-SIG, which is generated identically as the L-SIG. The receiving STA may know that the reception PPDU is an HE PPDU or EHT PPDU based on the presence (or existence) of an RL-SIG.

A Universal SIG (U-SIG) may be inserted after the RL-SIG of FIG. 18. The U-SIG may also be referred to by using various terms, such as a first SIG field, a first SIG, a first-type SIG, a control signal, a control signal field, a first (type) control signal, and so on.

The U-SIG may include N-bit information and may also include information for identifying the EHT PPDU type. For example, the U-SIG may be configured based on 2 symbols (e.g., two contiguous OFDM symbols). Each symbol (e.g., OFDM symbol) for the U-SIG may have a duration of 4 us. Each symbol of the U-SIG may be used for transmitting 26-bit information. For example, each symbol of the U-SIG may be transmitted/received based on 52 data tones and 4 pilot tones.

For example, A-bit information (e.g., 52 un-coded bits) may be transmitted through the U-SIG (or U-SIG field), and a first symbol of the U-SIG may transmit first X-bit information (e.g., 26 un-coded bits) among the total of A bits of the corresponding information, and a second symbol of the U-SIG may transmit remaining Y-bit information (e.g., 26 un-coded bits) of the A-bit information. For example, the transmitting STA may obtain 26 un-coded bits that are included in each U-SIG symbol. The transmitting STA may perform convolutional encoding (i.e., BCC encoding) based on a rate of R=½ so as to generate 52-coded bits, and, then, the transmitting STA may perform interleaving on the 52-coded bits. The transmitting STA may perform BPSK modulation on the interleaved 52-coded bits, so as to generate 52 BPSK symbols that are allocated to each U-SIG symbol. One U-SIG symbol may be transmitted based on 56 tones (subcarriers) starting from subcarrier index −28 to subcarrier index +28, with the exception for DC index 0. The 52 BPSK symbols that are generated by the transmitting STA may be transmitted based on the remaining tones (subcarriers) excluding the pilot tones −21, −7, +7, +21 tones.

For example, the A-bit information (e.g., 52 un-coded bits) may include a CRC field (e.g., 4-bit length field) and a Tail field (e.g., 6-bit length field). The CRC field and the Tail field may be transmitted through the second symbol of the U-SIG. The CRC field may be generated based on the 26 bits being allocated to the first symbol of the U-SIG and the remaining 16 bits excluding the CRC/Tail fields from the second symbol. And, the CRC field may be generated based on the related art CRC calculation algorithm. Additionally, the Tail field may be used for terminating a trellis of a convolutional decoder and may, for example, be configured as "000000".

The A-bit information (e.g., 52 un-coded bits) being transmitted by the U-SIG (or U-SIG field) may be divided into version-independent bits and version-dependent bits. For example, a size of the version-independent bits may be fixed or variable. For example, the version-independent bits may be allocated only to the first symbol of the U-SIG or may be allocated to both the first and second symbols of the U-SIG. For example, the version-independent bits and the version-dependent bits may be referred to by using various terms, such as a first control bit and a second control bit.

For example, the version-independent bits of the U-SIG may include a 3-bit PHY version identifier. For example, the 3-bit PHY version identifier may include information related to the PHY version of the transmission/reception PPDU. For example, a first value of the 3-bit PHY version identifier may indicate that the transmission/reception PPDU is an EHT PPDU. In other words, when the transmitting STA transmits the EHT PPDU, the transmitting STA may set the 3-bit PHY version identifier to the first value. In other words, based on the PHY version identifier having the first value, the receiving STA may determine that the reception PPDU is an EHT PPDU.

For example, the version-independent bits of the U-SIG may include a 1-bit UL/DL flag field. A first value of the 1-bit UL/DL flag field is related to UL communication, and a second value of the 1-bit UL/DL flag field is related to DL communication.

For example, the version-independent bits of the U-SIG may include information related to the length of a TXOP, and information related to BSS color ID.

For example, in case the EHT PPDU is divided into various types (e.g., EHT PPDU related to SU mode, EHT PPDU related to MU mode, EHT PPDU related to a Trigger Frame, EHT PPDU related to Extended Range transmission, and so on), information related to the EHT PPDU type may be included in the version-dependent bits of the U-SIG.

For example, the U-SIG may include information related to 1) a bandwidth field including information related to a bandwidth, 2) a field including information related to an MCS scheme being applied to the EHT-SIG, 3) an indication field including information related to whether or not a dual subcarrier modulation (DCM) scheme is applied to the EHT-SIG, 4) a field including information related to a number of symbols being used for the EHT-SIG, 5) a field including information related to whether or not the EHT-SIG is generated throughout the whole band, 6) a field including information related to an EHT-LTF/STF type, 7) a field indicating an EHT-LTF length and a CP length.

Preamble puncturing may be applied to the PPDU of FIG. 18. Preamble puncturing means applying puncturing to a partial band (e.g., a Secondary 20 MHz band) of the whole band of a PPDU. For example, when an 80 MHz PPDU is transmitted, the STA may apply puncturing to a secondary 20 MHz band of the 80 MHz band and may transmit the PPDU only through a primary 20 MHz band and a secondary 40 MHz band.

For example, a pattern of preamble puncturing may be preset (or predetermined). For example, when a first puncturing pattern is applied, the puncturing may be applied only for a secondary 20 MHz band within the 80 MHz band. For example, when a second puncturing pattern is applied, the puncturing may be applied to only one of the two secondary 20 MHz bands that are included in the secondary 40 MHz band within the 80 MHz band. For example, when a third puncturing pattern is applied, the puncturing may be applied only to a secondary 20 MHz band that is included in a primary 80 MHz band within a 160 MHz band (or 80+80 MHz band). For example, when a fourth puncturing pattern is applied, and when a primary 40 MHz band that is included in a primary 80 MHz band within a 160 MHz band (or 80+80 MHz band) is present, the puncturing may be applied to at least one 20 MHz channel that does not belong to the primary 40 MHz band.

Information related to the preamble puncturing that is applied to the PPDU may be included in the U-SIG and/or EHT-SIG. For example, a first field of the U-SIG may include information related to a contiguous bandwidth of the PPDU, and a second field of the U-SIG may include information related to preamble puncturing that is applied to the PPDU.

For example, the U-SIG and EHT-SIG may include information related to preamble puncturing based on the following method. When the bandwidth of a PPDU exceeds 80 MHz, the U-SIG may be separately configured in 80 MHz units. For example, when the bandwidth of a PPDU is 160 MHz, a first U-SIG for a first 80 MHz band and a second U-SIG for a second 80 MHz band may be included in the corresponding PPDU. In this case, a first field of the first U-SIG may include information related to the 160 MHz bandwidth, and a second field of the first U-SIG may include information related to preamble puncturing (i.e., information related to a preamble puncturing pattern) that is applied to the first 80 MHz band. Additionally, a first field of the second U-SIG may include information related to the 160 MHz bandwidth, and a second field of the second U-SIG may include information related to preamble puncturing (i.e., information related to a preamble puncturing pattern) that is applied to the second 80 MHz band. Meanwhile, an EHT-SIG that is contiguous to the first U-SIG may include information related to preamble puncturing (i.e., information related to a preamble puncturing pattern) that is applied to the second 80 MHz band, and an EHT-SIG that is contiguous to the second U-SIG may include information related to preamble puncturing (i.e., information related to a preamble puncturing pattern) that is applied to the first 80 MHz band.

Additionally or alternatively, the U-SIG and EHT-SIG may include information related to preamble puncturing based on the following method. The U-SIG may include information related to preamble puncturing (i.e., information related to a preamble puncturing pattern) for all bands. That is, the EHT-SIG may not include information related to preamble puncturing, and only the U-SIG may include information related to preamble puncturing (i.e., information related to a preamble puncturing pattern).

The U-SIG may be configured of 20 MHz units. For example, when an 80 MHz PPDU is configured, the U-SIG may be duplicated. That is, 4 identical U-SIGs may be included in the 80 MHz PPDU. A PPDU that exceeds the 80 MHz bandwidth may include different U-SIGs.

The EHT-SIG of FIG. 18 may include the technical features of an HE-SIG-B, which is indicated in the examples of FIG. 8 to FIG. 9, as they are. The EHT-SIG may also be referred to by using various terms, such as a second SIG field, a second SIG, a second-type SIG, a control signal, a control signal field, a second (type) control signal, and so on.

The EHT-SIG may include N-bit information (e.g., 1-bit information) related to whether an EHT PPDU supports the SU mode or whether an EHT PPDU supports the MU mode.

The EHT-SIG may be configured based on various MCS schemes. As described above, the information related to the MCS scheme being applied to the EHT-SIG may be included in the U-SIG. The EHT-SIG may be configured based on a DCM scheme. For example, among N number of data tones (e.g., 52 data tones) that are allocated for the EHT-SIG, a first modulation scheme may be applied to one half of contiguous tones, and a second modulation scheme may be applied to the remaining half of contiguous tones. That is, the transmitting STA may modulate specific control information to a first symbol based on the first modulation scheme and may allocate the modulated first symbol to one half of contiguous tones. Thereafter, the transmitting STA may modulate the same control information to a second symbol based on the second modulation scheme and may allocated the modulated second symbol to the other half of contiguous tones. As described above, information related to whether or not the DCM scheme is applied to the EHT-SIG (e.g., 1 bit field) may be included in the U-SIG. EHT-STF of FIG. 18 may be used for enhancing automatic gain control estimation in a multiple input multiple output (MIMO) environment or OFDMA environment. And, EHT-LTF of FIG. 18 may be used for estimating a channel in a MIMO environment or OFDMA environment.

The EHT-STF may be set to various types. For example, among the STFs, a first type (i.e., 1×STF) may be generated based on a first type STF sequence in which non-zero coefficients are positioned at 16 subcarrier spacings. An STF signal that is generated based on the first type STF sequence may have a periodicity (or cycle period) of 0.8 μs. And, the signal having the periodicity of 0.8 μs may be repeated 5 times and become a first type STF having a length of 4 μs. For example, among the STFs, a second type (i.e., 2×STF) may be generated based on a second type STF sequence in which non-zero coefficients are positioned at 8 subcarrier spacings. An STF signal that is generated based on the second type STF sequence may have a periodicity (or cycle period) of 1.6 μs. And, the signal having the periodicity of 1.6 μs may be repeated 5 times and become a second type STF having a length of 8 μs. Hereinafter, an example of a sequence (i.e., EHT-STF sequence) for configuring an EHT-STF will be proposed. The following sequence may be modified to various types.

The EHT-STF may be configured based on the following M sequence.

$$M = \{-1,-1,-1,1,1,1,-1,1,1,1,-1,1,1,-1,1\} \quad \text{<Equation 1>}$$

An EHT-STF for a 20 MHz PPDU may be configured based on the following equation. The example shown below may be a first type (i.e., 1×STF) sequence. For example, the first type sequence may be included in an EHT-PPDU and not a trigger-based (TB) PPDU. In the following equation, (a:b:c) may denote durations being defined at b tone spacings (i.e., subcarrier spacings) starting from an a tone index (i.e., subcarrier index) to a c tone index. For example, Equation 2 shown below may represent a sequence that is defined at 16 tone spacings starting from tone index −112 to tone index 112. For an EHT-STF, since subcarrier spacing of 78.125 kHz is applied, the 16 tone spacings may mean that EHT-STF coefficients (or elements) are positioned at 78.125*16=1250 kHz intervals (or spacings). Additionally, *means multiplication (i.e., 'multiplied by'), and sqrt( ) means square root.

$$\text{EHT-STF}(-112:16:112) = \{M\}*(1+j)/\text{sqrt}(2)$$

$$\text{EHT-STF}(0) = 0 \quad \text{<Equation 2>}$$

An EHT-STF for a 40 MHz PPDU may be configured based on the following equation. The example shown below may be a first type (i.e., 1×STF) sequence.

$$\text{EHT-STF}(-240:16:240) = \{M,0,-M\}*(1+j)/\text{sqrt}(2) \quad \text{<Equation 3>}$$

An EHT-STF for an 80 MHz PPDU may be configured based on the following equation. The example shown below may be a first type (i.e., 1×STF) sequence.

$$\text{EHT-STF}(-496:16:496) = \{M,1,-M,0,-M,1,-M\}*(1+j)/\text{sqrt}(2) \quad \text{<Equation 4>}$$

An EHT-STF for a 160 MHz PPDU may be configured based on the following equation. The example shown below may be a first type (i.e., 1×STF) sequence.

$$\text{EHT-STF}(-1008:16:1008) = \{M,1,-M,0,-M,1,-M,0,-M,-1,M,0,-M,1,-M\}*(1+j)/\text{sqrt}(2) \quad \text{<Equation 5>}$$

In the EHT-STF for an 80+80 MHz PPDU, a sequence for a lower 80 MHz may be the same as Equation 4. And, in the EHT-STF for the 80+80 MHz PPDU, a sequence for a higher 80 MHz may be configured based on the following equation.

EHT-STF(−496:16:496)={−$M$,−1,$M$,0,−$M$,1,−$M$}*
(1+$j$)/sqrt(2)  <Equation 6>

Hereinafter, Equation 7 to Equation 11 relate to examples of a second type (i.e., 2×STF) sequence.

EHT-STF(−120: 8: 120)={$M$,0,−$M$}*(1+$j$)/sqrt(2)  <Equation 7>

An EHT-STF for a 40 MHz PPDU may be configured based on the following equation.

EHT-STF(−248:8:248)={$M$,−1,−$M$,0,$M$,−1,$M$}*(1+$j$)/sqrt(2)

EHT-STF(−248)=0

EHT-STF(248)=0  <Equation 8>

An EHT-STF for an 80 MHz PPDU may be configured based on the following equation.

EHT-STF(−504:8:504)={$M$,−1,$M$,−1,−$M$,−1,$M$,0,−$M$,1,$M$,1,−$M$,1,−$M$}*(1+$j$)/sqrt(2)  <Equation 9>

An EHT-STF for a 160 MHz PPDU may be configured based on the following equation.

EHT-STF(−1016:16:1016)={$M$,−1,$M$,−1,−$M$,−1,$M$,0,−$M$,1,$M$,1,−$M$,0,−$M$,1,−$M$,1,$M$,1,−$M$,0,−$M$,1,$M$,1,−$M$,1,−$M$}*(1+$j$)/sqrt(2)

EHT-STF(−8)=0,EHT-STF(8)=0,

EHT-STF(−1016)=0,EHT-STF(1016)=0  <Equation 10>

In the EHT-STF for an 80+80 MHz PPDU, a sequence for a lower 80 MHz may be the same as Equation 9. And, in the EHT-STF for the 80+80 MHz PPDU, a sequence for a higher 80 MHz may be configured based on the following equation.

EHT-STF(−504:8:504)={−$M$, 1, −$M$, 1, $M$, 1, −$M$, 0, −$M$, 1, $M$,1,−$M$,1,−$M$}*(1+$j$)/sqrt(2)

EHT-STF(−504)=0,

EHT-STF(504)=0  <Equation 11>

An EHT-LTF may have first, second, and third types (i.e., 1×, 2×, 4×LTF). For example, the first/second/third type LTF may be generated based on an LTF sequence in which non-zero coefficients are positioned at 4/2/1 subcarrier spacing(s). The first/second/third type LTF may have a time length of 3.2/6.4/12.8 μs. Additionally, various lengths of GI (e.g., 0.8/1/6/3.2 μs) may be applied to the first/second/third type LTF.

Information related to an STF and/or LTF type (including information related to GI that is applied to the LTF) may be included in an SIG A field and/or SIG B field of FIG. 18.

The PPDU (i.e., EHT-PPDU) of FIG. 18 may be configured based on examples of FIG. 5 and FIG. 6.

For example, an EHT PPDU being transmitted over a 20 MHz band, i.e., a 20 MHz EHT PPDU, may be configured based on RUs of FIG. 5. That is, the location of an RU of the EHT-STF, EHT-LTF, data field being included in the EHT PPDU may be determined as shown in FIG. 5.

An EHT PPDU being transmitted over a 40 MHz band, i.e., a 40 MHz EHT PPDU, may be configured based on RUs of FIG. 6. That is, the location of an RU of the EHT-STF, EHT-LTF, data field being included in the EHT PPDU may be determined as shown in FIG. 6.

Since the RU location of FIG. 6 corresponds to 40 MHz, if the pattern of FIG. 6 is repeated two times, a tone plan for 80 MHz may be determined. That is, an 80 MHz EHT PPDU may be transmitted based on a new tone plan in which the RU of FIG. 6 is repeated two times, and not the RU of FIG. 7.

In case the pattern of FIG. 6 is repeated two times, 23 tones (i.e., 11 guard tones+12 guard tones) may be configured in a DC region. That is, a tone plan for an 80 MHz EHT PPDU being allocated based on OFDMA may have 23 DC tones. On the other hand, an 80 MHz EHT PPDU being allocated based on non-OFDMA (i.e., non-OFDMA full Bandwidth 80 MHz PPDU) may be configured based on 996 RUs and may include 5 DC tones, 12 left-guard tones, and 11 right-guard tones.

Atone plan for 160/240/320 MHz may be configured to have a format of repeating the pattern of FIG. 6 multiple times.

The PPDU of FIG. 18 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "module 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 18. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "module 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 18. The PPDU of FIG. 18 may be used to transmit/receive frames of various types. For example, the PPDU of FIG. 18 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 18 may be used for a management frame. An example of the management frame may include a beacon frame, a (re-)association request frame, a (re-)association response frame, a probe request frame, and a probe response frame. For example, the PPDU of FIG. 18 may be used for a data frame. For example, the PPDU of FIG. 18 may be used to simultaneously transmit at least two or more of the control frame, the management frame, and the data frame.

1. Tone Plan in 802.11Ax WLAN System

In the present specification, a tone plan relates to a rule for determining a size of a resource unit (RU) and/or a location of the RU. Hereinafter, a PPDU based on the IEEE 802.11ax standard, that is, a tone plan applied to an HE PPDU, will be described. In other words, hereinafter, the RU size and RU location applied to the HE PPDU are described, and control information related to the RU applied to the HE PPDU is described.

In the present specification, control information related to an RU (or control information related to a tone plan) may include a size and location of the RU, information of a user STA allocated to a specific RU, a frequency bandwidth for a PPDU in which the RU is included, and/or control information on a modulation scheme applied to the specific RU. The control information related to the RU may be included in an SIG field. For example, in the IEEE 802.11ax standard, the control information related to the RU is included in an HE-SIG-B field. That is, in a process of generating a TX PPDU, a transmitting STA may allow the control information on the RU included in the PPDU to be included in the HE-SIG-B field. In addition, a receiving STA may receive an HE-SIG-B included in an RX PPDU and obtain control information included in the HE-SIG-B, so as to determine whether there is an RU allocated to the receiving STA and decode the allocated RU, based on the HE-SIG-B.

In the IEEE 802.11ax standard, HE-STF, HE-LTF, and data fields may be configured in unit of RUs. That is, when a first RU for a first receiving STA is configured, STF/LTF/data fields for the first receiving STA may be transmitted/received through the first RU.

In the IEEE 802.11ax standard, a PPDU (i.e., SU PPDU) for one receiving STA and a PPDU (i.e., MU PPDU) for a plurality of receiving STAs are separately defined, and respective tone plans are separately defined. Specific details will be described below.

The RU defined in 11ax may include a plurality of subcarriers. For example, when the RU includes N subcarriers, it may be expressed by an N-tone RU or N RUs. A location of a specific RU may be expressed by a subcarrier index. The subcarrier index may be defined in unit of a subcarrier frequency spacing. In the 11ax standard, the subcarrier frequency spacing is 312.5 kHz or 78.125 kHz, and the subcarrier frequency spacing for the RU is 78.125 kHz. That is, a subcarrier index+1 for the RU may mean a location which is more increased by 78.125 kHz than a DC tone, and a subcarrier index −1 for the RU may mean a location which is more decreased by 78.125 kHz than the DC tone. For example, when the location of the specific RU is expressed by [−121:−96], the RU may be located in a region from a subcarrier index −121 to a subcarrier index −96. As a result, the RU may include 26 subcarriers.

The N-tone RU may include a pre-set pilot tone.

2. Null Subcarrier and Pilot Subcarrier

A subcarrier and resource allocation in the 802.11ax system will be described.

An OFDM symbol consists of subcarriers, and the number of subcarriers may function as a bandwidth of a PPDU. In the WLAN 802.11 system, a data subcarrier used for data transmission, a pilot subcarrier used for phase information and parameter tacking, and an unused subcarrier not used for data transmission and pilot transmission are defined.

An HE MU PPDU which uses OFDMA transmission may be transmitted by mixing a 26-tone RU, a 52-tone RU, a 106-tone RU, a 242-tone RU, a 484-tone RU, and a 996-tone RU.

Herein, the 26-tone RU consists of 24 data subcarriers and 2 pilot subcarriers. The 52-tone RU consists of 48 data subcarriers and 4 pilot subcarriers. The 106-tone RU consists of 102 data subcarriers and 4 pilot subcarriers. The 242-tone RU consists of 234 data subcarriers and 8 pilot subcarriers. The 484-tone RU consists of 468 data subcarriers and 16 pilot subcarriers. The 996-tone RU consists of 980 data subcarriers and 16 pilot subcarriers.

1) Null Subcarrier

As shown in FIG. 5 to FIG. 7, a null subcarrier exists between 26-tone RU, 52-tone RU, and 106-tone RU locations. The null subcarrier is located near a DC or edge tone to protect against transmit center frequency leakage, receiver DC offset, and interference from an adjacent RU. The null subcarrier has zero energy. An index of the null subcarrier is listed as follows.

| Channel Width | RU Size | Null Subcarrier Indices |
|---|---|---|
| 20 MHz | 26, 52 | ±69, ±122 |
| | 106 | none |
| | 242 | none |
| 40 MHz | 26, 52 | ±3, ±56, ±57, ±110, ±137, ±190, ±191, ±244 |
| | 106 | ±3, ±110, ±137, ±244 |
| | 242, 484 | none |
| 80 MHz | 26, 52 | ±17, ±70, ±71, ±124, ±151, ±204, ±205, ±258, ±259, ±312, ±313, ±366, ±393, ±446, ±447, ±500 |
| | 106 | ±17, ±124, ±151, ±258, ±259, ±366, ±393, ±500 |
| | 242, 484 | none |
| | 996 | none |
| 160 MHz | 26, 52, 106 | {null subcarrier indices in 80 MHz − 512, null subcarrier indices in 80 MHz + 512} |
| | 242, 484, 996, 2 × 996 | none |

A null subcarrier location for each 80 MHz frequency segment of the 80+80 MHz HE PPDU shall follow the location of the 80 MHz HE PPDU.

2) Pilot Subcarrier

If a pilot subcarrier exists in an HE-LTF field of HE SU PPDU, HE MU PPDU, HE ER SU PPDU, or HE TB PPDU, a location of a pilot sequence in an HE-LTF field and data field may be the same as a location of 4×HE-LTF. In 1×HE-LTF, the location of the pilot sequence in HE-LTF is configured based on pilot subcarriers for a data field multiplied 4 times. If the pilot subcarrier exists in 2×HE-LTF, the location of the pilot subcarrier shall be the same as a location of a pilot in a 4×data symbol. All pilot subcarriers are located at even-numbered indices listed below.

| Channel Width | RU Size | Pilot Subcarrier Indices |
|---|---|---|
| 20 MHz | 26, 52 | ±10, ±22, ±36, ±48, ±62, ±76, ±90, ±102, ±116 |
|  | 106, 242 | ±22, ±48, ±90, ±116 |
| 40 MHz | 26, 52 | ±10, ±24, ±36, ±50, ±64, ±78, ±90, ±104, ±116, ±130, ±144, ±158, ±170, ±184, ±198, ±212, ±224, ±238 |
|  | 106, 242, 484 | ±10, ±36, ±78, ±104, ±144, ±170, ±212, ±238 |
| 80 MHz | 26, 52 | ±10, ±24, ±38, ±50, ±64, ±78, ±92, ±104, ±118, ±130, ±144, ±158, ±172, ±184, ±198, ±212, ±226, ±238, ±252, ±266, ±280, ±292, ±306, ±320, ±334, ±346, ±360, ±372, ±386, ±400, ±414, ±426, ±440, ±454, ±468, ±480, ±494 |
|  | 106, 242, 484 | ±24, ±50, ±92, ±118, ±158, ±184, ±226, ±252, ±266, ±292, ±334, ±360, ±400, ±426, ±468, ±494 |
|  | 996 | ±24, ±92, ±158, ±226, ±266, ±334, ±400, ±468 |
| 160 MHz | 26, 52, 106, 242, 484 | {pilot subcarrier indices in 80 MHz − 512, pilot subcarrier indices in 80 MHz + 512} |
|  | 996 | {for the lower 80 MHz, pilot subcarrier indices in 80 MHz − 512, for the upper 80 MHz, pilot subcarrier indices in 80 MHz + 512} |

At 160 MHz or 80+80 MHz, the location of the pilot subcarrier shall use the same 80 MHz location for 80 MHz of both sides.

3. HE Transmit Procedure and Low Density Parity Check (LDPC) Tone Mapping

Figure 21:
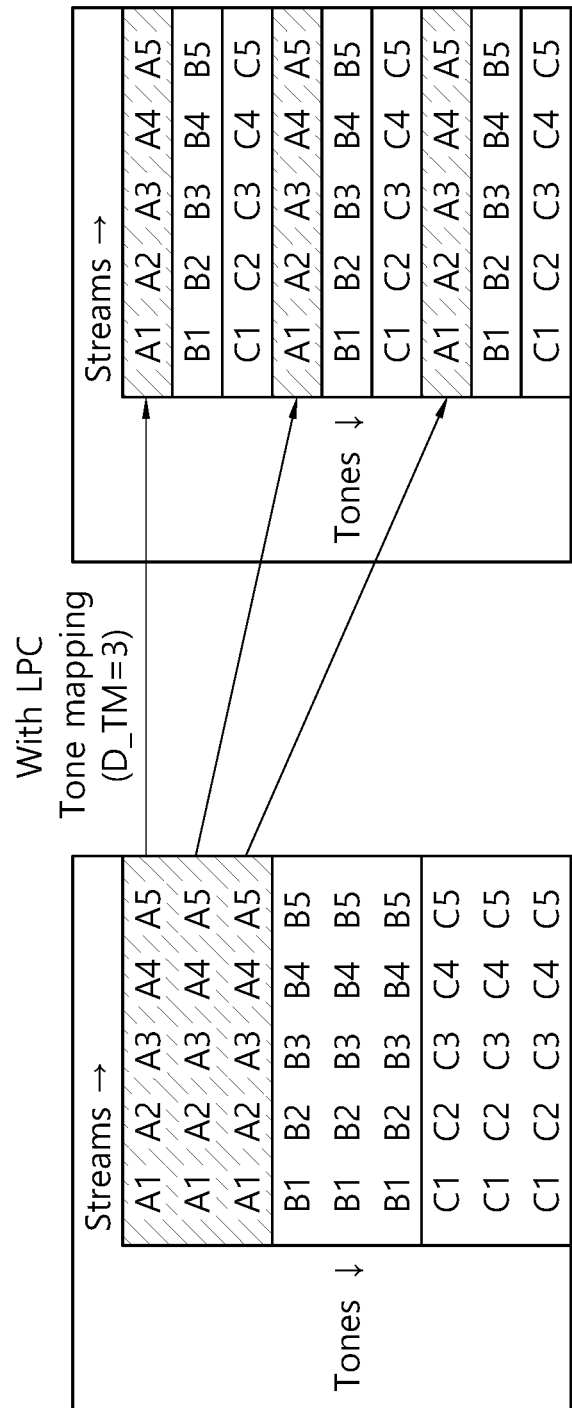
FIG. 21 shows an example of an LDPC tone mapping operation.

In an 802.11ax wireless local area network (WLAN) system, transmission procedures (or transmit procedures) in a physical layer (PHY) include a procedure for an HE Single User (SU) PPDU, a transmission procedure for an HE extended range (ER) SU PPDU, a transmission procedure for an HE Multi User (MU) PPDU, and a transmission procedure for an HE trigger-based (TB) PPDU. A FORMAT field of a PHY-TXSTART.request(TXVECTOR) may be the same as HE_SU, HE_MU, HE_ER_SU or HE_TB. The transmission procedures do not describe operations of optional features, such as Dual Carrier Modulation (DCM). Among the diverse transmission procedures, FIG. 21 shows only the PHY transmission procedure for the HE SU PPDU.

Figure 19:
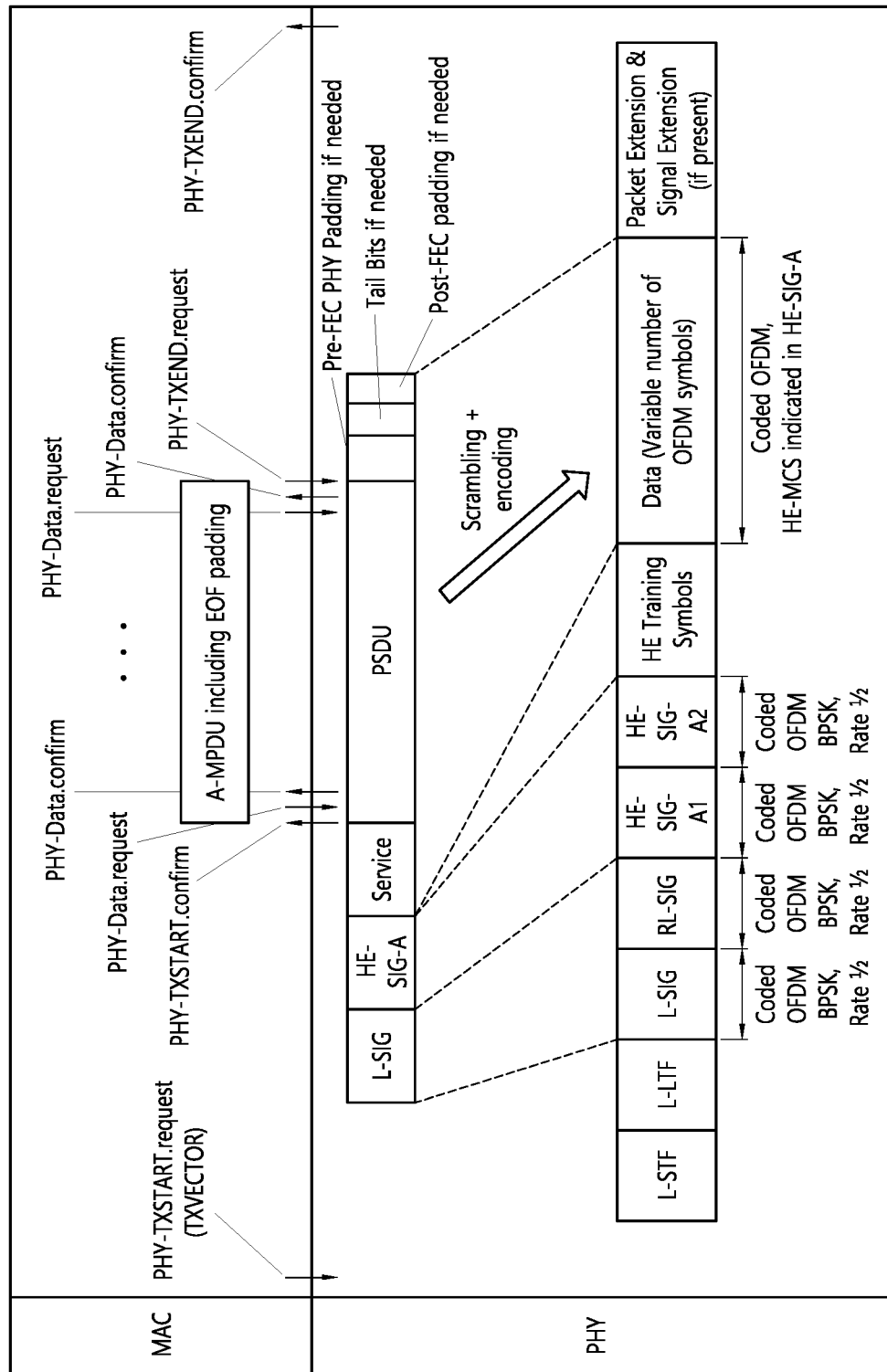
FIG. 19 shows an example of a PHY transmission procedure for HE SU PPDU.

FIG. 19 shows an example of a PHY transmission procedure for HE SU PPDU.

In order to transmit data, the MAC generates a PHY-TXSTART.request primitive, which causes a PHY entity to enter a transmit state. Additionally, the PHY is configured to operate at an appropriate frequency via station management through PLME. Other transmission parameters, such as HE-MCS, coding type, and transmission power are configured through a PHY-SAP by using a PHY-TXSTART.request (TXVECTOR) primitive. After transmitting a PPDU that transfers (or communicates) a trigger frame, a MAC sublayer may issue a PHY-TRIGGER.request together with a TRIGVECTOR parameter, which provides information needed for demodulating an HE TB PPDU response that is expected of the PHY entity.

The PHY indicates statuses of a primary channel and another channel via PHY-CCA.indication. The transmission of a PPDU should be started by the PHY after receiving the PHY-TXSTART.request(TXVECTOR) primitive.

After a PHY preamble transmission is started, the PHY entity immediately initiates data scrambling and data encoding. An encoding method for the data field is based on FEC_CODING, CH_BANDWIDTH, NUM_STS, STBC, MCS, and NUM_USERS parameters of the TXVECTOR.

A SERVICE field and a PSDU are encoded in a transmitter (or transmitting device) block diagram, which will be described later on. Data should be exchanged between the MAC and the PHY through a PHY-DATA.request(DATA) primitive that is issued by the MAC and PHY-DATA.confirm primitives that are issued by the PHY. A PHY padding bit is applied to the PSDU in order to set a number of bits of the coded PSDU to be an integer multiple of a number of coded bits per OFDM symbol.

The transmission is swiftly (or quickly) ended by the MAC through a PHY-TXEND.request primitive. The PSDU transmission is ended upon receiving a PHY-TXEND.request primitive. Each PHY-TXEND.request primitive mat notify its reception together with a PHY-TXEND.confirm primitive from the PHY.

A packet extension and/or a signal extension may exist in a PPDU. A PHY-TXEND.confirm primitive is generated at an actual end time of a most recent PPDU, an end time of a packet extension, and an end time of a signal extension.

In the PHY, a Guard Interval (GI) that is indicated together with a GI duration in a GI_TYPE parameter of the TXVECTOR is inserted in all data OFDM symbols as a solution for a delay spread.

If the PPDU transmission is completed, the PHY entity enters a receive state.

Figure 20:
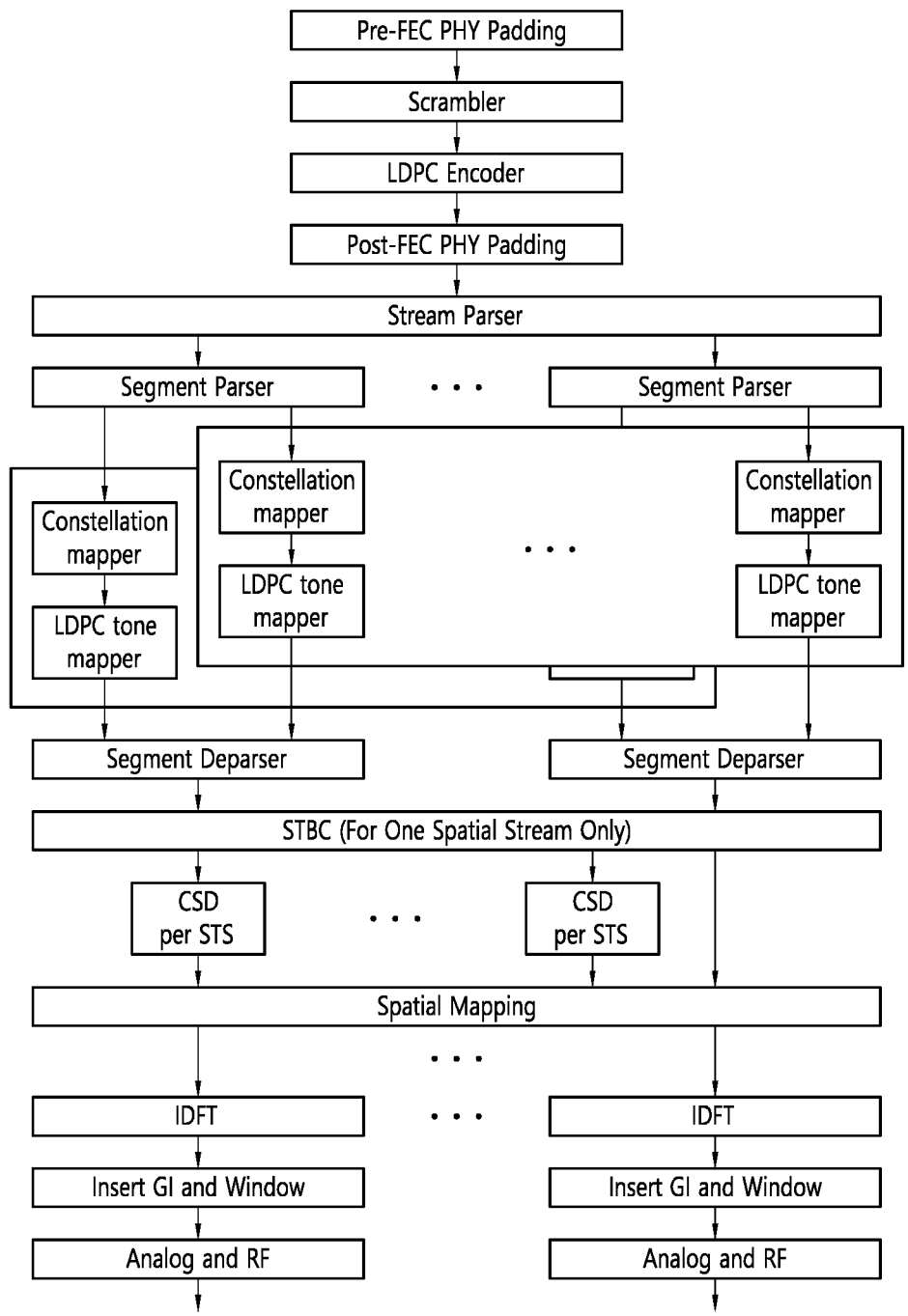
FIG. 20 shows an example of a block diagram of a transmitting device for generating each field of an HE PPDU.

FIG. 20 shows an example of a block diagram of a transmitting device for generating each field of an HE PPDU.

Figure 22:
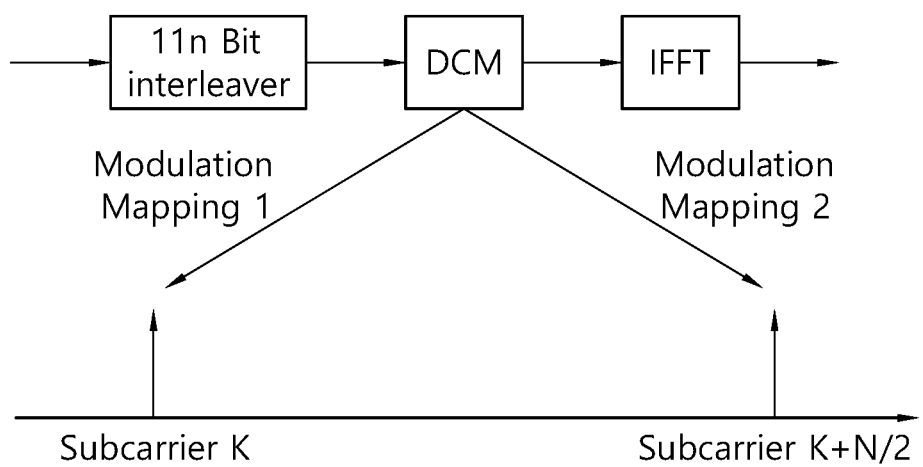
FIG. 22 shows an example of a DCM method being applied to data.

In order to generate each field of the HE PPDU, the following block diagrams are used.
 a) pre-FEC PHY padding
 b) Scrambler
 c) FEC (BCC or LDPC) encoders
 d) post-FEC PHY padding
 e) Stream parser
 f) Segment parser (for contiguous 160 MHz and non-contiguous 80+80 MHz transmission)
 g) BCC interleaver
 h) Constellation mapper
 i) DCM tone mapper
 j) Pilot insertion
 k) Replication over multiple 20 MHz (for BW>20 MHz)
 l) Multiplication by $1^{st}$ column of PHE-LTF
 m) LDPC tone mapper
 n) Segment deparser
 o) Space time block code (STBC) encoder for one spatial stream
 p) Cyclic shift diversity (CSD) per STS insertion
 q) Spatial mapper
 r) Frequency mapping
 s) Inverse discrete Fourier transform (IDFT)
 f) Cyclic shift diversity (CSD) per chain insertion u) Guard interval (GI) insertion
v) Windowing FIG. 20 shows a block diagram of a transmitting device (or transmitter block diagram) that is used for generating a data field of an HE Single User (SU) PPDU having LDPC encoding applied thereto and being transmitted at a 160 MHz. If the transmitter block diagram is used for generating a data field of an HE SU PPDU that is transmitted in an 80+80 MHz band, a segment deparser is not used as shown in FIG. 22. That is, the block diagram of the transmitter (or transmitting device) is used per 80 MHz band in a situation where the band is divided into an 80 MHz band and another 80 MHz band by using a segment parser.

Data fields of an HE SU PPDU, an HE extended range (ER) SU PPDU, and an HE trigger-based (TB) PPDU may be configured as described below via LDPC encoding.

a) Construct the SERVICE field as described in 28.3.11.3 (SERVICE field) and append the PSDU to the SERVICE field.
b) Pre-FEC padding: Append the pre-FEC padding bits as described in 28.3.11 (Data field). There are no tail bits.
c) Scrambler: Scramble the pre-FEC padded data.
d) LDPC encoder: LDPC encode as described in 28.3.11.5.2 (LDPC coding).
e) Post-FEC padding: Append the post-FEC pad bits and Packet Extension field as described in 28.3.11 (Data field).
f) Stream parser: Rearrange the output of LDPC encoder into blocks as described in 28.3.11.6 (Stream parser).
g) Segment parser (if needed): In a 160 MHz or 80+80 MHz transmission with a 2×996-tone RU, divide the output of each stream parser into two frequency subblocks as described in 28.3.11.6 (Stream parser). This block is bypassed for l2.0 MHz, 40 MHz, and 80 MHz transmissions.
h) Constellation. snapper: Map to BPSK, BPSK DCM, QPSK, QPSK DCM, 16-QAM, 16-QAM DCM, 64-QAM, 2.56-QAM, or 1024-QAM constellation points as described in 28.3.11.9 (Constellation snapping).
i) LDPC tone mapper: the LDPC tone mapping shall be performed on all LDPC encoded streams as described in 2.8.3.11.11 (LDPC tone mapper).
j) Segment deparser (if needed): In 160 MHz transmission, merge the two frequency subblocks into one frequency segment as described in 28.3.11.12 (Segment. &parser). This block is bypassed for 2.0 MHz, 40 MHz, 80 MHz, and 80+80 MHz transmissions.
k) STBC: Apply STBC as described in 28.3.11.10 (Space-time block coding).
l) Pilot insertion: Insert pilots following the steps described in 28.3.11.13 (Pilot subcarriers).
m) CSD: Apply CSD for each space-time stream and frequency segment as described in 28.3.10.2.2 (Cyclic shift for HE modulated fields).
n) Spatial mapping: Apply the Q matrix as described in 28.3.11.14 (OFDM modulation).
o) IDFT: In an 80+80 MHz transmission, map each frequency subblock to a separate IDFT. Compute the inverse discrete Fourier transform.
p) Insert GI and apply windowing.: Prepend a GI determined by the TXVECTOR parameter GI_TYPE and apply windowing as described in 28.3.9 Mathematical description of signals).
q) Analog and RF: Upconvert the resulting complex baseband waveform with each transmit chain to an RF signal according to the center frequency of the desired channel and transmit. Refer to 28.3.9 (Mathematical description of signals) and 28.3.10 (HE preamble) for details.

Referring to FIG. 20, a data field (or data bit sequence) may be encoded in an LDPC encoder. A data bit sequence that is inputted to the LDPC encoder may be in a scrambled state by a scrambler.

The encoded data bit sequence that is encoded by the LDPC encoder is divided into multiple spatial streams by a stream parser. At this point, an encoded data bit sequence that is divided into each spatial stream may be referred to as a spatial block. A number of the spatial blocks may be determined by a number of spatial streams that are used for transmitting an PPDU, and the number of spatial blocks may be set to be equal to the number of spatial blocks.

Each spatial block is divided into at least one or more data segments by the segment parser. As shown in FIG. 22, when a data field is transmitted in a 160 MHz band, the 160 MHz band is divided into two 80 MHz bands, and the spatial block is divided into a first data segment and a second data segment for each 80 MHz band. Thereafter, the first and second data segments may each be processed with constellation mapping and LDPC mapping for each 80 MHz band.

In an HE MU transmission, except for cyclic shift diversity (CSD) being performed based on knowledge of a corresponding user on a space-time stream start index, a PPDU encoding processor is independently performed in a resource unit (RU) per user up to the input of a spatial mapping block. All user data of the RU is coupled with a transmit chain of a spatial mapping block and then mapped.

Hereinafter, LDPC tone mapping will be described.

LDPC tone mapping should be performed in all LDPC-coded streams by using an LDPC tone mapping distance parameter $D_{TM}$. $D_{TM}$ is a constant for each bandwidth and is given a value for each band, as shown below. LDPC tone mapping should not be performed for an encoded stream by using BCC.

| Parameter | 20 MHz | 40 MHz | 80 MHz | 160 MHz, 80 + 80 MHz |
|---|---|---|---|---|
| $D_{TM}$ | 4 | 6 | 9 | 9 |

For a VHT PPDU transmission, LDPC tone mapping for an LDPC-coded stream related to a user u may be performed, as shown below, by substituting a stream of complex numbers generated by a constellation mapper.

$$d''_{t(k),i,n,l,u} = d'_{k,i,n,l,u};$$

k=0, 1, ..., $N_{SD}$−1 for 20 MHz, 40 MHz, 80 MHz 80+80 MHz;
k=0, 1, ..., $N_{SD}/2$−1 for 160 MHz:
i=1, ..., $N_{SS,u}$;
n=0, 1, ..., $N_{SYM}$−1;
l=0 far 20 MHz, 40 MHz, and 80 MHz;
l=0, 1 for 160 MHz and 80+80 MHz;
u=0, ..., $N_{user}$−1
where $t(k)=\{D_{TM}(k \bmod N_{SD}/D_{TM})+[k*D_{TM}/N_{SD}]$, for 20 MHz, 40 MHz, 80 MHz, and 80+80 MHz
$\{D_{TM}(k \bmod (N_{SD}/2)/D_{TM})+[k*D_{TM}/(N_{SD}/2)]$, for 160 MHz As a result of the LDPC tone mapping operation, each of two consecutively generated complex constellation numbers and $d'_{k,i,n,l,u}$ and $d'_{k+1,i,n,l,u}$ may be transmitted from two data tones, respectively, each data tone being spaced apart by at least $D_{TM}-1$. For example, $d'_{k,i,n,l,u}$ may be transmitted from a first data tone, $d'_{k+1,i,n,l,u}$ may be transmitted from a second data tone, and the first data tone and the second data tone may be spaced apart by $D_{TM}-1$. The aforementioned operation is the same as performing block-interleaving on complex numbers $d'_{0,i,n,l,u}, \ldots, d'_{NSD-1,i,n,l,u}$ for variables i, n, and u by using a matrix having a $D_{TM}$ row and a $N_{SD}/D_{TM}$ column (for 20 MHz, 40 MHz, 80 MHz or 80+80 MHz) or $N_{SD}/2*D_{TM}$ column (for 160 MHz). At this point, $d'_{0,i,n,l,u}, \ldots, d'_{NSD-1,i,n,l,u}$ are written row-wise in the matrix, and $d'_{0,i,n,l,u}, \ldots, d'_{NSD-1,i,n,l,u}$ are read column-wise from the matrix.

LDPC tone mapping is separately performed for an upper 80 MHz and a lower 80 MHz of a 160 MHz or 80+80 MHz transmission that is indicated by frequency subblock index 1.

Since LDPC tone mapping is not performed for a BCC-coded stream, the following equation may be applied to the BCC-coded stream.

$$d''_{k,i,n,l,u} = d'_{k,i,n,l,u};$$

k=0, 1, . . . , $N_{SD}$–1 for 20 MHz, 40 MHz, 80 MHz 80+80 MHz;
k=0, 1, . . . , $N_{SD}$/2-1 for 160 MHz:
i=1, . . . , $N_{SS,u}$;
n=0, 1, . . . , $N_{SYM}$–1;
l=0 far 20 MHz, 40 MHz, and 80 MHz;
l=0, 1 for 160 MHz and 80+80 MHz;
u=0, . . . , $N_{user}$–1

Additionally, LDPC tone mapping should be performed in all LDPC-coded streams that are mapped to a resource unit (RU). LDPC tone mapping should not be performed on a stream having used BCC. When DCM is applied to an LDPC-coded stream, $D_{TM\_DCM}$ should be applied to both a lower half data subcarrier of the RU and an upper half data subcarrier of the RU. LDPC tone mapping distance parameters $D_{TM}$ and $D_{TM\_DCM}$ are constant values for each of an RU size and another RU size,

| Parameter | RU Size (tones) | | | | | | |
| --- | --- | --- | --- | --- | --- | --- | --- |
|  | 26 | 52 | 106 | 242 | 484 | 996 | 2 × 996 |
| $D_{TM}$ | 1 | 3 | 6 | 9 | 12 | 20 | 20 |
| $D_{TM\_DCM}$ | 1 | 1 | 3 | 9 | 9 | 14 | 14 |

LDPC tone mapping distance parameters $D_{TM}$ and $D_{TM\_DCM}$ are applied to a frequency subblock l=0 and frequency subblock l=1, respectively.

For an HE PPDU without DCM, in an r-th RU, LDPC tone mapping for an LDPC-coded stream related to a user u may be performed, as shown below, by substituting a stream of complex numbers generated by a constellation mapper.

$$d''_{t(k),i,n,l,r,u} d'_{k,i,n,l,r,u}$$

where $$k = \begin{cases} 0, 1, \ldots, N_{SD}-1 \text{ for a} \\ 26-, 52-, 106-, 242-, 484- \text{ and } 996-\text{tone } RU \\ 0, 1, \ldots, N_{SD}/2-1 \text{ for a } 2\times996-\text{tone } RU \end{cases}$$

$i = 1, \ldots, N_{SS,r,u}$ $n = 0, 1, \ldots, N_{SYM}-1$ $$l = \begin{cases} 0 \text{ for a } 26-, 52-, 106-, 242-, 484- \text{ and } 996-\text{tone } RU \\ 0, 1 \text{ for a } 2\times996-\text{tone } RU \end{cases}$$

$u = 0, \ldots, N_{user,r}-1$ $r = 0, \ldots, N_{RU}-1$ $N_{SD}$ is the number of data tones in the r-th RU $$t(k) = \begin{cases} D_{TM}\left(k \bmod \frac{N_{SD}}{D_{TM}}\right) + \left\lfloor \frac{k \cdot D_{TM}}{N_{SD}} \right\rfloor, \\ \text{for a } 26-, 52-, 106-, 242-, 484- \text{ and } 996-\text{tone } RU \\ D_{TM}\left(k \bmod \frac{N_{SD}/2}{D_{TM}}\right) + \left\lfloor \frac{k \cdot D_{TM}}{N_{SD}/2} \right\rfloor, \text{for a } 2\times996-\text{tone } RU \end{cases}$$

For an HE PPDU having DCM applied in a Data field, in an r-th RU, LDPC tone mapping for an LDPC-coded stream related to a user u may be performed, as shown below, by substituting a stream of complex numbers generated by a constellation mapper.

$$d''_{t(k),i,n,l,r,u} = d'_{k,i,n,l,r,u}$$

where $$k = \begin{cases} 0, 1, \ldots, 2N_{SD}-1 \text{ for a} \\ 26-, 52-, 106-, 242-, 484- \text{ and } 996-\text{tone } RU \\ 0, 1, \ldots, N_{SD}-1 \text{ for a } 2\times996-\text{tone } RU \end{cases}$$

$i = 1, \ldots, N_{SS,r,u}$ $n = 0, 1, \ldots, N_{SYM}-1$ $$l = \begin{cases} 0 \text{ for a } 26-, 52-, 106-, 242-, 484- \text{ and } 996-\text{tone } RU \\ 0, 1 \text{ for a} \times 996-\text{tone } RU \end{cases}$$

$u = 0, \ldots, N_{user,r}-1$ $r = 0, \ldots, N_{RU}-1$ $N_{SD}$ is the number of data tones in the r-th RU when DCM is applied For a 26-, 52-, 106-, 242-, 484- and 996-tone RU, $$t(k) =$$

$$\begin{cases} D_{TM\_DCM}\left(k \bmod \frac{N_{SD}}{D_{TM\_DCM}}\right) + \left\lfloor \frac{k \cdot D_{TM\_DCM}}{N_{SD}} \right\rfloor, \text{for } k < N_{SD} \\ D_{TM\_DCM}\left((k-N_{SD}) \bmod \frac{N_{SD}}{D_{TM\_DCM}}\right) + \left\lfloor \frac{(k-N_{SD}) \cdot D_{TM\_DCM}}{N_{SD}} \right\rfloor + N_{SD}, \\ \text{for } k \geq N_{SD} \end{cases}$$

For a 2×996-tone RU, $$t(k) =$$

$$\begin{cases} D_{TM\_DCM}\left(k \bmod \frac{N_{SD}/2}{D_{TM\_DCM}}\right) + \left\lfloor \frac{k \cdot D_{TM\_DCM}}{N_{SD}/2} \right\rfloor, \text{for } 0 \leq k < N_{SD}/2-1 \\ D_{TM\_DCM}\left((k-N_{SD}/2) \bmod \frac{N_{SD}/2}{D_{TM\_DCM}}\right) + \left\lfloor \frac{(k-N_{SD}/2) \cdot D_{TM\_DCM}}{N_{SD}/2} \right\rfloor + \\ N_{SD}/2, \text{for } N_{SD}/2 \leq \leq N_{SD}-1 \end{cases}$$

$D_{TM\_DCM}$ the LDPC tone mapping distance for the r-th RU when DCM is applied.

An LDPC tone mapper for a 26-, 52-, 106-, 242-, 484- and 996-tone is defined as one segment. LDPC tone mapping is separately performed for upper 80 MHz and lower 80 MHz frequency segments of a 2×996-tone RU that is indicated by frequency subblock index 1.

Since LDPC tone mapping is not performed for a BCC-coded stream, the following equation may be applied to the BCC-coded stream.

$$d''_{k,i,n,l,r,u} = d'_{k,i,n,l,r,u}$$

where $$k = \begin{cases} 0, 1, \ldots, N_{SD} - 1 \text{ for a} \\ 26-, 52-, 106-, 242-, 484- \text{and } 996 - \text{tone } RU \\ 0, 1, \ldots, N_{SD}/2 - 1 \text{ for a } 2 \times 996 - \text{tone } RU \end{cases}$$

$$i = 1, \ldots, N_{SS,r,u}$$

$$n = 0, 1, \ldots, N_{SYM} - 1$$

$$l = \begin{cases} 0 \text{ for a } 26-, 52-, 106-, 242-, 484- \text{and } 996 - \text{tone } RU \\ 0, 1 \text{ for a } 2 \times 996 - \text{tone } RU \end{cases}$$

$$u = 0, \ldots, N_{user,r} - 1$$

$$r = 0, \ldots, N_{RU} - 1$$

A brief description of the concept of LDPC tone mapping, which is described in the present specification, is as follows.

When data rate of a related art WLAN data packet increases, a length of an LDPC codeword (LCW) may become shorter than N_CBPS (a number of bits within an OFDM symbol). In this case, an LDPC-coded bit is transmitted to some tones or subcarriers. And, accordingly, a problem of failing to ensure sufficient frequency diversity may occur.

FIG. 21 shows an example of an LDPC tone mapping operation.

Figure 23:
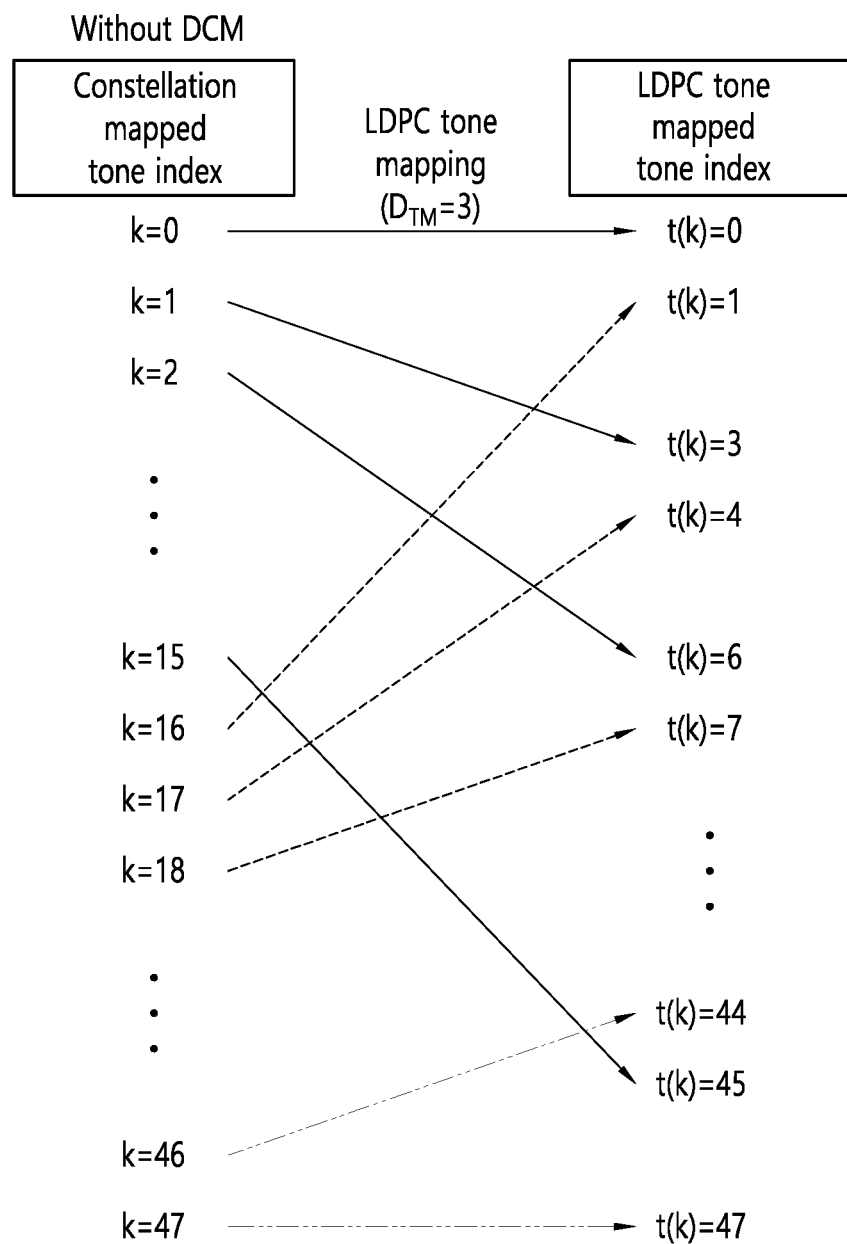
FIG. 23 shows an example of LDPC tone mapping having tone spacing set to 3 in a 52-tone RU in a situation where DCM is not applied.

In the present specification, LDPC tone mapping may mean a mapping scheme for mapping an LDPC-coded stream at an interval (or spacing) of a specific tone or subcarrier. The present specification describes an example of setting tone spacing (D_TM) to 4, 6, 9, and so on, in accordance with a bandwidth (BW) of a PPDU. For example, FIG. 23 is an example of LDPC tone mapping having tone spacing (D_TM) set to 3. That is, an operation that is similar to an interleaving operation may be performed through the LDPC tone mapping.

For example, for a data field of a PPDU of the 802.11ac standard (i.e., VHT PPDU) or a PPDU of the 802.11ax standard (i.e., HE PPDU), the LDPC tone mapper may be positioned after the Constellation mapper. For example, in FIG. 22, an output of the Constellation mapper (i.e., contiguous Constellation symbols) may be mapped to a data tone that is separated at a spacing (or interval) of D_TM−1.

FIG. 22 shows an example of a DCM method being applied to data.

Figure 24:
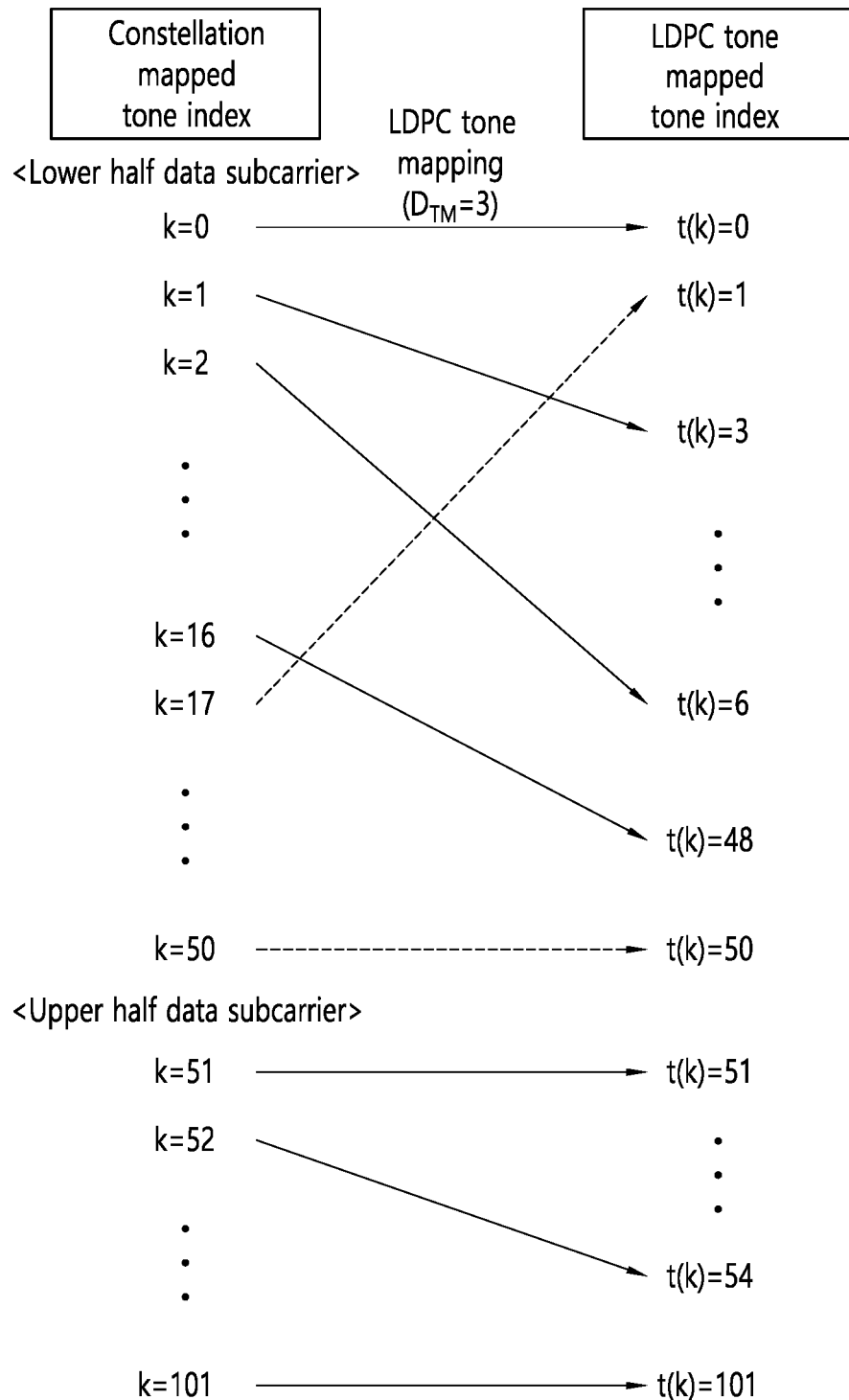
FIG. 24 shows an example of LDPC tone mapping having tone spacing set to 3 in a 106-tone RU in a situation where DCM is applied.

Meanwhile, in IEEE 802.11ax, a Dual Carrier/Sub-carrier Modulation (DCM) scheme is applied. A transmitting device (or transmitter) that is based on the DCM scheme may transmit the same information to different subcarriers. For example, the transmitting device may include a structure that is shown in FIG. 22. As shown in FIG. 22, first data information may be included in subcarrier K based on a first constellation mapping, i.e., modulation mapping 1. Additionally, the same first data information may be included in subcarrier K+N/2 based on a second constellation mapping, i.e., modulation mapping 2. The first constellation mapping and the second constellation mapping may be the same mapping scheme or may each be a different mapping scheme. In FIG. 22, variable N may also be N_SD, which is a number of data tones being included in an RU or frequency segment. Additionally, although the scheme of FIG. 24 is an example of a result of first/second constellation mappings that are applied to the same data being mapped to first/second tones, for example, it is possible for a result of first/second/third constellation mappings that are applied to the same data to be mapped to first/second/third tones, or it is possible for a result of first/second/ . . . /N-th constellation mappings that are applied to the same data to be mapped to first/second/ . . . /N-th tones.

The DCM scheme may be applied only to a data field and/or SIG-B field of an HE PPDU. Additionally, the DCM scheme may be used or may not be used in the transmitting device (optional feature).

A more detailed description of the DCM scheme of 11 ax is as follows.

DCM is an optional modulation scheme for HE-SIG-B and data fields. DCM may be applied to an HE_SU PPDU and an HE_ER_SU PPDU. In an HE_MU PPDU or HE_TB PPDU, DCM may be applied to an RU that includes data for one user and cannot be applied to an RU that includes data for multiple users.

DCM is applicable only for HE-MCS 0, 1, 3, and 4. DCM is applicable only for Nss=1 or Nss=2 (In case of a single user RU in an HE_MU PPDU, Nss,r,u=1 or Nss,r,u=2). DCM is not applicable together with MU-MIMO or STBC.

When DCM is used, a bit sequence is mapped to one symbol pair $(d'_k, d'_{q(k)})$. In order to use a frequency diversity for a 996-tone RU or a smaller RU, k has a range of $0 <= k <= N_{SD}-1$, and q(k) has a range of $N_{SD} <= q(k) <= 2N_{SD}-1$. For a 2×996-tone RU, k has a range of $0 <= k <= N_{SD}/2-1$, and q(k) has a range of $N_{SD}/2 <= q(k) <= N_{SD}-1$. In order to maximize the frequency diversity, an index of a DCM subcarrier pair (k, q(k)) is $q(k)=k+N_{SD}$ for a 996-tone RU or a smaller RU, and $q(k)=k+N_{SD}/2$ for a 2×996-tone RU. Herein, when DCM=1, $N_{SD}$ is given a value of $N_{SD}$. And, when DCM=0, $N_{SD}$ is given a half value of $N_{SD}$.

A modulation bit having DCM applied thereto may be described as follows.

For BPSK modulation with DCM, the input stream is broken into groups of $N_{CBPS}$ or $N_{CBPS,u}$ bits ($B_0$, $B_1$, $B_{N_{CBPS,u}-1}$). Each bit Bk is BPSK modulated to a sample dk. This generates the samples for the lower half of the data subcarriers. For the upper half of the subcarriers, the samples are generated as $d_{k+NSD}=d_k \times e^{j(k+N_{SD})\pi}$, k=0, 1, . . . , $N_{SD}-1$. The $N_{SD}$ here refers to the $N_{SD}$ with DCM=1, which is half the value of $N_{SD}$ with DCM=0.

For QPSK modulation with DCM, the input stream is broken into groups of $N_{CBPS}$ or $N_{CBPS,u}$ bits ($B_0$, $B_1$, . . . , $B_{N_{CBPS,u}-1}$). Each pair of bits ($B_{2k}$, $B_{2k+1}$) is QPSK modulated to a symbol $d_k$. This generates the constellation points for the lower half the data subcarriers in the RU. For the upper half of the data subcarriers in the RU, $d_{k+N_{SD}}=conj(d_k)$, where conj( ) represents the complex conjugate operation. The $N_{SD}$ here refers to the $N_{SD}$ with DCM=1, which is half the value of $N_{SD}$ with DCM=0.

For 16-QAM modulation with DCM, the input stream is broken into groups of $N_{CBPS}$ or $B_{CBPS,u}$ bits ($B_0$, B1, . . . , $B_{N_{CBPS,u}-1}$). A group of 4 bits ($B_{4k}$, $B_{4k+1}$, $B_{4k+2}$, $B_{4k+3}$) is 16-QAM modulated to a sample $d_k$ as described in 17.3.5.8 (Subcarrier modulation mapping). This is the sample on subcarrier k in the lower half In the upper half, the sample $d_{k+N_{SD}}$ on subcarrier k−$N_{SD}$ is obtained by 16-QAM modulating a per-mutation of the bits ($B_{4k}$, $B_{4k+1}$, $B_{4k+2}$, $B_{4k+3}$). Specifically, $d_{k+N_{SD}}$ is obtained by applying the 16-QAM modulation procedure in 18.3.5.8 to the bit group ($B_{4k+1}$, $B_{4k}$, $B_{4k+3}$, $B_{4k+2}$). The $N_{SD}$ here refers to the $N_{SD}$ with DCM=1, which is half the value of $N_{SD}$ with DCM=0.

In a non-OFDMA HE PPDU, a subcarrier allocation related variable for an HE-modulated field may be defined as a tone allocation related parameter for the non-OFDMA HE PPDU, as shown below.

| Parameter | CBW20 | CBW40 | CBW80 | CBW80 + 80 | CBW160 | Description |
|---|---|---|---|---|---|---|
| $N_{SD}$ | 234 | 468 | 980 | 980 | 1960 | Number of data subcarriers per frequency segment |
| $N_{SP}$ | 8 | 16 | 16 | 16 | 32 | Number of pilot subcarriers per frequency segment |
| $N_{ST}$ | 242 | 484 | 996 | 996 | 1992 | Total number of subcarriers per frequency segment |
| $N_{SR}$ | 122 | 244 | 500 | 500 | 1012 | Highest data subcarrier index per frequency segment |
| $N_{Seg}$ | 1 | 1 | 1 | 2 | 1 | Number of frequency segments |
| $N_{DC}$ | 3 | 5 | 5 | 5 | 23 | Number of null subcarriers at DC per segment |
| $N_{Guard, Left}$ | 6 | 12 | 12 | 12 | 12 | Number of low frequency guard subcarriers |
| $N_{Guard, Right}$ | 5 | 11 | 11 | 11 | 11 | Number of high frequency guard subcarriers |

NOTE:
$N_{ST} = N_{SD} + N_{SP}$

In an OFDMA HE PPDU, a subcarrier allocation related variable for an HE-modulated field may be defined as a tone allocation related parameter for the OFDMA HE PPDU, as shown below.

| | RU Size (subcarriers) | | | | | | |
|---|---|---|---|---|---|---|---|
| Parameter | 26 | 52 | 106 | 242 | 484 | 996 | 2 × 996 | Description |
| $N_{SD}$ | 24 | 48 | 102 | 234 | 468 | 980 | 1960 | Number of data subcarriers per RU |
| $N_{SP}$ | 2 | 4 | 4 | 8 | 16 | 16 | 32 | Number of pilot subcarriers per RU |
| $N_{ST}$ | 26 | 52 | 106 | 242 | 484 | 996 | 1992 | Total number of subcarriers per RU |

NOTE:
$N_{ST} = N_{SD} + N_{SP}$

As described above, $N_{SD}$ may denote a number of data tones being included in one RU or frequency segment (e.g., 20/40/80/160 MHz segment).

Parameters that are frequently used in an 802.11ax WLAN system may be defined as follows.

| Symbol | Explanation |
|---|---|
| $N_{RU}$ | For pre-HE modulated fields, $N_{RU} = 1$. For HE modulated fields, $N_{RU}$ represents the number of occupied RUs in the transmission. |

-continued

| Symbol | Explanation |
|---|---|
| $N_{user,r}$ | For pre-HE modulated fields, $N_{user,r} = 1$. For HE modulated fields, $N_{user,r}$ represents the total number of users in the r-th occupied RU of the transmission. |

-continued

| Symbol | Explanation |
|---|---|
| $N_{user,total}$ | Total number of users in all occupied RUs of an HE transmission, i.e., $$N_{user,total} = \sum_{r=0}^{N_{RU}-1} N_{user,r}$$ |
| $N_{CBPS}$, $N_{CBPS,u}$ | Number of coded bits per symbol for user u, u = 0, . . . , $N_{user,total} - 1$ For an HE SU PPDU, $N_{CBPS} = N_{CBPS,0}$ For an HE MU PPDU, $N_{CBPS}$ is undefined |

-continued

| Symbol | Explanation |
|---|---|
| $N_{CBPSS}$, $N_{CBPSS,u}$ | Number of coded bits per symbol per spatial stream for user u, u = 0, . . . , $N_{user,total}$ − 1. For the Data field of an HE SU PPDU, $N_{CBPSS}$ = $N_{CBPSS,0}$ For the Data field of an HE MU PPDU, $N_{CBPSS}$ is undefined |
| $N_{DBPS}$, $N_{DBPS,u}$ | Number of data bits per symbol for user u, u = 0, . . . , $N_{user,total}$ − 1. For an HE SU PPDU, $N_{DBPS}$ = $N_{DBPS,0}$ For an HE MU PPDU, $N_{DBPS}$ is undefined |

Hereinafter, operations having LDPC tone mapping performed therein will be described in detail.

FIG. 23 shows an example of LDPC tone mapping having tone spacing set to 3 in a 52-tone RU in a situation where DCM is not applied.

FIG. 23 shows an example of LDPC tone mapping being performed without DCM for a 52-tone RU. According to the description presented above, k is a constellation mapped tone index that is outputted from the constellation mapper, and t(k) is an LDPC tone mapped tone index that is outputted from the LDPC tone mapper. According to the table that is presented above, $D_{TM}$=3 and $N_{SD}$=48 for the 52-tone RU.

A complex constellation number $d'_{k,i,n,l,r,u}$ that is outputted from the constellation mapper may obtain a complex constellation number $d''_{t(k),i,n,l,r,u}$ that is outputted via LDPC tone mapping, which is similar to the interleaving operation. Thus, it may be known that the $d'_{k,i,n,l,r,u}$ along with $d''_{t(k),i,n,l,r,u}$ is mapped in data tones that are spaced apart by $D_{TM}$−1. That is, as a result of the LDPC tone mapping operation, each of the two serially (or consecutively) generated complex constellation numbers may be transmitted from two data tones each being spaced apart by $D_{TM}$−1, respectively.

Referring to FIG. 23, since LDPC tone mapping for a 52-tone RU is performed, and since k=0, 1, . . . , 47 and l=0, a segment parser is not performed. And, since t(k)=$D_{TM}$*(k mod $N_{SD}/D_{TM}$)+[k*$D_{TM}/N_{SD}$] for the 52-tone RU, the tone index may be separated by a spacing (or interval) of $D_{TM}$−1, as shown below.

k=0−>t(k)=0 k=1−>t(k)=3 k=2−>t(k)=6

. . .

k=15−>t(k)=45 k=16−>t(k)=1(return back up and restart interleaving from k=16)

k=17−>t(k)=4 k=18−>t(k)=7

. . .

k=46−>t(k)=44 k=47−>t(k)=47

FIG. 24 shows an example of LDPC tone mapping having tone spacing set to 3 in a 106-tone RU in a situation where DCM is applied.

FIG. 24 shows an example of LDPC tone mapping being performed by applying DCM for a 106-tone RU. According to the description presented above, k is a constellation mapped tone index that is outputted from the constellation mapper, and t(k) is an LDPC tone mapped tone index that is outputted from the LDPC tone mapper. According to the table that is presented above, $D_{TM\_DCM}$=3 and $N_{SD}$=51 for the 106-tone RU.

A complex constellation number $d'_{k,i,n,l,r,u}$ that is outputted from the constellation mapper may obtain a complex constellation number $d''_{k,i,n,l,r,u}$ that is outputted via LDPC tone mapping, which is similar to the interleaving operation. Thus, it may be known that the $d'_{k,i,n,l,r,u}$ along with $d''_{k,i,n,l,r,u}$ is mapped in data tones that are spaced apart by $D_{TM}$−1. That is, as a result of the LDPC tone mapping operation, each of the two serially (or consecutively) generated complex constellation numbers may be transmitted from two data tones each being spaced apart by $D_{TM}$−1, respectively.

Referring to FIG. 24, since LDPC tone mapping for a 106-tone RU is performed, and since k=0,1, . . . , 101 and l=0, a segment parser is not performed. However, since DCM is applied in this case, when k<$N_{SD}$ (lower half data subcarrier) for the 106-tone RU, since t(k)=$D_{TM\_DCM}$*(k mod $N_{SD}/D_{TM\_DCM}$)+[k*$D_{TM\_DCM}/N_{SD}$], and, when k>=$N_{SD}$ (upper half data subcarrier), since t(k)=$D_{TM\_DCM}$*((k−$N_{SD}$) mod $N_{SD}/D_{TM\_DCM}$)+[(k−$N_{SD}$)*$D_{TM\_DCM}/N_{SD}$], the tone index may be separated by a spacing (or interval) of $D_{TM}$−1 per lower half data subcarrier and upper half data subcarrier, as shown below.

<Lower Half Data Subcarrier> k=0−>t(k)=0 k=1−>t(k)=3 k=2−>t(k)=6

. . .

k=16−>t(k)=48 k=17−>t(k)=1(return back up and restart interleaving from k=17)

. . .

k=50−>t(k)=50

<Upper Half Data Subcarrier> k=51−>t(k)=51 k=52−>t(k)=54

. . .

k=101−>t(k)=101

4. Embodiment(s) Applicable to the Present Specification

In a WLAN 802.11 system, in order to increase peak throughput, transmission of an increased number of streams by using a wider band or a larger number of antennas as compared to the legacy flax is being considered. Additionally, the present specification also considers a method of using various bands by performing aggregation.

The present specification proposed a tone mapping scheme when LDPC channel coding is applied in a situation where a PPDU is transmitted by using a wide band.

In the legacy 802.11ax, data may be transmitted by using a 26/52/106/242/484/996/2×996-tone RU. And, in this case, BCC or LDPC may be used as channel coding. Most particularly, when LDPC is used, LDPC tone mapping may be used for frequency diversity, and a PPDU encoding process of a case where LDPC is applied and LDPC tone mapping are described in detail in FIG. 21 to FIG. 26.

In 802.11be, in addition to the existing (or legacy) RU, a new RU corresponding to a full band of 240 MHz/320 MHz may be defined, and the existing RU may use the LDPC tone mapping defined in the legacy 11ax as it is. In case of the new RU, an RU that is configured by repeating the legacy 80 MHz tone plan or an RU that is designed according to a new method may be considered. And, the LDPC tone mapping of the RUs designed according to each method may be defined as described below.

4.1. Situation where the Legacy 80 MHz Tone Plan is Repeated

In 240 MHz, a 3×996-tone RU may be additionally used, and, in 320 MHz, a 4×996-tone RU may be additionally used. In the corresponding RU, parameters that are used in the legacy 996RU are used as they are. Hereinafter, $D_{TM}$ (i.e., $D_{TM}$) may denote a tone spacing that is used in the LDPC tone mapping, $D_{TM\_DCM}$ may represent a $D_{TM}$ value of a case where the DCM scheme is applied, and $N_{SD}$ may denote a number of data tones being included in one RU (or Frequency segment).

|  | RU size (tones) | |
| --- | --- | --- |
| Parameter | 3 × 996 | 4 × 996 |
| $D_{TM}$ | 20 | 20 |
| $D_{TM\_DCM}$ | 14 | 14 |

Constellation mapping may also be defined as described below. $N_{SD}$ of the 3×996-tone RU may be equal to 2940, when considering 48 pilots. And, $N_{SD}$ of the 4×996-tone RU may be equal to 3920, when considering 64 pilots. In the following equation, floor denotes a decreasing operation.

4.1.A. When DCM is not applied $$d'_{t(k),i,n,l,r,u} = d'_{k,i,n,l,r,u}$$

where
k=0, 1, . . . , $N_{SD}$/3-1 for 3×996-tone RU
k=0, 1, . . . , $N_{SD}$/4-1 for 4×996-tone RU
i=1, . . . , $N_{SS,r,u}$
n=0, 1, . . . , $N_{SYM}$-1
l=0, 1, 2 for 3×996-tone RU
l=0, 1, 2, 3 for 4×996-tone RU
u=0, . . . , $N_{user,r}$-1
r=0, . . . , $N_{RU}$-1

$t(k) = D_{TM}(k \bmod(N_{SD}/3)/D_{TM}) + \text{floor}(k*D_{TM}/(N_{SD}/3))$ for 3×996-tone RU $t(k) = D_{TM}(k \bmod(N_{SD}/4)/D_{TM}) + \text{floor}(k*D_{TM}/(N_{SD}/4))$ for 4×996-tone RU 4.1.B. When DCM is Applied $$d''_{t(k),i,n,l,r,u} = d'_{k,i,n,l,r,u}$$

where
k=0, 1, . . . , $2N_{SD}$/3-1 for 3×996-tone RU
k=0, 1, . . . , $N_{SD}$/2-1 for 4×996-tone RU
i=1, . . . , $N_{SS,r,u}$
n=0, 1, . . . , $N_{SYM}$-1
l=0, 1, 2 for 3×996-tone RU
l=0, 1, 2, 3 for 4×996-tone RU
u=0, . . . , $N_{user,r}$-1
r=0, . . . , $N_{RU}$-1

For 3×996-tone RU $t(k) = D_{TM\_DCM}(k \bmod(N_{SD}/3)/D_{TM\_DCM} + \text{floor}(k*D_{TM\_DCM}/(N_{SD}/3)))$ for $0 \le k < N_{SD}/3$ $t(k) = D_{TM\_DCM}((K-N_{SD}/3) \bmod(N_{SD}/3)/D_{TM\_DCM}) + \text{floor}((k-N_{SD}/3)*D_{TM\_DCM}/(N_{SD}/3)) + N_{SD}/3$ for $N_{SD}/3 \le k \le 2N_{SD}/3-1$ For 4×996-tone RU $t(k) = D_{TM\_DCM}(k \bmod(N_{SD}/4)/D_{TM\_DCM}) + \text{floor}(k*D_{TM\_DCM}/(N_{SD}/4))$ for $0 \le k < N_{SD}/4$ $t(k) = D_{TM\_DCM}((k-N_{SD}/4) \bmod(N_{SD}/4)/D_{TM\_DCM}) + \text{floor}((k-N_{SD}/4)*D_{TM\_DCM}/(N_{SD}/4)) + N_{SD}/4$ for $N_{SD}/4 < k < N_{SD}/2-1$ 4.2. Newly Designed Situation In 160 MHz, 2020/2018-tone RUs, and so on, may be newly defined, and the number of pilots being used may be equal to 16/32, and so on. $N_{SD}$ of a 2020-tone RU may be equal to 2004, when considering 16 pilots, and $N_{SD}$ of the 2020-tone RU may be equal to 1988, when considering 32 pilots. $N_{SD}$ of a 2018-tone RU may be equal to 2002, when considering 16 pilots, and $N_{SD}$ of the 2018-tone RU may be equal to 1986, when considering 32 pilots.

|  | RU size (tones) | |
| --- | --- | --- |
|  | 2020 | 2018 |
| $N_{SD}$ w/16 pilots | 2004 | 2002 |
| $N_{SD}$ w/32 pilots | 1988 | 1986 |

In 240 MHz, 3044/3042-tone RUs, and so on, may be newly defined, and the number of pilots being used may be equal to 16/24/48, and so on. $N_{SD}$ of a 3044-tone RU may be equal to 3028, when considering 16 pilots, $N_{SD}$ of the 3044-tone RU may be equal to 3020, when considering 24 pilots, and $N_{SD}$ of the 3044-tone RU may be equal to 2996, when considering 48 pilots. $N_{SD}$ of a 3042-tone RU may be equal to 3026, when considering 16 pilots, $N_{SD}$ of the 3042-tone RU may be equal to 3018, when considering 24 pilots, and $N_{SD}$ of the 3042-tone RU may be equal to 2994, when considering 48 pilots.

|  | RU size (tones) | |
| --- | --- | --- |
|  | 3044 | 3042 |
| $N_{SD}$ w/16 pilots | 3028 | 3026 |
| $N_{SD}$ w/24 pilots | 3020 | 3018 |
| $N_{SD}$ w/48 pilots | 2996 | 2994 |

In 320 MHz, 4068/4066-tone RUs, and so on, may be newly defined, and the number of pilots being used may be equal to 16/32/64, and so on. $N_{SD}$ of a 4068-tone RU may be equal to 4052, when considering 16 pilots, $N_{SD}$ of the 4068-tone RU may be equal to 4036, when considering 32 pilots, and $N_{SD}$ of the 4068-tone RU may be equal to 4004, when considering 64 pilots. $N_{SD}$ of a 4066-tone RU may be equal to 4050, when considering 16 pilots, $N_{SD}$ of the 4066-tone RU may be equal to 4034, when considering 32 pilots, and $N_{SD}$ of the 4066-tone RU may be equal to 4002, when considering 64 pilots.

|  | RU size (tones) | |
| --- | --- | --- |
|  | 4068 | 4066 |
| $N_{SD}$ w/16 pilots | 4052 | 4050 |
| $N_{SD}$ w/32 pilots | 4036 | 4034 |
| $N_{SD}$ w/64 pilots | 4004 | 4002 |

Additionally, $D_{TM}$ and $D_{TM\_DCM}$ per $N_{SD}$ may each use one of the values listed below.

|  | RU size (tones) | | | |
| --- | --- | --- | --- | --- |
|  | 2020 | | 2018 | |
| $N_{SD}$ | 2004 | 1988 | 2002 | 1986 |
|  | $(2^2*3*167)$ | $(2^2*7*71)$ | $(2*7*11*13)$ | $(2*3*331)$ |
| $D_{TM}$ | 12/167 | 28/71 | 22/26 | 6/331 |
| $D_{TM\_DCM}$ | 12/167 | 14/28/71 | 11/13/14 | 6/331 |

|  | RU size (tones) | | | | | |
| --- | --- | --- | --- | --- | --- | --- |
|  | 3044 | | | 3042 | | |
| $N_{SD}$ | 3028 | 3020 | 2996 | 3026 | 3018 | 2994 |
|  | $(2^2*757)$ | $(2^2*5*151)$ | $(2^2*7*107)$ | $(2*17*89)$ | $(2*3*503)$ | $(2*3*499)$ |
| $D_{TM}$ | 757 | 20/151 | 28 | 17/34 | 6/503 | 6/499 |
| $D_{TM\_DCM}$ | 757 | 10/20/151 | 14/28 | 17/34 | 6/503 | 6/499 |

|  | RU size (tones) | | | | | |
| --- | --- | --- | --- | --- | --- | --- |
|  | 4068 | | | 4066 | | |
| $N_{SD}$ | 4052 | 4036 | 4004 | 4050 | 4034 | 4002 |
|  | $(2^2*1013)$ | $(2^2*1009)$ | $(2^2*7*11*13)$ | $(2*3^4*5^2)$ | $(2*2017)$ | $(2*3*23*29)$ |
| $D_{TM}$ | 4/1013 | 4/1009 | 22/26/28/44/52 | 25/27/30/45/50/54 | 2/2017 | 23/29/46/58 |
| $D_{TM\_DCM}$ | 4/1013 | 4/1009 | 11/13/14/22/26/28 | 15/18/25/27/30/ | 2/2017 | 6/23/29 |

Various tone mapping rules may be applied, as shown below, to the various RU and $N_{SD}$ situations that are presented above.

4.2.A. Application of the Legacy Method
4.2.A.1) when DCM is not Applied $$d''_{t(k),i,n,l,r,u} = d'_{k,i,n,l,r,u}$$

where
k=0, 1, . . . , $N_{SD}$−1
i=1, . . . , $N_{SS,r,u}$
n=0, 1, . . . , $N_{SYM}$−1
l=0
u=0, . . . , $N_{user,r}$−1
r=0, . . . , $N_{RU}$−1

$$t(k) = D_{TM}(k \bmod N_{SD}/D_{TM}) + \text{floor}(k*D_{TM}/N_{SD}))$$

4.2.A.2) when DCM is Applied $$d''_{t(k),i,n,l,r,u} = d'_{k,i,n,l,r,u}$$

where
k=0, 1, . . . , $2N_{SD}$−1
i=1, . . . , $N_{SS,r,u}$
n=0, 1, . . . , $N_{SYM}$−1
l=0
u=0, . . . , $N_{user,r}$−1
r=0, . . . , $N_{RU}$−1

$$t(k) = D_{TM\_DCM}(k \bmod N_{SD}/D_{TM\_DCM}) + \text{floor}(k*D_{TM\_DCM}/N_{SD}) \text{ for } 0 \le k < N_{SD}$$

$$t(k) = D_{TM\_DCM}((k-N_{SD}) \bmod N_{SD}/D_{TM\_DCM}) + \text{floor}((k-N_{SD})*D_{TM\_DCM}/N_{SD}) + N_{SD} \text{ for } N_{SD} \le k < 2N_{SD}-1$$

4.2.B. New Method 1

A method of performing cyclic shift by half of the $N_{SD}$ may be applied.

4.2.B.1) when DCM is not Applied $$d''_{t(k),i,n,l,r,u} = d'_{k,i,n,l,r,u}$$

where
k=0, 1, . . . , $N_{SD}$−1
i=1, . . . , $N_{SS,r,u}$
n=0, 1, . . . , NSYM−1
l=0
u=0, . . . , $N_{user,r}$−1
r=0, . . . , $N_{RU}$−1
$t(k) = (k+N_{SD}/2) \bmod N_{SD}$ Additionally, the conventional (or legacy) method may be applied once more by substituting t(k) with k once again (performing once again the LDPC tone mapping by using a method of performing a cyclic shift by one half of $N_{SD}$ after substituting (t(k) with k).

4.2.B.2) when DCM is Applied $$d''_{t(k),i,n,l,r,u} = d'_{k,i,n,l,r,u}$$

where
k=0, 1, . . . , $2N_{SD}$−1
i=1, . . . , $N_{SS,r,u}$
n=0, 1, . . . , $N_{SYM}$−1
l=0
u=0, . . . , $N_{user,r}$−1
r=0, . . . , $N_{RU}$−1

$$t(k) = (k+N_{SD}/2) \bmod N_{SD} \text{ for } 0 < k < N_{SD}$$

$$t(k) = (k-N_{SD}+N_{SD}/2) \bmod N_{SD} + N_{SD} \text{ for } N_{SD} \le k < 2N_{SD}-1$$

Additionally, the conventional (or legacy) method may be applied once more by substituting t(k) with k once again (performing once again the LDPC tone mapping by using a method of performing a cyclic shift by one half of $N_{SD}$ after substituting t(k) with k).

4.2.C. New Method 2

After performing tone mapping by using the conventional Equation 4.2.A, by substituting t(k) once again with k, a method of performing a cyclic shift by one half of $N_{SD}$ (4.2.B) may be applied once more.

4.2.D. New Method 3

A method of first performing tone mapping by using the conventional method and then reversing the process order and performing mapping may be used, or a method of first reversing the process order and then applying the conventional method may be used (after mapping $t(k)=(N_{SD}-1-k)$, the above-described LDPC tone mapping of 4.1 and 4.2 is performed). The following shows a method of performing mapping by reversing the process order.

4.2.D.1) when DCM is not Applied $$d''_{t(k),i,n,l,r,u} = d'_{k,i,n,l,r,u}$$

where
$k=0, 1, \ldots, N_{SD}-1$
$i=1, \ldots, N_{SS,r,u}$
$n=0, 1, \ldots, N_{SYM}-1$
$l=0$
$u=0, \ldots, N_{user,r}-1$
$r=0, \ldots, N_{RU}-1$ $$t(k)=(N_{SD}-1-k)$$

4.2.D.2) when DCM is Applied $$d''_{t(k),i,n,l,r,u} = d'_{k,i,n,l,r,u}$$

where
$k=0, 1, \ldots, 2N_{SD}-1$
$i=1, \ldots, N_{SS,r,u}$
$n=0, 1, \ldots, N_{SYM}-1$
$l=0$
$u=0, \ldots, N_{user,r}-1$
$r=0, \ldots, N_{RU}-1$ $$t(k)=(N_{SD}-1-k) \text{ for } 0 \leq k < N_{SD}$$

$$t(k)=(2N_{SD}-1-k)+N_{SD} \text{ for } N_{SD} \leq k \leq 2N_{SD}-1$$

The embodiments of 4.1 and 4.2 may correspond to the operations described in FIG. 23 to FIG. 28. A complex constellation number $d_{k,i,n,l,r,u}$ that is mapped to the data tones by the constellation mapper may obtain a complex constellation number $d''_{t(k),i,n,l,r,u}$ via LDPC tone mapping, which is similar to the interleaving operation. Then, the $d'_{k,i,n,l,r,u}$ may be mapped in data tones that are spaced apart by $D_{TM}-1$. That is, as a result of the LDPC tone mapping operation, each of the two serially (or consecutively) generated complex constellation numbers may be transmitted from two data tones each being spaced apart by $D_{TM}-1$.

Additionally, if a band in which the data tones are transmitted is a 2×996-tone RU or a larger RU, a frequency segment may be separated to $l=0, 1, \ldots$, and so on, by the segment parser. The constellation mapping and LDPC tone mapping may be performed per frequency segment. If DCM is applied, the data tones may be processed with LDPC tone mapping for each of a lower half data subcarrier and an upper half data subcarrier.

Since various LDPC tone mapping in a new RU have little difference in performance, in order to reduce complexity, it may be preferable to apply the conventional method of 4.2.A. However, when the $D_{TM}$ or $D_{TM\_DCM}$ is set to have a large value, in order to obtain frequency diversity, the method of 4.2.C or 4.2.D may have more meaning.

Figure 25:
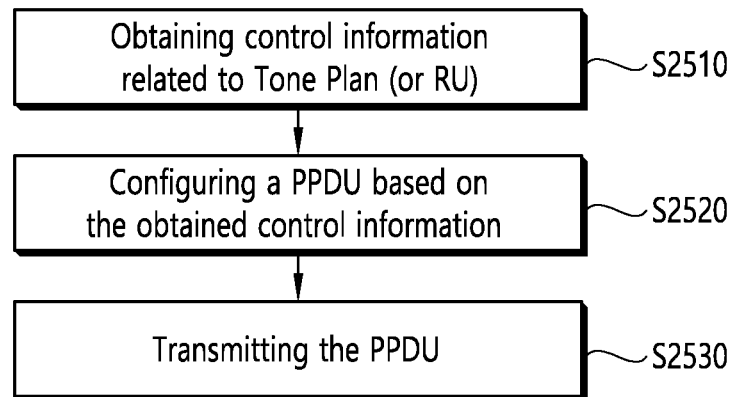
FIG. 25 is a procedure flowchart showing operations of a transmitting device according to the present embodiment.

FIG. 25 is a procedure flowchart showing operations of a transmitting device according to the present embodiment.

An example of FIG. 25 may be performed by a transmitting device (AP and/or non-AP STA). Part of each step (or detailed sub-step that will be described later on) in the example of FIG. 25 may be skipped (or omitted) or varied.

In step S2510, the transmitting device (or transmitting STA) may obtain information related to the above-described tone plan. As described above, the information related to the tone plan includes RU size, position, control information related to the RU, information related to a frequency band including the RU, information on the STA receiving the RU, and so on.

In step S2520, the transmitting STA may configure/generate a PPDU based on the obtained control information. The step of configuring/generating a PPDU may include a step of configuring/generating each field of the PPDU. That is, step S2520 includes a step of configuring an EHT-SIG-A/B/C field that includes control information related to a tone plan or sounding. That is, step 2520 may include a step of configuring a field that includes control information (e.g., N bitmap) indicating the size/position of the RU and/or a field that includes an identifier (e.g., AID) of the STA receiving the RU.

Additionally, step S2520 may include a step of generating an STF/LTF sequence that is transmitted through a specific RU. The STF/LTF sequence may be generated based on a preconfigured STA generating sequence/LTF generating sequence.

Additionally, step S2520 may include a step of generating a data field (i.e., MPDU) that is transmitted through a specific RU.

In step S2530, the transmitting device may transmit the PPDU, which is configured in step S2520, to a receiving device based on step S2530.

While performing step S2530, the transmitting device may perform at least one of the operations of CSD, Spatial Mapping, IDFT/IFFT operation, GI insertion, and so on.

The signal(s)/field(s)/sequences(s) that is/are configured according to the present specification may be transmitted in the format of FIG. 19.

A method for configuring a data field of the PPDU through the above-described step S2520 and step S2530 may be performed based on the device of FIG. 20.

As shown in the drawing, the transmitting device may 1) perform PHY padding, 2) perform a scrambling operation, and 3) perform LDPC encoding. Thereafter, the transmitting device may 4) perform a stream parsing operation that maps an LDPC-coded bit to a specific spatial stream, 5) perform a segment parsing operation that divides a frequency segment when needed, 6) perform constellation mapping for an individual spatial stream and each frequency segment, and 7) perform LDPC tone mapping according to the present specification on a modulation symbol that is generated based on constellation mapping.

Additionally, as shown in FIG. 1, the transmitting device (or transmitter) may include a memory 112, a processor 111, and a transceiver 113.

The memory 112 may store information on multiple Tone-Plans/RUs that are described in the present specification.

The processor 111 may generate various RUs based on the information stored in the memory 112 and may configure a PPDU. An example of the PPDU that is generated by the processor 111 may be the same as FIG. 1.

The processor 111 may perform all/part of the operations shown in FIG. 25.

The transceiver 113 shown in the drawing include an antenna and may perform analog signal processing. More specifically, the processor 111 may control the transceiver 113 so that the PPDU generated by the processor 111 can be transmitted.

Alternatively, the processor 111 may generate a transmit PPDU and may store information related to the transmit PPDU in the memory 112.

Figure 26:
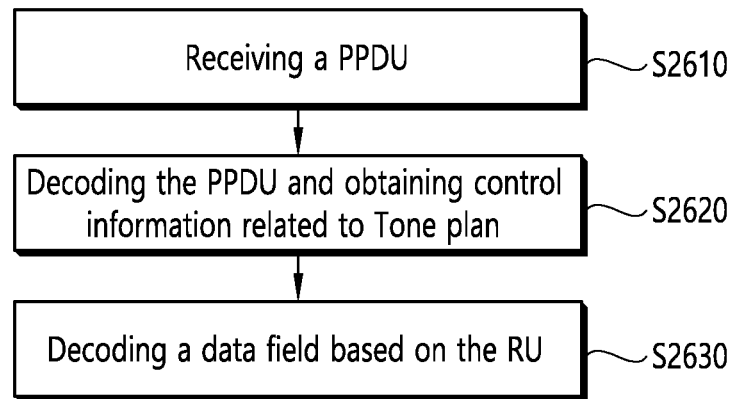
FIG. 26 is a procedure flowchart showing operations of a receiving device according to the present embodiment.

FIG. 26 is a procedure flowchart showing operations of a receiving device according to the present embodiment.

An example of FIG. 26 may be performed by a receiving device (AP and/or non-AP STA).

An example of FIG. 26 may be performed by a receiving STA or receiving device (AP and/or non-AP STA). Part of each step (or detailed sub-step that will be described later on) in the example of FIG. 26 may be skipped (or omitted).

In step S2610, the receiving device (receiving STA) may receive all or part of a PPDU. The received signal may have the format shown in FIG. 18.

A sub-step of step S2610 may be determined based on step S2530. That is, step S2610 may perform operations of recovering (or reconfiguring) the results of the operations of CSD, Spatial Mapping, IDFT/IFFT operation, GI insertion, and so on, which are applied in step S2530.

In step S2620, the receiving device may perform decoding on all/part of the PPDU. Additionally, the receiving device may obtain control information related to a Tone plan (i.e., RU) or sounding from the decoded PPDU.

More specifically, the receiving device decodes an L-SIG and an EHT-SIG of the PPDU based on a Legacy STF/LTF and may obtain information included in the L-SIG and EHT-SIG. Information on various tone plans (i.e., RUs) described in the present specification may be included in the EHT-SIG (EHT-SIG-A/B/C, and so on), and the receiving STA may obtain information related to the tone plan (i.e., RU) through the EHT-SIG.

In step S2630, the receiving device may decode the remaining part of the PPDU based on the information related to the tone plan (i.e., RU) that is obtained through step S2620. For example, the receiving STA may decode an STF/LTF field of the PPDU based on the information related to the tone plan (i.e., RU). Additionally, the receiving STA may decode a data field of the PPDU based on the information related to the tone plan (i.e., RU) and may obtain an MPDU that is included in the data field.

For example, the receiving device may perform a processing operation of delivering (or transferring) data that is decoded in step S2630 to a higher layer (e.g., MAC layer). Furthermore, when signal generation is instructed to the PHY layer from the higher layer in response to the data that is delivered to the higher layer, subsequent operations may be performed.

The above-described PPDU may be received based on the device of FIG. 1.

As shown in FIG. 1, a receiving device may include a memory 122, a processor 121, and a transceiver 123.

The transceiver 123 may receive a PPDU based on the control of the processor 121. For example, the transceiver 123 may include multiple detailed units (not shown). For example, the transceiver 123 may include at least one receiving antenna and may include a filter for the corresponding receiving antenna.

The PPDU that is received through the transceiver 123 may be stored in the memory 122. The processor 121 may process decoding on the received PPDU through the memory 122. The processor 121 may obtain control information related to the tone-plan/RU included in the PPDU and may store the obtained control information in the memory 112.

The processor 121 may perform decoding on the received PPDU. More specifically, the processor 121 may perform operations of recovering (or reconfiguring) the results of the operations of CSD, Spatial Mapping, IDFT/IFFT operation, GI insertion, which are applied to the PPDU. The operations of recovering (or reconfiguring) the results of the operations of CSD, Spatial Mapping, IDFT/IFFT operation, GI insertion may be performed by multiple processing units (not shown) that are individually implemented in the processor 121.

Additionally, the processor 121 may decode a data field of the received PPDU through the transceiver 123.

Also, the processor 121 may process the decoded data. For example, the processor 121 may perform a processing operation of delivering (or transferring) information related to the decoded data field to a higher layer (e.g., MAC layer). Furthermore, when signal generation is instructed to the PHY layer from the higher layer in response to the data that is delivered to the higher layer, subsequent operations may be performed.

Hereinafter, the above-described embodiment will be described with reference to FIG. 1 to FIG. 26.

Figure 27:
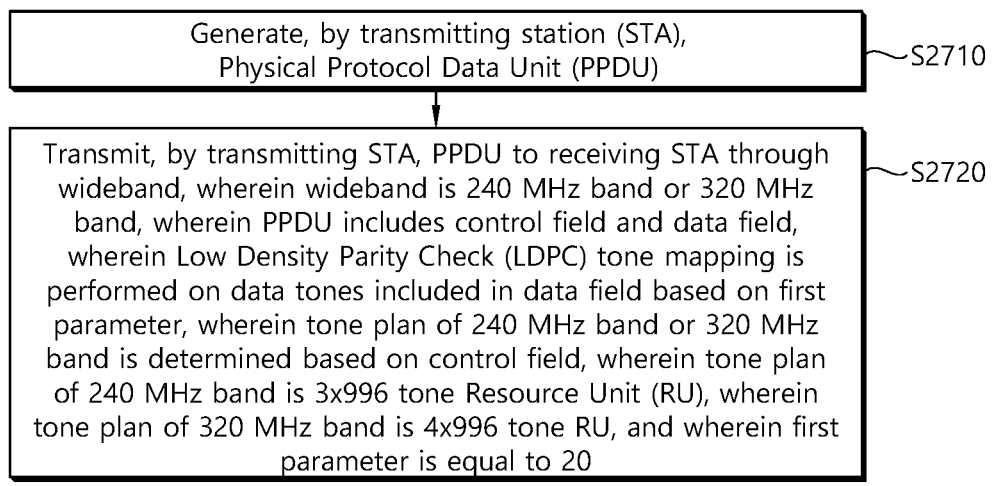
FIG. 27 shows a flowchart showing a procedure of transmitting, by a transmitting STA, a PPDU in a wideband according to the present embodiment.

FIG. 27 shows a flowchart showing a procedure of transmitting, by a transmitting STA, a PPDU in a wideband according to the present embodiment.

The example of FIG. 27 may be performed in a network environment in which a next generation WLAN system (IEEE 802.11be or EHT WLAN system) is being supported. The next generation WLAN system is a WLAN system that is enhanced from an 802.11ax system and may, therefore, satisfy backward compatibility with the 802.11ax system.

The present embodiment proposes a method for performing LDPC tone mapping for a data bit sequence that is included in a data field of a PPDU, when the PPDU is transmitted at a wideband (240 MHz, 320 MHz band) that is supported by an EHT WLAN system. At this point, a tone plan of the wideband may be designed by repeating (or iterating) an 80 MHz tone plan of 802.11ax.

The example of FIG. 27 is performed by a transmitting STA, and the transmitting STA may correspond to an access point (AP). A receiving STA of FIG. 27 may correspond to an STA that supports an Extremely High Throughput (EHT) WLAN system.

In step S2710, a transmitting station (STA) generates a Physical Protocol Data Unit (PPDU).

In step S2720, the transmitting STA transmits the PPDU to a receiving STA through a wideband.

The wideband may be a 240 MHz band or a 320 MHz band.

The PPDU may include a control field and a data field. The control field may include a Universal-Signal (U-SIG) field and an EHT-SIG field.

Low Density Parity Check (LDPC) tone mapping is performed on data tones included in the data field based on a first parameter. More specifically, the data field may be generated based on a bit stream. The bit stream may be mapped to the data tones based on a constellation mapping. The data tones may be configured to have a tone spacing that is equivalent to the first parameter based on the LDPC tone mapping. The LDPC tone mapping is similar to an interleaving operation, and the bit stream may be spread at a tone spacing of the first parameter based on the LDPC tone mapping and may then be mapped to a data tone. Additionally, the bit stream may be modulated based on the constellation mapping before being processed with the LDPC tone mapping.

Furthermore, the bit stream may be divided per frequency segment by a segment parser before the constellation mapping is performed. The constellation mapping and the LDPC tone mapping may be performed per frequency segment. A size of one frequency segment may be equal to a 996-tone RU.

That is, 1) PHY padding may be performed, 2) a scrambling operation may be performed, 3) LDPC encoding may be performed, 4) a stream parsing operation that maps an LDPC-coded bit to a specific spatial stream may be performed, 5) a segment parsing operation that divides a full band to frequency segments (996-tone RU) may be performed, 6) the constellation mapping for an individual spatial stream and each frequency segment may be performed, and 7) the LDPC tone mapping may be performed on a modulation symbol that is generated based on the constellation mapping. In the transmitting STA, the procedures from 1) to 7) are performed in the listed order. And, the description of the present embodiment will be focused on the procedures from 5) to 7).

A tone plan of the 240 MHz band or the 320 MHz band is determined based on the control field. That is, the control field included information on a tone plan, and the information on the tone plan may include a size and position of an RU, control information related to the RU, information related to the frequency band including the RU, information on an STA receiving the RU, and so on.

Additionally, the control field may include information on a bandwidth of the wideband. The wideband may be determined as 240 MHz or 320 MHz (including both contiguous band and non-contiguous band) based on the information on the bandwidth of the wideband.

As an example of the tone plan, a tone plan of the 240 MHz band may be a 3×996 tone Resource Unit (RU), a tone plan of the 320 MHz band may be a 4×996 tone RU, and the first parameter may be equal to 20. The first parameter may correspond to an LDPC tone mapping distance parameter $D_{TM}$. The $D_{TM}$ may be a tone spacing that is used in the LDPC tone mapping.

The 3×996-tone RU is a repetition of a 996-tone RU, which is an 80 MHz tone plan of an 802.11ax WLAN system. Accordingly, when using a tone plan of a 3×996-tone RU in the 240 MHz band, $D_{TM}$ that is used in the 996-tone RU may be used as it is in the 3×996-tone RU ($D_{TM}$=20 in a 996-tone RU). Additionally, the 4×996-tone RU is a repetition of a 996-tone RU, which is an 80 MHz tone plan of an 802.11ax WLAN system. Accordingly, when using a tone plan of a 4×996-tone RU in the 320 MHz band, $D_{TM}$ that is used in the 996-tone RU may be used as it is in the 4×996-tone RU ($D_{TM}$=20 in a 996-tone RU).

When the wideband is a 240 MHz band, the 3×996-tone RU may be divided into a first 996-tone RU, a second 996-tone RU, and a third 996-tone RU by the segment parser.

The bit stream may include a first bit stream for the first 996-tone RU, a second bit stream for the second 996-tone RU, and a third bit stream for the third 996-tone RU.

The first bit stream may be mapped to a first data tone based on the constellation mapping, and the first data tone may be set to have tone spacing that is equivalent to the first parameter based on the LDPC tone mapping. The second bit stream may be mapped to a second data tone based on the constellation mapping, and the second data tone may be set to have tone spacing that is equivalent to the first parameter based on the LDPC tone mapping. The third bit stream may be mapped to a third data tone based on the constellation mapping, and the third data tone may be set to have tone spacing that is equivalent to the first parameter based on the LDPC tone mapping. That is, the constellation mapping is first performed per frequency segment, and, then, the LDPC tone mapping may be performed afterwards.

The first to third data tones may be included in the data tones.

That is, the above-described embodiment describes that the LDPC tone mapping may be performed per frequency segment (996-tone RU). Depending upon the LDPC tone mapping, an operation of first to third data tones being spread as much as the first parameter may be as described below.

Indexes of the first to third data tones may be determined as follows.

$t(k)=D_{TM}(k \bmod(N_{SD}/3)/D_{TM})+\text{floor}(k*D_{TM}/(N_{SD}/3))$

Herein, t(k) is an index of the first to third data tones, $D_{TM}$ is the first parameter, k is an index of a tone having the first to third bit streams mapped thereto, $N_{SD}$ is a number of the data tones, and floor is a decreasing function.

A case where DCM is applied in the constellation mapping may also be considered. When Dual Carrier Modulation (DCM) is performed on the first to third bit streams, the first bit stream may be mapped to a fourth data tone based on a first constellation mapping and mapped to a fifth data tone based on a second constellation mapping. The second bit stream may be mapped to a sixth data tone based on a third constellation mapping and mapped to a seventh data tone based on a fourth constellation mapping. The third bit stream may be mapped to an eighth data tone based on a fifth constellation mapping and mapped to a ninth data tone based on a sixth constellation mapping.

The first to sixth constellation mappings may be one modulation scheme among a Binary Phase Shift Keying (BPSK) scheme, a Quadrature Phase Shift Keying (QPSK) scheme or a 16-Quadrature Amplitude Modulation (QAM) scheme. However, when the DCM is not applied, the constellation mapping may be one modulation scheme among a BPSK scheme, a QPSK scheme, a 16-QAM scheme, a 64-QAM scheme, a 256-QAM scheme or a 1024-QAM scheme.

Each of the fourth to ninth data tones may be set to have tone spacing that is equivalent to a second parameter based on the LDPC tone mapping. The fourth to ninth data tones may be included in the data tones. At this point, the second parameter may be equal to 14.

The second parameter may correspond to an LDPC tone mapping distance parameter $D_{TM\_DCM}$ in a case where the DCM scheme is applied. The $D_{TM\_DCM}$ may be a tone spacing that is used in the LDPC tone mapping in the case where the DCM scheme is applied. Similarly, in the 3×996-tone RU, $D_{TM\_DCM}$ that is used in the 996-tone RU may be used as it is ($D_{TM\_DCM}$=14 in a 996-tone RU). And, in the 4×996-tone RU, $D_{TM\_DCM}$ that is used in the 996-tone RU may be used as it is in the 4×996-tone RU ($D_{TM\_DCM}$=14 in a 996-tone RU).

When the DCM is being applied, the fourth, sixth and eighth data tones may be lower half tones (or subcarrier k) within a frequency, and the fifth, seven and ninth data tones may be upper half tones (or subcarrier k+N/2) within the frequency. Herein, a tone and a subcarrier may be interchangeably used.

Similarly, even in a case where the DCM is applied, it is described that the LDPC tone mapping may be performed per frequency segment (996-tone RU). Depending upon the LDPC tone mapping, an operation of fourth to ninth data tones being spread as much as the second parameter may be as described below.

Indexes of the fourth, sixth, and eighth data tones may be determined as follows.

$t(k)=D_{TM\_DCM}(k \bmod(N_{SD}/3)/D_{TM\_DCM})+\text{floor}(k*D_{TM\_DCM}/(N_{SD}/3))$ Herein, t(k) is an index of the fourth, sixth, and eighth data tones, $D_{TM\_DCM}$ is the second parameter, k is an index of a tone having the first to third bit streams mapped thereto, $N_{SD}$ is a number of the data tones, and floor is a decreasing function.

Indexes of the fifth, seventh, and ninth data tones may be determined as follows.

$$t(k) = D_{TM\_DCM}((k-N_{SD}/3) \bmod (N_{SD}/3)/D_{TM\_DCM}) + \text{floor}((k-N_{SD}/3)*D_{TM\_DCM}/(N_{SD}/3)) + N_{SD}/3$$

Herein, t(k) is an index of the fifth, seventh, and ninth data tones, $D_{TM\_DCM}$ is the second parameter, k is an index of a tone having the first to third bit streams mapped thereto, $N_{SD}$ is a number of the data tones, and floor is a decreasing function.

For example, if the first and second constellation mappings are the BPSK modulation scheme, the first bit stream may be modulated to a first modulation symbol based on the first constellation mapping and modulated to a second modulation symbol based on the second constellation mapping. The second modulation symbol may be generated by applying phase rotation to the first modulation symbol ($d_{k+NSD} = d_k \times e^{j(k+NSD)*pi}$). The first modulation symbol may be mapped to the fourth data tone, and the second modulation symbol may be mapped to the fifth data tone.

For example, if the third and fourth constellation mappings are the QPSK modulation scheme, the second bit stream may be modulated to a third modulation symbol based on the third constellation mapping and modulated to a fourth modulation symbol based on the fourth constellation mapping. The fourth modulation symbol may be a complex conjugate of the third modulation symbol ($d_{k+NSD} = \text{conj}(d_k)$). And, the fourth modulation symbol may be mapped to the sixth data tone, and the fifth modulation symbol may be mapped to the seventh data tone.

For example, if the fifth and sixth constellation mappings are the 16-QAM modulation scheme, the third bit stream may be modulated to a fifth modulation symbol based on the fifth mapping constellation and modulated to a sixth modulation symbol based on the sixth constellation mapping. A bit order of a first bit group for the sixth modulation symbol may be different from a bit order of a second bit group for the fifth modulation symbol ($(B_{4k}, B_{4k+1}, B_{4k+2}, B_{4k+3}) \rightarrow (B_{4k+1}, B_{4k}, B_{4k+3}, B_{4k+2})$) The first and second bit groups may be included in the third bit stream. And, the fifth modulation symbol may be mapped to the eighth data tone, and the sixth modulation symbol may be mapped to the ninth data tone.

When the wideband is a 320 MHz band, the 4×996-tone RU may be divided into a first 996-tone RU, a second 996-tone RU, a third 996-tone RU, and a fourth 996-tone RU by the segment parser.

The bit stream may include a first bit stream for the first 996-tone RU, a second bit stream for the second 996-tone RU, a third bit stream for the third 996-tone RU, and a fourth bit stream for the fourth 996-tone RU.

The first bit stream may be mapped to a first data tone based on the constellation mapping, and the first data tone may be set to have tone spacing that is equivalent to the first parameter based on the LDPC tone mapping. The second bit stream may be mapped to a second data tone based on the constellation mapping, and the second data tone may be set to have tone spacing that is equivalent to the first parameter based on the LDPC tone mapping. The third bit stream may be mapped to a third data tone based on the constellation mapping, and the third data tone may be set to have tone spacing that is equivalent to the first parameter based on the LDPC tone mapping. The fourth bit stream may be mapped to a fourth data tone based on the constellation mapping, and the fourth data tone may be set to have tone spacing that is equivalent to the first parameter based on the LDPC tone mapping. That is, the constellation mapping is first performed per frequency segment, and, then, the LDPC tone mapping may be performed afterwards.

The first to fourth data tones may be included in the data tones.

That is, the above-described embodiment describes that the LDPC tone mapping may be performed per frequency segment (996-tone RU). Depending upon the LDPC tone mapping, an operation of first to fourth data tones being spread as much as the first parameter may be as described below.

Indexes of the first to fourth data tones are determined as follows.

$$t(k) = D_{TM}(k \bmod (N_{SD}/4)/D_{TM}) + \text{floor}(k*D_{TM}/(N_{SD}/4))$$

Herein, t(k) may be an index of the first to fourth data tones, $D_{TM}$ may be the first parameter, k may be an index of a tone having the first to fourth bit streams mapped thereto, $N_{SD}$ may be a number of the data tones, and floor may be a decreasing function.

A case where DCM is applied in the constellation mapping may also be considered. When Dual Carrier Modulation (DCM) is performed on the first to fourth bit streams, the first bit stream may be mapped to a fifth data tone based on a first constellation mapping and mapped to a sixth data tone based on the second constellation mapping. The second bit stream may be mapped to a seventh data tone based on a third constellation mapping and mapped to an eighth data tone based on the fourth constellation mapping. The third bit stream may be mapped to a ninth data tone based on a fifth constellation mapping and mapped to a tenth data tone based on the sixth constellation mapping. The fourth bit stream may be mapped to an eleventh data tone based on a seventh constellation mapping and mapped to a twelfth data tone based on the eighth constellation mapping.

The first to eighth constellation mappings may be one modulation scheme among a Binary Phase Shift Keying (BPSK) scheme, a Quadrature Phase Shift Keying (QPSK) scheme or a 16-Quadrature Amplitude Modulation (QAM) scheme. However, when the DCM is not applied, the constellation mapping may be one modulation scheme among a BPSK scheme, a QPSK scheme, a 16-QAM scheme, a 64-QAM scheme, a 256-QAM scheme or a 1024-QAM scheme.

Each of the fifth to twelfth data tones may be set to have tone spacing that is equivalent to a second parameter based on the LDPC tone mapping. The fifth to twelfth data tones may be included in the data tones. The second parameter may be equal to 14. Details on the second parameter are described above.

When the DCM is being applied, the fifth, seventh, ninth and eleventh data tones may be lower half tones within a frequency. And, the sixth, eighth, tenth and twelfth data tones may be upper half tones within the frequency.

Similarly, even in a case where the DCM is applied, it is described that the LDPC tone mapping may be performed per frequency segment (996-tone RU). Depending upon the LDPC tone mapping, an operation of fifth to twelfth data tones being spread as much as the second parameter may be as described below.

Indexes of the fifth, seventh, ninth and eleventh data tones may be determined as follows.

$$t(k)=D_{TM\_DCM}(k \bmod(N_{SD}/4)/D_{TM\_DCM})+\text{floor}(k*D_{TM\_DCM}/(N_{SD}/4))$$

Herein, t(k) may be an index of the fifth, seventh, ninth and eleventh data tones, $D_{TM\_DCM}$ may be the second parameter, k may be an index of a tone having the first to fourth bit streams mapped thereto, $N_{SD}$ may be a number of the data tones, and floor may be a decreasing function.

Indexes of the sixth, eighth, tenth and twelfth data tones are determined as follows.

$$t(k)=D_{TM\_DCM}((k-N_{SD}/4)\bmod(N_{SD}/4)/D_{TM\_DCM})+\text{floor}((k-N_{SD}/4)*D_{TM\_DCM}/(N_{SD}/4))+N_{SD}/4$$

Herein, t(k) may be an index of the sixth, eighth, tenth and twelfth data tones, $D_{TM\_DCM}$ may be the second parameter, k may be an index of a tone having the first to fourth bit streams mapped thereto, $N_{SD}$ may be a number of the data tones, and floor may be a decreasing function.

For example, if the first and second constellation mappings are the BPSK modulation scheme, the first bit stream may be modulated to a first modulation symbol based on the first constellation mapping and modulated to a second modulation symbol based on the second constellation mapping. The second modulation symbol may be generated by applying phase rotation to the first modulation symbol ($d_{k+NSD}=d_k \times e^{j(k+NSD)*pi}$). And, the first modulation symbol may be mapped to the fifth data tone, and the second modulation symbol may be mapped to the sixth data tone.

For example, if the third and fourth constellation mappings are the QPSK modulation scheme, the second bit stream may be modulated to a third modulation symbol based on the third constellation mapping and modulated to a fourth modulation symbol based on the fourth constellation mapping. The fourth modulation symbol may be a complex conjugate of the third modulation symbol ($d_{k+NSD}=\text{conj}(d_k)$). The fourth modulation symbol may be mapped to the seventh data tone, and the fifth modulation symbol may be mapped to the eighth data tone.

For example, if the fifth and sixth constellation mappings are the 16-QAM modulation scheme, the third bit stream may be modulated to a fifth modulation symbol based on the fifth constellation mapping and a sixth modulation symbol based on the sixth constellation mapping. A bit order of a first bit group for the sixth modulation symbol may be different from a bit order of a second bit group for the fifth modulation symbol (($B_{4k}$, $B_{4k+1}$, $B_{4k+2}$, $B_{4k+3}$)->($B_{4k+1}$, $B_{4k}$, $B_{4k+3}$, $B_{4k+2}$)). The first and second bit groups may be included in the third bit stream. The fifth modulation symbol may be mapped to the ninth data tone, and the sixth modulation symbol may be mapped to the tenth data tone.

For example, if the seventh and eighth constellation mappings are the BPSK modulation scheme, the fourth bit stream may be modulated to a seventh modulation symbol based on the seventh constellation mapping and modulated to an eighth modulation symbol based on the eighth constellation mapping. The eighth modulation symbol may be generated by applying phase rotation to the seventh modulation symbol ($d_{k+NSD}=d_k \times e^{j(k+NSD)*pi}$). The seventh modulation symbol may be mapped to the eleventh data tone, and the eighth modulation symbol may be mapped to the twelfth data tone.

The 3×996-tone RU may include 48 pilot tones and 2940 data tones. And, the 4×996-tone RU may include 64 pilot tones and 3920 data tones.

Furthermore, the PPDU may further include a Legacy-Signal (L-SIG) field, a Repeated Legacy-Signal (RL-SIG) field, an EHT-Short Training Field (STF), an EHT-Long Training Field (LTF). The EHT-SIG field may include an EHT-SIG-A field and an EHT-SIG-B field. The EHT-SIG field may further include an EHT-SIG-C field.

Figure 28:
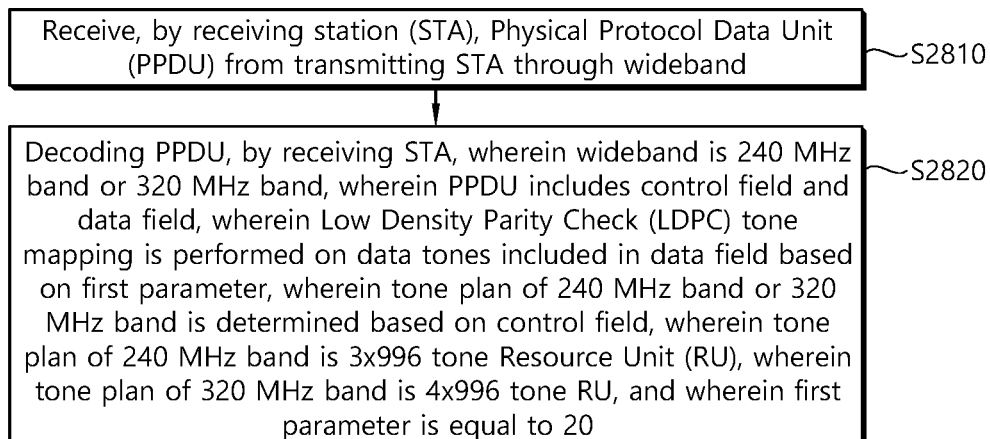
FIG. 28 shows a flowchart showing a procedure of receiving, by a receiving STA, a PPDU in a wideband according to the present embodiment.

FIG. 28 shows a flowchart showing a procedure of receiving, by a receiving STA, a PPDU in a wideband according to the present embodiment.

The example of FIG. 28 may be performed in a network environment in which a next generation WLAN system (IEEE 802.11be or EHT WLAN system) is being supported. The next generation WLAN system is a WLAN system that is enhanced from an 802.11ax system and may, therefore, satisfy backward compatibility with the 802.11ax system.

The present embodiment proposes a method for performing LDPC tone mapping for a data bit sequence that is included in a data field of a PPDU, when the PPDU is transmitted at a wideband (240 MHz, 320 MHz band) that is supported by an EHT WLAN system. At this point, a tone plan of the wideband may be designed by repeating (or iterating) an 80 MHz tone plan of 802.11ax.

The example of FIG. 28 may be performed by a receiving station (STA), and the receiving STA may correspond to an STA that supports an Extremely High Throughput (EHT) WLAN system. A transmitting STA of FIG. 28 may correspond to an access point (AP).

In step S2810, a receiving STA receives a Physical Protocol Data Unit (PPDU) from a transmitting STA through a wideband.

In step S2820, the receiving STA decodes the PPDU.

The wideband may be a 240 MHz band or a 320 MHz band.

The PPDU may include a control field and a data field. The control field may include a Universal-Signal (U-SIG) field and an EHT-SIG field.

Low Density Parity Check (LDPC) tone mapping is performed on data tones included in the data field based on a first parameter. More specifically, the data field may be generated based on a bit stream. The bit stream may be mapped to the data tones based on a constellation mapping. The data tones may be configured to have a tone spacing that is equivalent to the first parameter based on the LDPC tone mapping. The LDPC tone mapping is similar to an interleaving operation, and the bit stream may be spread at a tone spacing of the first parameter based on the LDPC tone mapping and may then be mapped to a data tone. Additionally, the bit stream may be modulated based on the constellation mapping before being processed with the LDPC tone mapping.

Furthermore, the bit stream may be divided per frequency segment by a segment parser before the constellation mapping is performed. The constellation mapping and the LDPC tone mapping may be performed per frequency segment. A size of one frequency segment may be equal to a 996-tone RU.

That is, 1) PHY padding may be performed, 2) a scrambling operation may be performed, 3) LDPC encoding may be performed, 4) a stream parsing operation that maps an LDPC-coded bit to a specific spatial stream may be performed, 5) a segment parsing operation that divides a full band to frequency segments (996-tone RU) may be performed, 6) the constellation mapping for an individual spatial stream and each frequency segment may be performed, and 7) the LDPC tone mapping may be performed on a modulation symbol that is generated based on the constellation mapping. In the transmitting STA, the procedures from 1) to 7) are performed in the listed order. And, the description of the present embodiment will be focused on the procedures from 5) to 7).

However, since the receiving STA performs decoding of the data field, the procedures from 1) to 7) may be performed in a reversed order. An STA having received the data field of the transmitting device may 8) perform LDPC tone demapping, 9) perform constellation demapping so as to once again obtain a bit sequence from a modulation symbol, 10) not perform mapping on the bit sequence per spatial stream or frequency segment through a stream deparser or segment deparser, 11) perform LDPC decoding, 12) perform a descrambling operation, and 13) perform Pre-FEC padding or Post-FEC padding. The receiving STA may decode the bit stream (input bit stream) through the procedures from 8) to 13).

A tone plan of the 240 MHz band or the 320 MHz band is determined based on the control field. That is, the control field included information on a tone plan, and the information on the tone plan may include a size and position of an RU, control information related to the RU, information related to the frequency band including the RU, information on an STA receiving the RU, and so on.

Additionally, the control field may include information on a bandwidth of the wideband. The wideband may be determined as 240 MHz or 320 MHz (including both contiguous band and non-contiguous band) based on the information on the bandwidth of the wideband.

As an example of the tone plan, a tone plan of the 240 MHz band may be a 3×996 tone Resource Unit (RU), a tone plan of the 320 MHz band may be a 4×996 tone RU, and the first parameter may be equal to 20. The first parameter may correspond to an LDPC tone mapping distance parameter $D_{TM}$. The $D_{TM}$ may be a tone spacing that is used in the LDPC tone mapping.

The 3×996-tone RU is a repetition of a 996-tone RU, which is an 80 MHz tone plan of an 802.11ax WLAN system. Accordingly, when using a tone plan of a 3×996-tone RU in the 240 MHz band, $D_{TM}$ that is used in the 996-tone RU may be used as it is in the 3×996-tone RU ($D_{TM}$=20 in a 996-tone RU). Additionally, the 4×996-tone RU is a repetition of a 996-tone RU, which is an 80 MHz tone plan of an 802.11ax WLAN system. Accordingly, when using a tone plan of a 4×996-tone RU in the 320 MHz band, $D_{TM}$ that is used in the 996-tone RU may be used as it is in the 4×996-tone RU ($D_{TM}$=20 in a 996-tone RU).

When the wideband is a 240 MHz band, the 3×996-tone RU may be divided into a first 996-tone RU, a second 996-tone RU, and a third 996-tone RU by the segment parser.

The bit stream may include a first bit stream for the first 996-tone RU, a second bit stream for the second 996-tone RU, and a third bit stream for the third 996-tone RU.

The first bit stream may be mapped to a first data tone based on the constellation mapping, and the first data tone may be set to have tone spacing that is equivalent to the first parameter based on the LDPC tone mapping. The second bit stream may be mapped to a second data tone based on the constellation mapping, and the second data tone may be set to have tone spacing that is equivalent to the first parameter based on the LDPC tone mapping. The third bit stream may be mapped to a third data tone based on the constellation mapping, and the third data tone may be set to have tone spacing that is equivalent to the first parameter based on the LDPC tone mapping. That is, the constellation mapping is first performed per frequency segment, and, then, the LDPC tone mapping may be performed afterwards.

The first to third data tones may be included in the data tones.

That is, the above-described embodiment describes that the LDPC tone mapping may be performed per frequency segment (996-tone RU). Depending upon the LDPC tone mapping, an operation of first to third data tones being spread as much as the first parameter may be as described below.

Indexes of the first to third data tones may be determined as follows.

$$t(k)=D_{TM}(k \bmod (N_{SD}/3)/D_{TM})+\text{floor}(k*D_{TM}/(N_{SD}/3))$$

Herein, t(k) is an index of the first to third data tones, $D_{TM}$ is the first parameter, k is an index of a tone having the first to third bit streams mapped thereto, $N_{SD}$ is a number of the data tones, and floor is a decreasing function.

A case where DCM is applied in the constellation mapping may also be considered. When Dual Carrier Modulation (DCM) is performed on the first to third bit streams, the first bit stream may be mapped to a fourth data tone based on a first constellation mapping and mapped to a fifth data tone based on a second constellation mapping. The second bit stream may be mapped to a sixth data tone based on a third constellation mapping and mapped to a seventh data tone based on a fourth constellation mapping. The third bit stream may be mapped to an eighth data tone based on a fifth constellation mapping and mapped to a ninth data tone based on a sixth constellation mapping.

The first to sixth constellation mappings may be one modulation scheme among a Binary Phase Shift Keying (BPSK) scheme, a Quadrature Phase Shift Keying (QPSK) scheme or a 16-Quadrature Amplitude Modulation (QAM) scheme. However, when the DCM is not applied, the constellation mapping may be one modulation scheme among a BPSK scheme, a QPSK scheme, a 16-QAM scheme, a 64-QAM scheme, a 256-QAM scheme or a 1024-QAM scheme.

Each of the fourth to ninth data tones may be set to have tone spacing that is equivalent to a second parameter based on the LDPC tone mapping. The fourth to ninth data tones may be included in the data tones. At this point, the second parameter may be equal to 14.

The second parameter may correspond to an LDPC tone mapping distance parameter $D_{TM\_DCM}$ in a case where the DCM scheme is applied. The $D_{TM\_DCM}$ may be a tone spacing that is used in the LDPC tone mapping in the case where the DCM scheme is applied. Similarly, in the 3×996-tone RU, $D_{TM\_DCM}$ that is used in the 996-tone RU may be used as it is ($D_{TM\_DCM}$=14 in a 996-tone RU). And, in the 4×996-tone RU, $D_{TM\_DCM}$ that is used in the 996-tone RU may be used as it is in the 4×996-tone RU ($D_{TM\_DCM}$=14 in a 996-tone RU).

When the DCM is being applied, the fourth, sixth and eighth data tones may be lower half tones (or subcarrier k) within a frequency, and the fifth, seven and ninth data tones may be upper half tones (or subcarrier k+N/2) within the frequency. Herein, a tone and a subcarrier may be interchangeably used.

Similarly, even in a case where the DCM is applied, it is described that the LDPC tone mapping may be performed per frequency segment (996-tone RU). Depending upon the LDPC tone mapping, an operation of fourth to ninth data tones being spread as much as the second parameter may be as described below.

Indexes of the fourth, sixth, and eighth data tones may be determined as follows.

$$t(k)=D_{TM\_DCM}(k \bmod(N_{SD}/3)/D_{TM\_DCM})+\text{floor}(k*D_{TM\_DCM}/(N_{SD}/3))$$

Herein, t(k) is an index of the fourth, sixth, and eighth data tones, $D_{TM\_DCM}$ is the second parameter, k is an index of a tone having the first to third bit streams mapped thereto, $N_{SD}$ is a number of the data tones, and floor is a decreasing function.

Indexes of the fifth, seventh, and ninth data tones may be determined as follows.

$$t(k)=D_{TM\_DCM}((k-N_{SD}/3)\bmod(N_{SD}/3)/D_{TM\_DCM})+\text{floor}((k-N_{SD}/3)*D_{TM\_DCM}/(N_{SD}/3))+N_{SD}/3$$

Herein, t(k) is an index of the fifth, seventh, and ninth data tones, $D_{TM\_DCM}$ is the second parameter, k is an index of a tone having the first to third bit streams mapped thereto, $N_{SD}$ is a number of the data tones, and floor is a decreasing function.

For example, if the first and second constellation mappings are the BPSK modulation scheme, the first bit stream may be modulated to a first modulation symbol based on the first constellation mapping and modulated to a second modulation symbol based on the second constellation mapping. The second modulation symbol may be generated by applying phase rotation to the first modulation symbol ($d_{k+NSD}=d_k \times e^{j(k+NSD)*pi}$). The first modulation symbol may be mapped to the fourth data tone, and the second modulation symbol may be mapped to the fifth data tone.

For example, if the third and fourth constellation mappings are the QPSK modulation scheme, the second bit stream may be modulated to a third modulation symbol based on the third constellation mapping and modulated to a fourth modulation symbol based on the fourth constellation mapping. The fourth modulation symbol may be a complex conjugate of the third modulation symbol ($d_{k+NSD}=\text{conj}(d_k)$). And, the fourth modulation symbol may be mapped to the sixth data tone, and the fifth modulation symbol may be mapped to the seventh data tone.

For example, if the fifth and sixth constellation mappings are the 16-QAM modulation scheme, the third bit stream may be modulated to a fifth modulation symbol based on the fifth mapping constellation and modulated to a sixth modulation symbol based on the sixth constellation mapping. A bit order of a first bit group for the sixth modulation symbol may be different from a bit order of a second bit group for the fifth modulation symbol (($B_{4k}$, $B_{4k+1}$, $B_{4k+2}$, $B_{4k+3}$)-> ($B_{4k+1}$, $B_{4k}$, $B_{4k+3}$, $B_{4k+2}$)) The first and second bit groups may be included in the third bit stream. And, the fifth modulation symbol may be mapped to the eighth data tone, and the sixth modulation symbol may be mapped to the ninth data tone.

When the wideband is a 320 MHz band, the 4×996-tone RU may be divided into a first 996-tone RU, a second 996-tone RU, a third 996-tone RU, and a fourth 996-tone RU by the segment parser.

The bit stream may include a first bit stream for the first 996-tone RU, a second bit stream for the second 996-tone RU, a third bit stream for the third 996-tone RU, and a fourth bit stream for the fourth 996-tone RU.

The first bit stream may be mapped to a first data tone based on the constellation mapping, and the first data tone may be set to have tone spacing that is equivalent to the first parameter based on the LDPC tone mapping. The second bit stream may be mapped to a second data tone based on the constellation mapping, and the second data tone may be set to have tone spacing that is equivalent to the first parameter based on the LDPC tone mapping. The third bit stream may be mapped to a third data tone based on the constellation mapping, and the third data tone may be set to have tone spacing that is equivalent to the first parameter based on the LDPC tone mapping. The fourth bit stream may be mapped to a fourth data tone based on the constellation mapping, and the fourth data tone may be set to have tone spacing that is equivalent to the first parameter based on the LDPC tone mapping. That is, the constellation mapping is first performed per frequency segment, and, then, the LDPC tone mapping may be performed afterwards.

The first to fourth data tones may be included in the data tones.

That is, the above-described embodiment describes that the LDPC tone mapping may be performed per frequency segment (996-tone RU). Depending upon the LDPC tone mapping, an operation of first to fourth data tones being spread as much as the first parameter may be as described below.

Indexes of the first to fourth data tones are determined as follows.

$$t(k)=D_{TM}(k \bmod(N_{SD}/4)/D_{TM})+\text{floor}(k*D_{TM}/(N_{SD}/4))$$

Herein, t(k) may be an index of the first to fourth data tones, $D_{TM}$ may be the first parameter, k may be an index of a tone having the first to fourth bit streams mapped thereto, $N_{SD}$ may be a number of the data tones, and floor may be a decreasing function.

A case where DCM is applied in the constellation mapping may also be considered. When Dual Carrier Modulation (DCM) is performed on the first to fourth bit streams, the first bit stream may be mapped to a fifth data tone based on a first constellation mapping and mapped to a sixth data tone based on the second constellation mapping. The second bit stream may be mapped to a seventh data tone based on a third constellation mapping and mapped to an eighth data tone based on the fourth constellation mapping. The third bit stream may be mapped to a ninth data tone based on a fifth constellation mapping and mapped to a tenth data tone based on the sixth constellation mapping. The fourth bit stream may be mapped to an eleventh data tone based on a seventh constellation mapping and mapped to a twelfth data tone based on the eighth constellation mapping.

The first to eighth constellation mappings may be one modulation scheme among a Binary Phase Shift Keying (BPSK) scheme, a Quadrature Phase Shift Keying (QPSK) scheme or a 16-Quadrature Amplitude Modulation (QAM) scheme. However, when the DCM is not applied, the constellation mapping may be one modulation scheme among a BPSK scheme, a QPSK scheme, a 16-QAM scheme, a 64-QAM scheme, a 256-QAM scheme or a 1024-QAM scheme.

Each of the fifth to twelfth data tones may be set to have tone spacing that is equivalent to a second parameter based on the LDPC tone mapping. The fifth to twelfth data tones may be included in the data tones. The second parameter may be equal to 14. Details on the second parameter are described above.

When the DCM is being applied, the fifth, seventh, ninth and eleventh data tones may be lower half tones within a frequency. And, the sixth, eighth, tenth and twelfth data tones may be upper half tones within the frequency.

Similarly, even in a case where the DCM is applied, it is described that the LDPC tone mapping may be performed per frequency segment (996-tone RU). Depending upon the LDPC tone mapping, an operation of fifth to twelfth data tones being spread as much as the second parameter may be as described below.

Indexes of the fifth, seventh, ninth and eleventh data tones may be determined as follows.

$$t(k)=D_{TM\_DCM}(k \mod(N_{SD}/4)/D_{TM\_DCM})+\text{floor}(k*D_{TM\_DCM}/(N_{SD}/4))$$

Herein, t(k) may be an index of the fifth, seventh, ninth and eleventh data tones, $D_{TM\_DCM}$ may be the second parameter, k may be an index of a tone having the first to fourth bit streams mapped thereto, $N_{SD}$ may be a number of the data tones, and floor may be a decreasing function.

Indexes of the sixth, eighth, tenth and twelfth data tones are determined as follows.

$$t(k)=D_{TM\_DCM}((k-N_{SD}/4)\mod(N_{SD}/4)/D_{TM\_DCM})+\text{floor}((k-N_{SD}/4)*D_{TM\_DCM}/(N_{SD}/4))+N_{SD}/4$$

Herein, t(k) may be an index of the sixth, eighth, tenth and twelfth data tones, $D_{TM\_DCM}$ may be the second parameter, k may be an index of a tone having the first to fourth bit streams mapped thereto, $N_{SD}$ may be a number of the data tones, and floor may be a decreasing function.

For example, if the first and second constellation mappings are the BPSK modulation scheme, the first bit stream may be modulated to a first modulation symbol based on the first constellation mapping and modulated to a second modulation symbol based on the second constellation mapping. The second modulation symbol may be generated by applying phase rotation to the first modulation symbol ($d_{k+NSD}=d_k \times e^{j(k+NSD)*pi}$). And, the first modulation symbol may be mapped to the fifth data tone, and the second modulation symbol may be mapped to the sixth data tone.

For example, if the third and fourth constellation mappings are the QPSK modulation scheme, the second bit stream may be modulated to a third modulation symbol based on the third constellation mapping and modulated to a fourth modulation symbol based on the fourth constellation mapping. The fourth modulation symbol may be a complex conjugate of the third modulation symbol ($d_{k+NSD}=\text{conj}(d_k)$). The fourth modulation symbol may be mapped to the seventh data tone, and the fifth modulation symbol may be mapped to the eighth data tone.

For example, if the fifth and sixth constellation mappings are the 16-QAM modulation scheme, the third bit stream may be modulated to a fifth modulation symbol based on the fifth constellation mapping and a sixth modulation symbol based on the sixth constellation mapping. A bit order of a first bit group for the sixth modulation symbol may be different from a bit order of a second bit group for the fifth modulation symbol (($B_{4k}$, $B_{4k+1}$, $B_{4k+2}$, $B_{4k+3}$)->($B_{4k+1}$, $B_{4k}$, $B_{4k+3}$, $B_{4k+2}$)). The first and second bit groups may be included in the third bit stream. The fifth modulation symbol may be mapped to the ninth data tone, and the sixth modulation symbol may be mapped to the tenth data tone.

For example, if the seventh and eighth constellation mappings are the BPSK modulation scheme, the fourth bit stream may be modulated to a seventh modulation symbol based on the seventh constellation mapping and modulated to an eighth modulation symbol based on the eighth constellation mapping. The eighth modulation symbol may be generated by applying phase rotation to the seventh modulation symbol ($d_{k+NSD}=d_k \times e^{j(k+NSD)*pi}$). The seventh modulation symbol may be mapped to the eleventh data tone, and the eighth modulation symbol may be mapped to the twelfth data tone.

The 3×996-tone RU may include 48 pilot tones and 2940 data tones. And, the 4×996-tone RU may include 64 pilot tones and 3920 data tones.

Furthermore, the PPDU may further include a Legacy-Signal (L-SIG) field, a Repeated Legacy-Signal (RL-SIG) field, an EHT-Short Training Field (STF), an EHT-Long Training Field (LTF). The EHT-SIG field may include an EHT-SIG-A field and an EHT-SIG-B field. The EHT-SIG field may further include an EHT-SIG-C field.

4. Device Configuration

Figure 29:
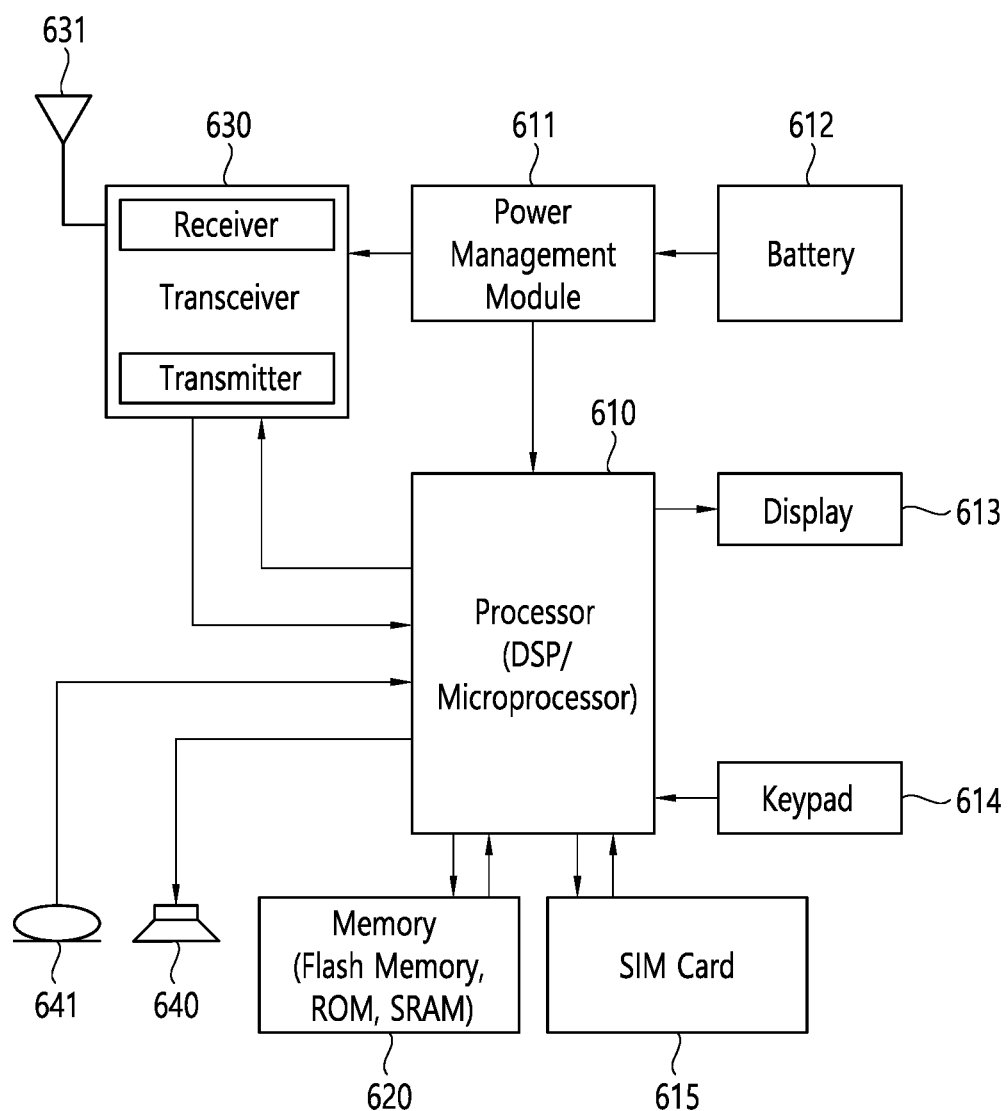
FIG. 29 illustrates an example of a modified transmitting device and/or receiving device of the present specification.

FIG. 29 illustrates an example of a modified transmitting device and/or receiving device of the present specification.

Each device/STA shown in sub-figures (a)/(b) of FIG. 1 may be modified as shown in FIG. 29. A transceiver 630 of FIG. 29 may be the same as the transceiver(s) 113 and 123 of FIG. 1. The transceiver 630 of FIG. 29 may include a receiver and a transmitter.

A processor 610 of FIG. 29 may be the same as the processor(s) 111 and 121 shown in FIG. 1. Alternatively, the processor 610 of FIG. 29 may be the same as the processing chip(s) 114 and 124 shown in FIG. 1.

A memory 150 of FIG. 29 may be the same as the memory(s) 112 and 122 shown in FIG. 1. Alternatively, the memory 150 of FIG. 29 may be a separate external memory that is different from the memory(s) 112 and 122 shown in FIG. 1.

Referring to FIG. 29, the power management module 611 manages power for the processor 610 and/or the transceiver 630. The battery 612 supplies power to the power management module 611. The display 613 outputs results processed by the processor 610. The keypad 614 receives inputs that are to be used by the processor 610. The keypad 614 may be shown on the display 613. The SIM card 615 may be an integrated circuit that is intended to securely store the international mobile subscriber identity (IMSI) number and its related key, which are used to identify and authenticate subscribers on mobile telephony devices, such as mobile phones and computers.

Referring to FIG. 29, the speaker 640 may output sound-related results processed by the processor 610. The microphone 641 may receive sound-related inputs to be used by the processor 610.

The above-described technical features of the present specification may be applied to various devices and methods. For example, the above-described technical features of the present specification may be performed/supported through the device(s) of FIG. 1 and/or FIG. 29. For example, the above-described technical features of the present specification may be applied to only part of FIG. 1 and/or FIG. 29. For example, the above-described technical features of the present specification may be implemented based on the processing chip(s) 114 and 124 of FIG. 1, or implemented based on the processor(s) 111 and 121 and the memory(s) 112 and 122, or implemented based on the processor 610 and the memory 620 of FIG. 29. For example, the device according to the present specification receives a Physical Protocol Data Unit (PPDU) from a transmitting station (STA) through a wideband, and decodes the PPDU.

The wideband may be a 240 MHz band or a 320 MHz band.

The PPDU may include a control field and a data field. The control field may include a Universal-Signal (U-SIG) field and an EHT-SIG field.

Low Density Parity Check (LDPC) tone mapping is performed on data tones included in the data field based on a first parameter. More specifically, the data field may be generated based on a bit stream. The bit stream may be mapped to the data tones based on a constellation mapping. The data tones may be configured to have a tone spacing that is equivalent to the first parameter based on the LDPC tone mapping. The LDPC tone mapping is similar to an interleaving operation, and the bit stream may be spread at a tone spacing of the first parameter based on the LDPC tone mapping and may then be mapped to a data tone. Additionally, the bit stream may be modulated based on the constellation mapping before being processed with the LDPC tone mapping.

Furthermore, the bit stream may be divided per frequency segment by a segment parser before the constellation mapping is performed. The constellation mapping and the LDPC tone mapping may be performed per frequency segment. A size of one frequency segment may be equal to a 996-tone RU.

That is, 1) PHY padding may be performed, 2) a scrambling operation may be performed, 3) LDPC encoding may be performed, 4) a stream parsing operation that maps an LDPC-coded bit to a specific spatial stream may be performed, 5) a segment parsing operation that divides a full band to frequency segments (996-tone RU) may be performed, 6) the constellation mapping for an individual spatial stream and each frequency segment may be performed, and 7) the LDPC tone mapping may be performed on a modulation symbol that is generated based on the constellation mapping. In the transmitting STA, the procedures from 1) to 7) are performed in the listed order. And, the description of the present embodiment will be focused on the procedures from 5) to 7).

A tone plan of the 240 MHz band or the 320 MHz band is determined based on the control field. That is, the control field included information on a tone plan, and the information on the tone plan may include a size and position of an RU, control information related to the RU, information related to the frequency band including the RU, information on an STA receiving the RU, and so on.

Additionally, the control field may include information on a bandwidth of the wideband. The wideband may be determined as 240 MHz or 320 MHz (including both contiguous band and non-contiguous band) based on the information on the bandwidth of the wideband.

As an example of the tone plan, a tone plan of the 240 MHz band may be a 3×996 tone Resource Unit (RU), a tone plan of the 320 MHz band may be a 4×996 tone RU, and the first parameter may be equal to 20. The first parameter may correspond to an LDPC tone mapping distance parameter $D_{TM}$. The $D_{TM}$ may be a tone spacing that is used in the LDPC tone mapping.

The 3×996-tone RU is a repetition of a 996-tone RU, which is an 80 MHz tone plan of an 802.11ax WLAN system. Accordingly, when using a tone plan of a 3×996-tone RU in the 240 MHz band, $D_{TM}$ that is used in the 996-tone RU may be used as it is in the 3×996-tone RU ($D_{TM}$=20 in a 996-tone RU). Additionally, the 4×996-tone RU is a repetition of a 996-tone RU, which is an 80 MHz tone plan of an 802.11ax WLAN system. Accordingly, when using a tone plan of a 4×996-tone RU in the 320 MHz band, $D_{TM}$ that is used in the 996-tone RU may be used as it is in the 4×996-tone RU ($D_{TM}$=20 in a 996-tone RU).

When the wideband is a 240 MHz band, the 3×996-tone RU may be divided into a first 996-tone RU, a second 996-tone RU, and a third 996-tone RU by the segment parser.

The bit stream may include a first bit stream for the first 996-tone RU, a second bit stream for the second 996-tone RU, and a third bit stream for the third 996-tone RU.

The first bit stream may be mapped to a first data tone based on the constellation mapping, and the first data tone may be set to have tone spacing that is equivalent to the first parameter based on the LDPC tone mapping. The second bit stream may be mapped to a second data tone based on the constellation mapping, and the second data tone may be set to have tone spacing that is equivalent to the first parameter based on the LDPC tone mapping. The third bit stream may be mapped to a third data tone based on the constellation mapping, and the third data tone may be set to have tone spacing that is equivalent to the first parameter based on the LDPC tone mapping. That is, the constellation mapping is first performed per frequency segment, and, then, the LDPC tone mapping may be performed afterwards.

The first to third data tones may be included in the data tones.

That is, the above-described embodiment describes that the LDPC tone mapping may be performed per frequency segment (996-tone RU). Depending upon the LDPC tone mapping, an operation of first to third data tones being spread as much as the first parameter may be as described below.

Indexes of the first to third data tones may be determined as follows.

$$t(k)=D_{TM}(k \bmod (N_{SD}/3)/D_{TM})+\text{floor}(k*D_{TM}(N_{SD}/3))$$

Herein, t(k) is an index of the first to third data tones, $D_{TM}$ is the first parameter, k is an index of a tone having the first to third bit streams mapped thereto, $N_{SD}$ is a number of the data tones, and floor is a decreasing function.

A case where DCM is applied in the constellation mapping may also be considered. When Dual Carrier Modulation (DCM) is performed on the first to third bit streams, the first bit stream may be mapped to a fourth data tone based on a first constellation mapping and mapped to a fifth data tone based on a second constellation mapping. The second bit stream may be mapped to a sixth data tone based on a third constellation mapping and mapped to a seventh data tone based on a fourth constellation mapping. The third bit stream may be mapped to an eighth data tone based on a fifth constellation mapping and mapped to a ninth data tone based on a sixth constellation mapping.

The first to sixth constellation mappings may be one modulation scheme among a Binary Phase Shift Keying (BPSK) scheme, a Quadrature Phase Shift Keying (QPSK) scheme or a 16-Quadrature Amplitude Modulation (QAM) scheme. However, when the DCM is not applied, the constellation mapping may be one modulation scheme among a BPSK scheme, a QPSK scheme, a 16-QAM scheme, a 64-QAM scheme, a 256-QAM scheme or a 1024-QAM scheme.

Each of the fourth to ninth data tones may be set to have tone spacing that is equivalent to a second parameter based on the LDPC tone mapping. The fourth to ninth data tones may be included in the data tones. At this point, the second parameter may be equal to 14.

The second parameter may correspond to an LDPC tone mapping distance parameter $D_{TM\_DCM}$ in a case where the DCM scheme is applied. The $D_{TM\_DCM}$ may be a tone spacing that is used in the LDPC tone mapping in the case where the DCM scheme is applied. Similarly, in the 3×996-tone RU, $D_{TM\_DCM}$ that is used in the 996-tone RU may be used as it is ($D_{TM\_DCM}$=14 in a 996-tone RU). And, in the 4×996-tone RU, $D_{TM\_DCM}$ that is used in the 996-tone RU may be used as it is in the 4×996-tone RU ($D_{TM\_DCM}$=14 in a 996-tone RU).

When the DCM is being applied, the fourth, sixth and eighth data tones may be lower half tones (or subcarrier k) within a frequency, and the fifth, seven and ninth data tones may be upper half tones (or subcarrier k+N/2) within the frequency. Herein, a tone and a subcarrier may be interchangeably used.

Similarly, even in a case where the DCM is applied, it is described that the LDPC tone mapping may be performed per frequency segment (996-tone RU). Depending upon the LDPC tone mapping, an operation of fourth to ninth data tones being spread as much as the second parameter may be as described below.

Indexes of the fourth, sixth, and eighth data tones may be determined as follows.

$$t(k)=D_{TM\_DCM}(k \bmod (N_{SD}/3)/D_{TM\_DCM})+\text{floor}(k*D_{TM\_DCM}/(N_{SD}/3))$$

Herein, $t(k)$ is an index of the fourth, sixth, and eighth data tones, $D_{TM\_DCM}$ is the second parameter, k is an index of a tone having the first to third bit streams mapped thereto, $N_{SD}$ is a number of the data tones, and floor is a decreasing function.

Indexes of the fifth, seventh, and ninth data tones may be determined as follows.

$$t(k)=D_{TM\_DCM}((k-N_{SD}/3) \bmod (N_{SD}/3)/D_{TM\_DCM})+\text{floor}((k-N_{SD}/3)*D_{TM\_DCM}/(N_{SD}/3))+N_{SD}/3$$

Herein, $t(k)$ is an index of the fifth, seventh, and ninth data tones, $D_{TM\_DCM}$ is the second parameter, k is an index of a tone having the first to third bit streams mapped thereto, $N_{SD}$ is a number of the data tones, and floor is a decreasing function.

For example, if the first and second constellation mappings are the BPSK modulation scheme, the first bit stream may be modulated to a first modulation symbol based on the first constellation mapping and modulated to a second modulation symbol based on the second constellation mapping. The second modulation symbol may be generated by applying phase rotation to the first modulation symbol ($d_{k+NSD}=d_k \times e^{j(k+NSD)*pi}$). The first modulation symbol may be mapped to the fourth data tone, and the second modulation symbol may be mapped to the fifth data tone.

For example, if the third and fourth constellation mappings are the QPSK modulation scheme, the second bit stream may be modulated to a third modulation symbol based on the third constellation mapping and modulated to a fourth modulation symbol based on the fourth constellation mapping. The fourth modulation symbol may be a complex conjugate of the third modulation symbol ($d_{k+NSD}=\text{conj}(d_k)$). And, the fourth modulation symbol may be mapped to the sixth data tone, and the fifth modulation symbol may be mapped to the seventh data tone.

For example, if the fifth and sixth constellation mappings are the 16-QAM modulation scheme, the third bit stream may be modulated to a fifth modulation symbol based on the fifth mapping constellation and modulated to a sixth modulation symbol based on the sixth constellation mapping. A bit order of a first bit group for the sixth modulation symbol may be different from a bit order of a second bit group for the fifth modulation symbol (($B_{4k}$, $B_{4k+1}$, $B_{4k+2}$, $B_{4k+3}$)-> ($B_{4k+1}$, $B_{4k}$, $B_{4k+3}$, $B_{4k+2}$)) The first and second bit groups may be included in the third bit stream. And, the fifth modulation symbol may be mapped to the eighth data tone, and the sixth modulation symbol may be mapped to the ninth data tone.

When the wideband is a 320 MHz band, the 4×996-tone RU may be divided into a first 996-tone RU, a second 996-tone RU, a third 996-tone RU, and a fourth 996-tone RU by the segment parser.

The bit stream may include a first bit stream for the first 996-tone RU, a second bit stream for the second 996-tone RU, a third bit stream for the third 996-tone RU, and a fourth bit stream for the fourth 996-tone RU.

The first bit stream may be mapped to a first data tone based on the constellation mapping, and the first data tone may be set to have tone spacing that is equivalent to the first parameter based on the LDPC tone mapping. The second bit stream may be mapped to a second data tone based on the constellation mapping, and the second data tone may be set to have tone spacing that is equivalent to the first parameter based on the LDPC tone mapping. The third bit stream may be mapped to a third data tone based on the constellation mapping, and the third data tone may be set to have tone spacing that is equivalent to the first parameter based on the LDPC tone mapping. The fourth bit stream may be mapped to a fourth data tone based on the constellation mapping, and the fourth data tone may be set to have tone spacing that is equivalent to the first parameter based on the LDPC tone mapping. That is, the constellation mapping is first performed per frequency segment, and, then, the LDPC tone mapping may be performed afterwards.

The first to fourth data tones may be included in the data tones.

That is, the above-described embodiment describes that the LDPC tone mapping may be performed per frequency segment (996-tone RU). Depending upon the LDPC tone mapping, an operation of first to fourth data tones being spread as much as the first parameter may be as described below.

Indexes of the first to fourth data tones are determined as follows.

$$t(k)=D_{TM}(k \bmod (N_{SD}/4)/D_{TM})+\text{floor}(k*D_{TM}/(N_{SD}/4))$$

Herein, $t(k)$ may be an index of the first to fourth data tones, $D_{TM}$ may be the first parameter, k may be an index of a tone having the first to fourth bit streams mapped thereto, $N_{SD}$ may be a number of the data tones, and floor may be a decreasing function.

A case where DCM is applied in the constellation mapping may also be considered. When Dual Carrier Modulation (DCM) is performed on the first to fourth bit streams, the first bit stream may be mapped to a fifth data tone based on a first constellation mapping and mapped to a sixth data tone based on the second constellation mapping. The second bit stream may be mapped to a seventh data tone based on a third constellation mapping and mapped to an eighth data tone based on the fourth constellation mapping. The third bit stream may be mapped to a ninth data tone based on a fifth constellation mapping and mapped to a tenth data tone based on the sixth constellation mapping. The fourth bit stream may be mapped to an eleventh data tone based on a seventh constellation mapping and mapped to a twelfth data tone based on the eighth constellation mapping.

The first to eighth constellation mappings may be one modulation scheme among a Binary Phase Shift Keying (BPSK) scheme, a Quadrature Phase Shift Keying (QPSK) scheme or a 16-Quadrature Amplitude Modulation (QAM) scheme. However, when the DCM is not applied, the constellation mapping may be one modulation scheme among a BPSK scheme, a QPSK scheme, a 16-QAM scheme, a 64-QAM scheme, a 256-QAM scheme or a 1024-QAM scheme.

Each of the fifth to twelfth data tones may be set to have tone spacing that is equivalent to a second parameter based on the LDPC tone mapping. The fifth to twelfth data tones may be included in the data tones. The second parameter may be equal to 14. Details on the second parameter are described above.

When the DCM is being applied, the fifth, seventh, ninth and eleventh data tones may be lower half tones within a frequency. And, the sixth, eighth, tenth and twelfth data tones may be upper half tones within the frequency.

Similarly, even in a case where the DCM is applied, it is described that the LDPC tone mapping may be performed per frequency segment (996-tone RU). Depending upon the LDPC tone mapping, an operation of fifth to twelfth data tones being spread as much as the second parameter may be as described below.

Indexes of the fifth, seventh, ninth and eleventh data tones may be determined as follows.

$$t(k)=D_{TM\_DCM}(k \bmod (N_{SD}/4)/D_{TM\_DCM})+ \text{floor}(k*D_{TM\_DCM}/(N_{SD}/4))$$

Herein, t(k) may be an index of the fifth, seventh, ninth and eleventh data tones, $D_{TM\_DCM}$ may be the second parameter, k may be an index of a tone having the first to fourth bit streams mapped thereto, $N_{SD}$ may be a number of the data tones, and floor may be a decreasing function.

Indexes of the sixth, eighth, tenth and twelfth data tones are determined as follows.

$$t(k)=D_{TM\_DCM}((k-N_{SD}/4)\bmod(N_{SD}/4)/D_{TM\_DCM})+ \text{floor}((k-N_{SD}/4)*D_{TM\_DCM}/(N_{SD}/4))+N_{SD}/4$$

Herein, t(k) may be an index of the sixth, eighth, tenth and twelfth data tones, $D_{TM\_DCM}$ may be the second parameter, k may be an index of a tone having the first to fourth bit streams mapped thereto, $N_{SD}$ may be a number of the data tones, and floor may be a decreasing function.

For example, if the first and second constellation mappings are the BPSK modulation scheme, the first bit stream may be modulated to a first modulation symbol based on the first constellation mapping and modulated to a second modulation symbol based on the second constellation mapping. The second modulation symbol may be generated by applying phase rotation to the first modulation symbol ($d_{k+NSD}=d_k \times e^{j(k+NSD)*pi}$). And, the first modulation symbol may be mapped to the fifth data tone, and the second modulation symbol may be mapped to the sixth data tone.

For example, if the third and fourth constellation mappings are the QPSK modulation scheme, the second bit stream may be modulated to a third modulation symbol based on the third constellation mapping and modulated to a fourth modulation symbol based on the fourth constellation mapping. The fourth modulation symbol may be a complex conjugate of the third modulation symbol ($d_{k+NSD}=\text{conj}(d_k)$). The fourth modulation symbol may be mapped to the seventh data tone, and the fifth modulation symbol may be mapped to the eighth data tone.

For example, if the fifth and sixth constellation mappings are the 16-QAM modulation scheme, the third bit stream may be modulated to a fifth modulation symbol based on the fifth constellation mapping and a sixth modulation symbol based on the sixth constellation mapping. A bit order of a first bit group for the sixth modulation symbol may be different from a bit order of a second bit group for the fifth modulation symbol (($B_{4k}$, $B_{4k+1}$, $B_{4k+2}$, $B_{4k+3}$)->($B_{4k+1}$, $B_{4k}$, $B_{4k+3}$, $B_{4k+2}$)). The first and second bit groups may be included in the third bit stream. The fifth modulation symbol may be mapped to the ninth data tone, and the sixth modulation symbol may be mapped to the tenth data tone.

For example, if the seventh and eighth constellation mappings are the BPSK modulation scheme, the fourth bit stream may be modulated to a seventh modulation symbol based on the seventh constellation mapping and modulated to an eighth modulation symbol based on the eighth constellation mapping. The eighth modulation symbol may be generated by applying phase rotation to the seventh modulation symbol ($d_{k+NSD}=d_k \times e^{j(k+NSD)*pi}$). The seventh modulation symbol may be mapped to the eleventh data tone, and the eighth modulation symbol may be mapped to the twelfth data tone.

The 3×996-tone RU may include 48 pilot tones and 2940 data tones. And, the 4×996-tone RU may include 64 pilot tones and 3920 data tones.

Furthermore, the PPDU may further include a Legacy-Signal (L-SIG) field, a Repeated Legacy-Signal (RL-SIG) field, an EHT-Short Training Field (STF), an EHT-Long Training Field (LTF). The EHT-SIG field may include an EHT-SIG-A field and an EHT-SIG-B field. The EHT-SIG field may further include an EHT-SIG-C field.

The technical features of the present specification may be implemented based on a computer readable medium (CRM). For example, the CRM that is proposed in the present specification is a computer readable medium including an instruction being executed by at least one processor.

The CRM may store instructions performing operations including the steps of receiving a Physical Protocol Data Unit (PPDU) from a transmitting station (STA), and decoding the PPDU. The instructions that are stored in the CRM of the present specification may be executed by at least one processor. At least one processor being related to the CRM of the present specification may be the processor(s) 111 and 121 or processing chip(s) 114 and 124 of FIG. 1, or the processor 610 of FIG. 29. Meanwhile, the CRM of the present specification may be the memory(s) 112 and 122 of FIG. 1, or the memory 620 of FIG. 29, or a separate external memory/storage medium/disc, and so on.

The wideband may be a 240 MHz band or a 320 MHz band.

The PPDU may include a control field and a data field. The control field may include a Universal-Signal (U-SIG) field and an EHT-SIG field.

Low Density Parity Check (LDPC) tone mapping is performed on data tones included in the data field based on a first parameter. More specifically, the data field may be generated based on a bit stream. The bit stream may be mapped to the data tones based on a constellation mapping. The data tones may be configured to have a tone spacing that is equivalent to the first parameter based on the LDPC tone mapping. The LDPC tone mapping is similar to an interleaving operation, and the bit stream may be spread at a tone spacing of the first parameter based on the LDPC tone mapping and may then be mapped to a data tone. Additionally, the bit stream may be modulated based on the constellation mapping before being processed with the LDPC tone mapping.

Furthermore, the bit stream may be divided per frequency segment by a segment parser before the constellation mapping is performed. The constellation mapping and the LDPC tone mapping may be performed per frequency segment. A size of one frequency segment may be equal to a 996-tone RU.

That is, 1) PHY padding may be performed, 2) a scrambling operation may be performed, 3) LDPC encoding may be performed, 4) a stream parsing operation that maps an LDPC-coded bit to a specific spatial stream may be performed, 5) a segment parsing operation that divides a full band to frequency segments (996-tone RU) may be performed, 6) the constellation mapping for an individual spatial stream and each frequency segment may be performed, and 7) the LDPC tone mapping may be performed on a modulation symbol that is generated based on the constellation mapping. In the transmitting STA, the procedures from 1) to 7) are performed in the listed order. And, the description of the present embodiment will be focused on the procedures from 5) to 7).

A tone plan of the 240 MHz band or the 320 MHz band is determined based on the control field. That is, the control field included information on a tone plan, and the information on the tone plan may include a size and position of an RU, control information related to the RU, information related to the frequency band including the RU, information on an STA receiving the RU, and so on.

Additionally, the control field may include information on a bandwidth of the wideband. The wideband may be determined as 240 MHz or 320 MHz (including both contiguous band and non-contiguous band) based on the information on the bandwidth of the wideband.

As an example of the tone plan, a tone plan of the 240 MHz band may be a 3×996 tone Resource Unit (RU), a tone plan of the 320 MHz band may be a 4×996 tone RU, and the first parameter may be equal to 20. The first parameter may correspond to an LDPC tone mapping distance parameter $D_{TM}$. The $D_{TM}$ may be a tone spacing that is used in the LDPC tone mapping.

The 3×996-tone RU is a repetition of a 996-tone RU, which is an 80 MHz tone plan of an 802.11ax WLAN system. Accordingly, when using a tone plan of a 3×996-tone RU in the 240 MHz band, $D_{TM}$ that is used in the 996-tone RU may be used as it is in the 3×996-tone RU ($D_{TM}$=20 in a 996-tone RU). Additionally, the 4×996-tone RU is a repetition of a 996-tone RU, which is an 80 MHz tone plan of an 802.11ax WLAN system. Accordingly, when using a tone plan of a 4×996-tone RU in the 320 MHz band, $D_{TM}$ that is used in the 996-tone RU may be used as it is in the 4×996-tone RU ($D_{TM}$=20 in a 996-tone RU).

When the wideband is a 240 MHz band, the 3×996-tone RU may be divided into a first 996-tone RU, a second 996-tone RU, and a third 996-tone RU by the segment parser.

The bit stream may include a first bit stream for the first 996-tone RU, a second bit stream for the second 996-tone RU, and a third bit stream for the third 996-tone RU.

The first bit stream may be mapped to a first data tone based on the constellation mapping, and the first data tone may be set to have tone spacing that is equivalent to the first parameter based on the LDPC tone mapping. The second bit stream may be mapped to a second data tone based on the constellation mapping, and the second data tone may be set to have tone spacing that is equivalent to the first parameter based on the LDPC tone mapping. The third bit stream may be mapped to a third data tone based on the constellation mapping, and the third data tone may be set to have tone spacing that is equivalent to the first parameter based on the LDPC tone mapping. That is, the constellation mapping is first performed per frequency segment, and, then, the LDPC tone mapping may be performed afterwards.

The first to third data tones may be included in the data tones.

That is, the above-described embodiment describes that the LDPC tone mapping may be performed per frequency segment (996-tone RU). Depending upon the LDPC tone mapping, an operation of first to third data tones being spread as much as the first parameter may be as described below.

Indexes of the first to third data tones may be determined as follows.

$$t(k) = D_i(k \bmod(N_{SD}/3)/D_{TM}) + \text{floor}(k*D_{TM}/(N_{SD}/3))$$

Herein, $t(k)$ is an index of the first to third data tones, $D_{TM}$ is the first parameter, k is an index of a tone having the first to third bit streams mapped thereto, $N_{SD}$ is a number of the data tones, and floor is a decreasing function.

A case where DCM is applied in the constellation mapping may also be considered. When Dual Carrier Modulation (DCM) is performed on the first to third bit streams, the first bit stream may be mapped to a fourth data tone based on a first constellation mapping and mapped to a fifth data tone based on a second constellation mapping. The second bit stream may be mapped to a sixth data tone based on a third constellation mapping and mapped to a seventh data tone based on a fourth constellation mapping. The third bit stream may be mapped to an eighth data tone based on a fifth constellation mapping and mapped to a ninth data tone based on a sixth constellation mapping.

The first to sixth constellation mappings may be one modulation scheme among a Binary Phase Shift Keying (BPSK) scheme, a Quadrature Phase Shift Keying (QPSK) scheme or a 16-Quadrature Amplitude Modulation (QAM) scheme. However, when the DCM is not applied, the constellation mapping may be one modulation scheme among a BPSK scheme, a QPSK scheme, a 16-QAM scheme, a 64-QAM scheme, a 256-QAM scheme or a 1024-QAM scheme.

Each of the fourth to ninth data tones may be set to have tone spacing that is equivalent to a second parameter based on the LDPC tone mapping. The fourth to ninth data tones may be included in the data tones. At this point, the second parameter may be equal to 14.

The second parameter may correspond to an LDPC tone mapping distance parameter $D_{TM\_DCM}$ in a case where the DCM scheme is applied. The $D_{TM\_DCM}$ may be a tone spacing that is used in the LDPC tone mapping in the case where the DCM scheme is applied. Similarly, in the 3×996-tone RU, $D_{TM\_DCM}$ that is used in the 996-tone RU may be used as it is ($D_{TM\_DCM}$=14 in a 996-tone RU). And, in the 4×996-tone RU, $D_{TM\_DCM}$ that is used in the 996-tone RU may be used as it is in the 4×996-tone RU ($D_{TM\_DCM}$=14 in a 996-tone RU).

When the DCM is being applied, the fourth, sixth and eighth data tones may be lower half tones (or subcarrier k) within a frequency, and the fifth, seven and ninth data tones may be upper half tones (or subcarrier k+N/2) within the frequency. Herein, a tone and a subcarrier may be interchangeably used.

Similarly, even in a case where the DCM is applied, it is described that the LDPC tone mapping may be performed per frequency segment (996-tone RU). Depending upon the LDPC tone mapping, an operation of fourth to ninth data tones being spread as much as the second parameter may be as described below.

Indexes of the fourth, sixth, and eighth data tones may be determined as follows.

$$t(k) = D_{TM\_DCM}(k \bmod(N_{SD}/3)/D_{TM\_DCM}) + \text{floor}(k*D_{TM\_DCM}/(N_{SD}/3))$$

Herein, $t(k)$ is an index of the fourth, sixth, and eighth data tones, $D_{TM\_DCM}$ is the second parameter, k is an index of a tone having the first to third bit streams mapped thereto, $N_{SD}$ is a number of the data tones, and floor is a decreasing function.

Indexes of the fifth, seventh, and ninth data tones may be determined as follows.

$$t(k) = D_{TM\_DCM}(k-N_{SD}/3) \bmod (N_{SD}/3)/D_{TM\_DCM}) + \mathrm{floor}((k-N_{SD}/3)*D_{TM\_DCM}/(N_{SD}/3)) + N_{SD}/3$$

Herein, t(k) is an index of the fifth, seventh, and ninth data tones, $D_{TM\_DCM}$ is the second parameter, k is an index of a tone having the first to third bit streams mapped thereto, $N_{SD}$ is a number of the data tones, and floor is a decreasing function.

For example, if the first and second constellation mappings are the BPSK modulation scheme, the first bit stream may be modulated to a first modulation symbol based on the first constellation mapping and modulated to a second modulation symbol based on the second constellation mapping. The second modulation symbol may be generated by applying phase rotation to the first modulation symbol ($d_{k+NSD} = d_k \times e^{j(k+NSD)*pi}$). The first modulation symbol may be mapped to the fourth data tone, and the second modulation symbol may be mapped to the fifth data tone.

For example, if the third and fourth constellation mappings are the QPSK modulation scheme, the second bit stream may be modulated to a third modulation symbol based on the third constellation mapping and modulated to a fourth modulation symbol based on the fourth constellation mapping. The fourth modulation symbol may be a complex conjugate of the third modulation symbol ($d_{k+NSD} = \mathrm{conj}(d_k)$). And, the fourth modulation symbol may be mapped to the sixth data tone, and the fifth modulation symbol may be mapped to the seventh data tone.

For example, if the fifth and sixth constellation mappings are the 16-QAM modulation scheme, the third bit stream may be modulated to a fifth modulation symbol based on the fifth mapping constellation and modulated to a sixth modulation symbol based on the sixth constellation mapping. A bit order of a first bit group for the sixth modulation symbol may be different from a bit order of a second bit group for the fifth modulation symbol (($B_{4k}$, $B_{4k+1}$, $B_{4k+2}$, $B_{4k+3}$)-> ($B_{4k+1}$, $B_{4k}$, $B_{4k+3}$, $B_{4k+2}$)) The first and second bit groups may be included in the third bit stream. And, the fifth modulation symbol may be mapped to the eighth data tone, and the sixth modulation symbol may be mapped to the ninth data tone.

When the wideband is a 320 MHz band, the 4×996-tone RU may be divided into a first 996-tone RU, a second 996-tone RU, a third 996-tone RU, and a fourth 996-tone RU by the segment parser.

The bit stream may include a first bit stream for the first 996-tone RU, a second bit stream for the second 996-tone RU, a third bit stream for the third 996-tone RU, and a fourth bit stream for the fourth 996-tone RU.

The first bit stream may be mapped to a first data tone based on the constellation mapping, and the first data tone may be set to have tone spacing that is equivalent to the first parameter based on the LDPC tone mapping. The second bit stream may be mapped to a second data tone based on the constellation mapping, and the second data tone may be set to have tone spacing that is equivalent to the first parameter based on the LDPC tone mapping. The third bit stream may be mapped to a third data tone based on the constellation mapping, and the third data tone may be set to have tone spacing that is equivalent to the first parameter based on the LDPC tone mapping. The fourth bit stream may be mapped to a fourth data tone based on the constellation mapping, and the fourth data tone may be set to have tone spacing that is equivalent to the first parameter based on the LDPC tone mapping. That is, the constellation mapping is first performed per frequency segment, and, then, the LDPC tone mapping may be performed afterwards.

The first to fourth data tones may be included in the data tones.

That is, the above-described embodiment describes that the LDPC tone mapping may be performed per frequency segment (996-tone RU). Depending upon the LDPC tone mapping, an operation of first to fourth data tones being spread as much as the first parameter may be as described below.

Indexes of the first to fourth data tones are determined as follows.

$$t(k) = D_{TM}(k \bmod (N_{SD}/4)/D_{TM}) + \mathrm{floor}(k*D_{TM}/(N_{SD}/4))$$

Herein, t(k) may be an index of the first to fourth data tones, $D_{TM}$ may be the first parameter, k may be an index of a tone having the first to fourth bit streams mapped thereto, $N_{SD}$ may be a number of the data tones, and floor may be a decreasing function.

A case where DCM is applied in the constellation mapping may also be considered. When Dual Carrier Modulation (DCM) is performed on the first to fourth bit streams, the first bit stream may be mapped to a fifth data tone based on a first constellation mapping and mapped to a sixth data tone based on the second constellation mapping. The second bit stream may be mapped to a seventh data tone based on a third constellation mapping and mapped to an eighth data tone based on the fourth constellation mapping. The third bit stream may be mapped to a ninth data tone based on a fifth constellation mapping and mapped to a tenth data tone based on the sixth constellation mapping. The fourth bit stream may be mapped to an eleventh data tone based on a seventh constellation mapping and mapped to a twelfth data tone based on the eighth constellation mapping.

The first to eighth constellation mappings may be one modulation scheme among a Binary Phase Shift Keying (BPSK) scheme, a Quadrature Phase Shift Keying (QPSK) scheme or a 16-Quadrature Amplitude Modulation (QAM) scheme. However, when the DCM is not applied, the constellation mapping may be one modulation scheme among a BPSK scheme, a QPSK scheme, a 16-QAM scheme, a 64-QAM scheme, a 256-QAM scheme or a 1024-QAM scheme.

Each of the fifth to twelfth data tones may be set to have tone spacing that is equivalent to a second parameter based on the LDPC tone mapping. The fifth to twelfth data tones may be included in the data tones. The second parameter may be equal to 14. Details on the second parameter are described above.

When the DCM is being applied, the fifth, seventh, ninth and eleventh data tones may be lower half tones within a frequency. And, the sixth, eighth, tenth and twelfth data tones may be upper half tones within the frequency.

Similarly, even in a case where the DCM is applied, it is described that the LDPC tone mapping may be performed per frequency segment (996-tone RU). Depending upon the LDPC tone mapping, an operation of fifth to twelfth data tones being spread as much as the second parameter may be as described below.

Indexes of the fifth, seventh, ninth and eleventh data tones may be determined as follows.

$$t(k) = D_{TM\_DCM}(k \bmod (N_{SD}/4)/D_{TM\_DCM}) + \mathrm{floor}(k*D_{TM\_DCM}/(N_{SD}/4))$$

Herein, t(k) may be an index of the fifth, seventh, ninth and eleventh data tones, $D_{TM\_DCM}$ may be the second parameter, k may be an index of a tone having the first to fourth bit streams mapped thereto, $N_{SD}$ may be a number of the data tones, and floor may be a decreasing function.

Indexes of the sixth, eighth, tenth and twelfth data tones are determined as follows.

$$t(k)=D_{TM\_DCM}((k-N_{SD}/4)\bmod(N_{SD}/4)/D_{TM\_DCM})+\\ \mathrm{floor}((k-N_{SD}/4)*D_{TM\_DCM}/(N_{SD}/4))+N_{SD}/4$$

Herein, t(k) may be an index of the sixth, eighth, tenth and twelfth data tones, $D_{TM\_DCM}$ may be the second parameter, k may be an index of a tone having the first to fourth bit streams mapped thereto, $N_{SD}$ may be a number of the data tones, and floor may be a decreasing function.

For example, if the first and second constellation mappings are the BPSK modulation scheme, the first bit stream may be modulated to a first modulation symbol based on the first constellation mapping and modulated to a second modulation symbol based on the second constellation mapping. The second modulation symbol may be generated by applying phase rotation to the first modulation symbol ($d_{k+NSD}=d_k \times e^{j(k+NSD)*pi}$). And, the first modulation symbol may be mapped to the fifth data tone, and the second modulation symbol may be mapped to the sixth data tone.

For example, if the third and fourth constellation mappings are the QPSK modulation scheme, the second bit stream may be modulated to a third modulation symbol based on the third constellation mapping and modulated to a fourth modulation symbol based on the fourth constellation mapping. The fourth modulation symbol may be a complex conjugate of the third modulation symbol ($d_{k+NSD}=\mathrm{conj}(d_k)$). The fourth modulation symbol may be mapped to the seventh data tone, and the fifth modulation symbol may be mapped to the eighth data tone.

For example, if the fifth and sixth constellation mappings are the 16-QAM modulation scheme, the third bit stream may be modulated to a fifth modulation symbol based on the fifth constellation mapping and a sixth modulation symbol based on the sixth constellation mapping. A bit order of a first bit group for the sixth modulation symbol may be different from a bit order of a second bit group for the fifth modulation symbol (($B_{4k}$, $B_{4k+1}$, $B_{4k+2}$, $B_{4k+3}$)->($B_{4k+1}$, $B_{4k}$, $B_{4k+3}$, $B_{4k+2}$)). The first and second bit groups may be included in the third bit stream. The fifth modulation symbol may be mapped to the ninth data tone, and the sixth modulation symbol may be mapped to the tenth data tone.

For example, if the seventh and eighth constellation mappings are the BPSK modulation scheme, the fourth bit stream may be modulated to a seventh modulation symbol based on the seventh constellation mapping and modulated to an eighth modulation symbol based on the eighth constellation mapping. The eighth modulation symbol may be generated by applying phase rotation to the seventh modulation symbol ($d_{k+NSD}=d_k \times e^{j(k+NSD)*pi}$). The seventh modulation symbol may be mapped to the eleventh data tone, and the eighth modulation symbol may be mapped to the twelfth data tone.

The 3×996-tone RU may include 48 pilot tones and 2940 data tones. And, the 4×996-tone RU may include 64 pilot tones and 3920 data tones.

Furthermore, the PPDU may further include a Legacy-Signal (L-SIG) field, a Repeated Legacy-Signal (RL-SIG) field, an EHT-Short Training Field (STF), an EHT-Long Training Field (LTF). The EHT-SIG field may include an EHT-SIG-A field and an EHT-SIG-B field. The EHT-SIG field may further include an EHT-SIG-C field.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method in a wireless local area network (WLAN) system, the method comprising:
   receiving, by a receiving station (STA), a Physical Protocol Data Unit (PPDU) from a transmitting STA; and
   decoding, by the receiving STA, the PPDU,
   wherein the PPDU includes an extreme high throughput-signal (EHT-SIG) field and a data field,
   wherein the EHT-SIG field includes resource unit (RU) allocation information for a 3×996-tone Multi resource unit (MRU) or a 4×996-tone MRU,
   wherein the data field is received through the 3×996-tone MRU or the 4×996-tone MRU,
   wherein Low Density Parity Check (LDPC) tone demapping is performed in each 80 MHz frequency subblock of the 3×996-tone MRU or the 4×996-tone MRU based on a $D_{TM\_1}$, and
   wherein the $D_{TM\_1}$ is equal to 201
   wherein indexes of data tones in the data field are determined as follows:

$$t(k,1) = D_{TM\_1}(k \bmod (N_{SD\_1})/D_{TM\_1}) + \text{floor}(k * D_{TM\_1}/(N_{SD\_1})),$$

wherein k is an index of data tones in a 996-tone RU located in a 1-th 80 MHz frequency subblock,
      wherein $N_{SD\_1}$ is a number of the data tones in the 996-tone RU located in the 1-th 80 MHz frequency subblock, and
      wherein floor is a decreasing function.

2. The method of claim 1, wherein the data field is generated based on a bit stream,
   wherein the bit stream is mapped to the data tones based on a constellation mapping,
   wherein the data tones are configured to have a tone spacing that is equivalent to the $D_{TM\_1}$ based on a LDPC tone mapping,
   wherein the bit stream is divided per frequency segment by a segment parser before the constellation mapping is performed,
   wherein the constellation mapping and the LDPC tone mapping are performed per frequency segment, and
   wherein a size of one frequency segment is equal to a 996-tone RU.

3. The method of claim 2, wherein the 3×996-tone MRU is divided into a first 996-tone RU, a second 996-tone RU, and a third 996-tone RU by the segment parser,
   wherein the bit stream includes a first bit stream for the first 996-tone RU, a second bit stream for the second 996-tone RU, and a third bit stream for the third 996-tone RU,
   wherein the first bit stream is mapped to a first data tone based on the constellation mapping,
   wherein the first data tone is set to have tone spacing that is equivalent to the $D_{TM\_1}$ based on the LDPC tone mapping,
   wherein the second bit stream is mapped to a second data tone based on the constellation mapping,
   wherein the second data tone is set to have tone spacing that is equivalent to the $D_{TM\_1}$ based on the LDPC tone mapping,
   wherein the third bit stream is mapped to a third data tone based on the constellation mapping,
   wherein the third data tone is set to have tone spacing that is equivalent to the $D_{TM\_1}$ based on the LDPC tone mapping, and
   wherein the first to third data tones are included in the data tones.

4. The method of claim 3, wherein values of 1 is 0, 1 and 2 for the 3×996-tone MRU.

5. The method of claim 4, wherein, when Dual Carrier Modulation (DCM) is performed on the first to third bit streams, the first bit stream is mapped to a fourth data tone based on a first constellation mapping and mapped to a fifth data tone based on a second constellation mapping,
   wherein the second bit stream is mapped to a sixth data tone based on a third constellation mapping and mapped to a seventh data tone based on a fourth constellation mapping,
   wherein the third bit stream is mapped to an eighth data tone based on a fifth constellation mapping and mapped to a ninth data tone based on a sixth constellation mapping,
   wherein the first to sixth constellation mappings are one modulation scheme among a Binary Phase Shift Keying (BPSK) scheme, a Quadrature Phase Shift Keying (QPSK) scheme or a 16-Quadrature Amplitude Modulation (QAM) scheme,
   wherein each of the fourth to ninth data tones is set to have tone spacing that is equivalent to a $D_{TM\_DCM}$ based on the LDPC tone mapping,
   wherein the fourth to ninth data tones are included in the data tones, and
   wherein the $D_{TM\_DCM}$ is equal to 14.

6. The method of claim 5, wherein the fourth, sixth and eighth data tones are lower half tones within a frequency, and
   wherein the fifth, seven and ninth data tones are upper half tones within the frequency.

7. The method of claim 6, wherein indexes of the fourth, sixth, and eighth data tones are determined as follows:

$$t(k,1) = D_{TM\_1}(k \bmod (N_{SD\_1})/D_{TM\_1}) + \text{floor}(k*D_{TM\_1}/(N_{SD\_1})),$$

8. The method of claim 6, wherein indexes of the fifth, seventh, and ninth data tones are determined as follows:

$$t(k,1) = D_{TM\_DCM}((k-N_{SD\_1}) \bmod (N_{SD\_1})/D_{TM\_DCM}) + \text{floor}((k-N_{SD\_1})*D_{TM\_DCM}/(N_{SD\_1})) + N_{SD\_1}$$

9. The method of claim 6, wherein, if the first and second constellation mappings are the BPSK modulation scheme, the first bit stream is modulated to a first modulation symbol based on the first constellation mapping and modulated to a second modulation symbol based on the second constellation mapping,
   wherein the second modulation symbol is generated by applying phase rotation to the first modulation symbol, and
   wherein the first modulation symbol is mapped to the fourth data tone and the second modulation symbol is mapped to the fifth data tone.

10. The method of claim 6, wherein, if the third and fourth constellation mappings are the QPSK modulation scheme, the second bit stream is modulated to a third modulation symbol based on the third constellation mapping and modulated to a fourth modulation symbol based on the fourth constellation mapping,
   wherein the fourth modulation symbol is a complex conjugate of the third modulation symbol, and
   wherein the fourth modulation symbol is mapped to the sixth data tone and the fifth modulation symbol is mapped to the seventh data tone.

11. The method of claim 6, wherein, if the fifth and sixth constellation mappings are the 16-QAM modulation scheme, the third bit stream is modulated to a fifth modulation symbol based on the fifth mapping constellation and modulated to a sixth modulation symbol based on the sixth constellation mapping,
   wherein a bit order of a first bit group for the sixth modulation symbol is different from a bit order of a second bit group for the fifth modulation symbol,
   wherein the first and second bit groups are included in the third bit stream, and
   wherein the fifth modulation symbol is mapped to the eighth data tone and the sixth modulation symbol is mapped to the ninth data tone.

12. The method of claim 2, wherein the 4×996-tone MRU is divided into a first 996-tone RU, a second 996-tone RU, a third 996-tone RU, and a fourth 996-tone RU by the segment parser,
   wherein the bit stream includes a first bit stream for the first 996-tone RU, a second bit stream for the second 996-tone RU, a third bit stream for the third 996-tone RU, and a fourth bit stream for the fourth 996-tone RU,
   wherein the first bit stream is mapped to a first data tone based on the constellation mapping,
   wherein the first data tone is set to have tone spacing that is equivalent to the $D_{TM\_1}$ based on the LDPC tone mapping,
   wherein the second bit stream is mapped to a second data tone based on the constellation mapping,
   wherein the second data tone is set to have tone spacing that is equivalent to the $D_{TM\_1}$ based on the LDPC tone mapping,
   wherein the third bit stream is mapped to a third data tone based on the constellation mapping,
   wherein the third data tone is set to have tone spacing that is equivalent to the $D_{TM\_1}$ based on the LDPC tone mapping,
   wherein the fourth bit stream is mapped to a fourth data tone based on the constellation mapping,
   wherein the fourth data tone is set to have tone spacing that is equivalent to the $D_{TM}$ based on the LDPC tone mapping, and
   wherein the first to fourth data tones are included in the data tones.

13. The method of claim 12, wherein indexes of the first to fourth data tones are determined as follows:

$$t(k,1) = D_{TM\_1}(k \bmod (N_{SD\_1})/D_{TM\_1}) + \text{floor}(k*D_{TM\_1}/(N_{SD\_1})),$$

wherein values of 1 is 0, 1, 2 and 3 for the 4×996-tone MRU.

14. The method of claim 13, wherein, when Dual Carrier Modulation (DCM) is performed on the first to fourth bit streams, the first bit stream is mapped to a fifth data tone based on a first constellation mapping and mapped to a sixth data tone based on a second constellation mapping,
   wherein the second bit stream is mapped to a seventh data tone based on a third constellation mapping and mapped to an eighth data tone based on a fourth constellation mapping,
   wherein the third bit stream is mapped to a ninth data tone based on a fifth constellation mapping and mapped to a tenth data tone based on a sixth constellation mapping,
   wherein the fourth bit stream is mapped to an eleventh data tone based on a seventh constellation mapping and mapped to a twelfth data tone based on an eighth constellation mapping,
   wherein the first to eighth constellation mappings are one modulation scheme among a Binary Phase Shift Keying (BPSK) scheme, a Quadrature Phase Shift Keying (QPSK) scheme or a 16-Quadrature Amplitude Modulation (QAM) scheme,
   wherein each of the fifth to twelfth data tones is set to have tone spacing that is equivalent to a DTM DCM based on the LDPC tone mapping,
   wherein the fifth to twelfth data tones are included in the data tones, and
   wherein the $D_{TM\_DCM}$ is equal to 14.

15. The method of claim 14, wherein the fifth, seventh, ninth and eleventh data tones are lower half tones within the frequency, and
   wherein the sixth, eighth, tenth and twelfth data tones are upper half tones within the frequency.

16. The method of claim 15, wherein indexes of the fifth, seventh, ninth and eleventh data tones are determined as follows:

$$t(k,1) = D_{TM\_DCM}(k \bmod (N_{SD\_1})/D_{TM\_DCM}) + \text{floor}(k*D_{TM\_DCM}/(N_{SD\_1})),$$

17. The method of claim 15, wherein indexes of the sixth, eighth, tenth and twelfth data tones are determined as follows:

$$t(k,1) = D_{TM\_DCM}((k-N_{SD\_1}) \bmod (N_{SD\_1})/D_{TM\_DCM}) + \text{floor}((k-N_{SD\_1})*D_{TM\_DCM}/(N_{SD\_1})) + N_{SD\_1}$$

18. A method in a wireless local area network (WLAN) system, the method comprising:
   generating, by a transmitting station (STA), a Physical Protocol Data Unit (PPDU); and
   transmitting, by the transmitting STA, the PPDU to a receiving STA, wherein the PPDU includes an extreme high throughput-signal (EHT-SIG) field and a data field,
wherein the EHT-SIG field includes resource unit (RU) allocation information for a 3×996-tone Multi resource unit (MRU) or a 4×996-tone MRU,
wherein the data field is transmitted through the 3×996-tone MRU or the 4×996-tone MRU
wherein Low Density Parity Check (LDPC) tone mapping is performed in each 80 MHz frequency subblock of the 3×996-tone MRU or the 4×996-tone MRU based on a $D_{TM\_1}$, and
wherein the $D_{TM\_1}$ is equal to 20,
wherein indexes of data tones in the data field are determined as follows:

$$t(k,1)=D_{TM\_1}(k \bmod(N_{SD\_1})/D_{TM\_1})+\mathrm{floor}(k*D_{TM\_1}/(N_{SD\_1})),$$

wherein k is an index of data tones in a 996-tone RU located in a 1-th 80 MHz frequency subblock,
wherein $N_{SD\_1}$ is a number of the data tones in the 996-tone RU located in the 1-th 80 MHz frequency subblock, and
wherein floor is a decreasing function.

19. A receiving station (STA) in a wireless Local Area Network (LAN), the receiving STA comprising:
a memory;
a transceiver; and
a processor operatively coupled to the memory and the transceiver,
wherein the processor is configured to:
receive a Physical Protocol Data Unit (PPDU) from a transmitting STA; and
decode the PPDU,
wherein the PPDU includes an extreme high throughput-signal (EHT-SIG) field and a data field,
wherein the EHT-SIG field includes resource unit (RU) allocation information for a 3×996-tone Multi resource unit (MRU) or a 4×996-tone MRU,
wherein the data field is received through the 3×996-tone MRU or the 4×996-tone MRU,
wherein Low Density Parity Check (LDPC) tone demapping is performed in each 80 MHz frequency subblock of the 3×996-tone MRU or the 4×996-tone MRU based on a $D_{TM\_1}$, and
wherein the $D_{TM\_1}$ is equal to 20,
wherein indexes of data tones in the data field are determined as follows:

$$t(k,1)=D_{TM\_1}(k \bmod(N_{SD\_1})/D_{TM\_1})+\mathrm{floor}(k*D_{TM\_1}/(N_{SD\_1})),$$

wherein k is an index of data tones in a 996-tone RU located in a 1-th 80 MHz frequency subblock,
wherein $N_{SD\_1}$ is a number of the data tones in the 996-tone RU located in the 1-th 80 MHz frequency subblock, and
wherein floor is a decreasing function.

20. A transmitting station (STA) in a wireless Local Area Network (LAN), the transmitting STA comprising:
a memory;
a transceiver; and
a processor operatively coupled to the memory and the transceiver,
wherein the processor is configured to:
generate a Physical Protocol Data Unit (PPDU); and
transmit the PPDU to a receiving STA,
wherein the PPDU includes an extreme high throughput-signal (EHT-SIG) field and a data field,
wherein the EHT-SIG field includes resource unit (RU) allocation information for a 3×996-tone Multi resource unit (MRU) or a 4×996-tone MRU,
wherein the data field is received through the 3×996-tone MRU or the 4×996-tone MRU,
wherein Low Density Parity Check (LDPC) tone mapping is performed in each 80 MHz frequency subblock of the 3×996-tone MRU or the 4×996-tone MRU based on a $D_{TM\_1}$,
wherein the $D_{TM\_1}$ is equal to 20,
wherein indexes of data tones in the data field are determined as follows:

$$t(k,1)=D_{TM\_1}(k \bmod(N_{SD\_1})/D_{TM\_1})+\mathrm{floor}(k*D_{TM\_1}/(N_{SD\_1})),$$

wherein k is an index of data tones in a 996-tone RU located in a 1-th 80 MHz frequency subblock,
wherein $N_{SD\_1}$ is a number of the data tones in the 996-tone RU located in the 1-th 80 MHz frequency subblock, and
wherein floor is a decreasing function.

* * * * *